(12) United States Patent
Lee

(10) Patent No.: US 11,328,079 B2
(45) Date of Patent: May 10, 2022

(54) SYSTEM AND METHOD OF ENCRYPTING FOLDER IN DEVICE

(71) Applicant: SAMSUNG ELECTRONICS CO., LTD., Suwon-si (KR)

(72) Inventor: Jung-kyuen Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 122 days.

(21) Appl. No.: 16/686,958

(22) Filed: Nov. 18, 2019

(65) Prior Publication Data
US 2020/0089902 A1     Mar. 19, 2020

Related U.S. Application Data

(63) Continuation of application No. 15/786,193, filed on Oct. 17, 2017, now Pat. No. 10,521,602, which is a
(Continued)

(30) Foreign Application Priority Data

Mar. 12, 2014   (KR) .................. 10-2014-0029262
Jul. 31, 2014   (KR) .................. 10-2014-0098625

(51) Int. Cl.
*H04L 29/06*     (2006.01)
*G06F 21/62*     (2013.01)
(Continued)

(52) U.S. Cl.
CPC .......... *G06F 21/6218* (2013.01); *H04L 9/088* (2013.01); *H04L 9/0894* (2013.01); *H04L 9/3226* (2013.01); *G06F 2221/2113* (2013.01)

(58) Field of Classification Search
None
See application file for complete search history.

(56) References Cited

U.S. PATENT DOCUMENTS 5,577,125 A   11/1996 Salahshour et al.
6,453,334 B1   9/2002 Vinson et al.
(Continued)

FOREIGN PATENT DOCUMENTS

CN   101729550 A   6/2010
EP     2043073 A1   4/2009

OTHER PUBLICATIONS

Communication issued by the European Patent Office dated Jun. 29, 2017 in counterpart European Patent Application No. 15762420.6.
(Continued)

*Primary Examiner* — Maung T Lwin
(74) *Attorney, Agent, or Firm* — Sughrue Mion, PLLC

(57) ABSTRACT

Provided are a system and method of encrypting a folder in a device. The device for controlling access to the folder includes a communication part configured to transmit, to a server, an encryption key generation request with respect to the folder, and receive, from the server, an encryption key associated with the folder that is generated in response to the encryption key generation request, wherein the encryption key generation request includes an identification of the folder and authentication data of a user who accesses the folder is an authorized user; and a controller configured to authenticate the user by using the encryption key.

16 Claims, 52 Drawing Sheets

Related U.S. Application Data continuation of application No. 14/656,197, filed on Mar. 12, 2015, now Pat. No. 9,817,990.

(51) Int. Cl.
  *H04L 9/08* (2006.01)
  *H04L 9/32* (2006.01)

(56) References Cited

U.S. PATENT DOCUMENTS

| | | | |
|---|---|---|---|
| 6,834,346 B1 | 12/2004 | Ishibashi et al. | |
| 6,889,210 B1* | 5/2005 | Vainstein | G06F 21/6209 380/201 |
| 7,117,364 B1 | 10/2006 | Hepper et al. | |
| 7,174,019 B2 | 2/2007 | Okutomi | |
| 7,313,694 B2 | 12/2007 | Riedel et al. | |
| 7,412,060 B2 | 8/2008 | Fukuda | |
| 7,506,367 B1 | 3/2009 | Ishibashi | |
| 7,680,815 B2 | 3/2010 | Komine et al. | |
| 8,184,811 B1 | 5/2012 | Patten et al. | |
| 8,266,323 B2* | 9/2012 | Cisler | H04L 63/0272 709/245 |
| 8,498,417 B1 | 7/2013 | Harwood et al. | |
| 8,589,970 B2 | 11/2013 | Teraoka et al. | |
| 8,621,036 B1 | 12/2013 | L'Heureux et al. | |
| 8,738,725 B2* | 5/2014 | McEntee | H04L 41/0813 709/216 |
| 8,773,275 B1 | 7/2014 | Parenteau et al. | |
| 8,850,516 B1* | 9/2014 | Hrebicek | G06F 16/1734 726/1 |
| 8,880,873 B2 | 11/2014 | Lu | |
| 2002/0043566 A1 | 4/2002 | Goodman et al. | |
| 2003/0120611 A1 | 6/2003 | Yoshino et al. | |
| 2003/0221098 A1 | 11/2003 | Chen et al. | |
| 2004/0086124 A1* | 5/2004 | Sasaki | H04L 9/0833 380/277 |
| 2005/0223224 A1* | 10/2005 | Carpentier | H04L 9/0861 713/165 |
| 2005/0278533 A1 | 12/2005 | Mayer | |
| 2006/0005017 A1* | 1/2006 | Black | H04L 9/0891 713/165 |
| 2006/0018484 A1 | 1/2006 | Yoshihiro et al. | |
| 2006/0115084 A1 | 6/2006 | Ryu | |
| 2006/0129945 A1 | 6/2006 | Dettinger et al. | |
| 2006/0156028 A1 | 7/2006 | Aoyama et al. | |
| 2007/0061567 A1* | 3/2007 | Day | H04L 9/3234 713/159 |
| 2007/0157309 A1* | 7/2007 | Bin | H04L 63/0428 726/15 |
| 2007/0177740 A1* | 8/2007 | Nakajima | G06F 21/6218 380/277 |
| 2007/0189307 A1 | 8/2007 | Overby, Jr. et al. | |
| 2008/0022361 A1 | 1/2008 | Bharadwaj et al. | |
| 2008/0307504 A1* | 12/2008 | Cisler | H04L 63/0823 726/4 |
| 2009/0100268 A1 | 4/2009 | Garcia et al. | |
| 2009/0183254 A1* | 7/2009 | Franco | G06F 21/602 726/17 |
| 2009/0235075 A1 | 9/2009 | Cho et al. | |
| 2009/0300356 A1* | 12/2009 | Crandell | H04L 9/083 713/170 |
| 2009/0319435 A1 | 12/2009 | Little, Jr. et al. | |
| 2009/0327729 A1* | 12/2009 | Rhodes | G06F 21/6218 713/171 |
| 2010/0179883 A1* | 7/2010 | Devolites | G06Q 30/0601 705/26.1 |
| 2010/0185852 A1* | 7/2010 | Ogawa | G06F 21/602 713/165 |
| 2010/0219979 A1 | 9/2010 | Ordogh | |
| 2010/0241860 A1 | 9/2010 | Hanaoka | |
| 2010/0281223 A1 | 11/2010 | Wolfe et al. | |
| 2010/0281247 A1 | 11/2010 | Wolfe et al. | |
| 2011/0141276 A1 | 1/2011 | Borghei | |
| 2011/0035598 A1 | 2/2011 | Pizano | |
| 2011/0167264 A1 | 7/2011 | Takahashi et al. | |
| 2011/0289423 A1 | 11/2011 | Kim et al. | |
| 2012/0025978 A1 | 2/2012 | Ferren et al. | |
| 2012/0072724 A1* | 3/2012 | Pizano | H04L 63/0861 713/165 |
| 2012/0143767 A1* | 6/2012 | Abadir | G06Q 20/382 705/64 |
| 2012/0210126 A1* | 8/2012 | Johnson | G06F 16/00 713/165 |
| 2012/0233455 A1 | 9/2012 | Kahler et al. | |
| 2012/0311675 A1 | 12/2012 | Ham et al. | |
| 2012/0317414 A1 | 12/2012 | Glover | |
| 2013/0046971 A1 | 2/2013 | Lu | |
| 2013/0067242 A1 | 3/2013 | Lyakhovitskiy et al. | |
| 2013/0091564 A1 | 4/2013 | Fitzgerald et al. | |
| 2013/0114812 A1 | 5/2013 | Gidwani | |
| 2013/0125223 A1 | 5/2013 | Sorotokin et al. | |
| 2013/0159707 A1* | 6/2013 | Jogand-Coulomb | G06F 21/10 713/164 |
| 2013/0252585 A1 | 9/2013 | Moshir et al. | |
| 2014/0013112 A1* | 1/2014 | Cidon | G06F 16/137 713/165 |
| 2014/0019753 A1 | 1/2014 | Lowry et al. | |
| 2014/0058951 A1 | 2/2014 | Kuppuswamy | |
| 2014/0108585 A1 | 4/2014 | Barton et al. | |
| 2014/0325215 A1 | 10/2014 | Wright | |
| 2014/0331294 A1 | 11/2014 | Ramallo et al. | |

OTHER PUBLICATIONS

Communication issued by the European Patent Office dated Jul. 20, 2017 in counterpart European Patent Application No. 15762420.6.
Communication issued by the State Intellectual Property Office of P.R. China dated Sep. 4, 2017 in counterpart Chinese Patent Application No. 201510108938.X.
Written Opinion dated May 14, 2015 issued by International Searching Authority in counterpart International Application No. PCT/KR2015/002393 (PCT/ISA/237).
International Search Report dated May 14, 2015 issued by International Searching Authority in counterpart International Application No. PCT/KR2015/002393 (PCT/ISA/220 and PCT/ISA/210).
Communication dated Apr. 23, 2018, issued by the State Intellectual Property Office of P.R. China in counterpart Chinese Application No. 201510108938.X.

* cited by examiner

FIG. 17

| DEVICE 170 | USER ID 171 | PARENT FOLDER 172 | SUB FOLDER 173 | AUTHENTICATING METHOD 174 | SECURITY LEVEL 175 | SECURITY PERIOD 176 | SECURITY PLACE 177 |
|---|---|---|---|---|---|---|---|
| DEVICE A | AAA | FOLDER A | FOLDER A-1 | ID, PW | LOW | 12:00 ~ 16:00 MON, TUE, WED | COMPANY |
| | | | FOLDER A-2 | AUTHENTICATION CERTIFICATE | HIGH | 8:00 ~ 18:00 | COMPANY |
| | | | FOLDER A-3 | OTP | HIGH | MON, TUE, WED, THUS, FRI | |
| | | FOLDER B | - | OTP, BIOLOGICAL INFORMATION | HIGH | 15:00 ~ 21:00 | HOME |
| DEVICE B | BBB | FOLDER C | - | - | - | SAT, SUN | - |
| ... | ... | ... | ... | ... | ... | ... | ... |

SYSTEM AND METHOD OF ENCRYPTING FOLDER IN DEVICE

CROSS-REFERENCE TO RELATED APPLICATION

This application is a continuation of U.S. patent application Ser. No. 15/786,193, filed on Oct. 17, 2017, which is a continuation of U.S. patent application Ser. No. 14/656,197, filed on Mar. 12, 2015, which claims priority from Korean Patent Application Nos. 10-2014-0029262, filed on Mar. 12, 2014, and 10-2014-0098625, filed on Jul. 31, 2014, in the Korean Intellectual Property Office, the disclosures of which are incorporated herein by reference in their entireties.

BACKGROUND

1. Field

Apparatuses and methods consistent with exemplary embodiments relate to a system and method of encrypting a folder in a device, whereby a user who uses the folder is authenticated via a server.

2. Description of the Related Art

Due to developments in multimedia and network technologies, devices are widely used and are developed to process various types of data and to interoperate with other devices. In general, the various types of data processed in such devices are separated into folders and are managed according to the folders, and the devices usually store important data related to users' privacy.

Accordingly, there is an increasing demand for a technique that allows a device to further securely manage data by further securely authenticating a user who uses the folders in the device.

SUMMARY

One or more exemplary embodiments provide a system and method of encrypting or decrypting a folder in a device by authenticating, via a server, a user who uses the folder.

One or more exemplary embodiments provide a system and method of encrypting or decrypting a folder in a device by using an encryption key that is associated with authentication data and is provided from a server.

One or more exemplary embodiments provide a system and method of encrypting or decrypting a folder in a device by using an updated encryption key that is provided from a server.

According to an aspect of an exemplary embodiment, there is provided a device for controlling access to a folder in the device. The device includes a communication part configured to transmit, to a server, an encryption key generation request with respect to the folder, and receive, from the server, an encryption key associated with the folder that is generated in response to the encryption key generation request, wherein the encryption key generation request comprises an identification of the folder and authentication data of a user who accesses the folder; and a controller configured to authenticate the user by using the encryption key.

The folder may be previously encrypted by using the encryption key, and the controller may be further configured to decrypt the folder by using the encryption key.

The folder may be encrypted in a manner that at least one of reference information for accessing a particular file in the folder and a file name of the particular file is encrypted.

The controller may be further configured to decrypt at least one of the encrypted reference information and the encrypted file name.

The communication part may be further configured to receive the encryption key from the server in response the user being authenticated by the server based on the authentication data.

The device may further include a display configured to display the folder. The controller may be further configured to display the folder as being empty in response to receiving, from the server, a notification indicating that the server has failed to authenticate the user.

The controller may be further configured to capture an image of the user and transmit the captured image to at least one of another preset device and the server in response to receiving, from the server, a notification indicating that the server has failed to authenticate the user a preset number of times.

The controller may be further configured to store the captured image in a preset folder in the device, depending on a network status of the device.

The controller may be further configured to obtain location information of the device in response to receiving a notification, from the server, indicating that the server has failed to authenticate the user a preset number of times, and the communication part may be further configured to transmit the location information to at least one of another preset device and the server.

The device may further include a user input part configured to receive a user input of selecting the folder. The controller may be further configured to display, in response to the user input, a graphic user interface (GUI) for receiving an input of the authentication data, and obtain the authentication data based on a user input received via the GUI.

The controller may be further configured to encrypt the folder by using the encryption key and encrypt a file which is moved into the folder as a same security level as the folder.

According to another aspect of an exemplary embodiment, there is provided a method of controlling access to a folder in a device. The method includes: transmitting, to a server, an encryption key generation request with respect to the folder, wherein the encryption key generation request comprises an identification of the folder authentication data of a user who accesses the folder is an authorized user; receiving, from the server, an encryption key associated with the folder that is generated in response to the encryption key generation request; and authenticating the user by using the encryption key.

According to another aspect of an exemplary embodiment, there is provided a non-transitory computer readable storage medium storing a program that is executable by a computer to perform the method of controlling access to the folder.

According to another aspect of an exemplary embodiment, there is provided a server for managing a security level of a folder in a client device. The server includes: a communication module configured to receive an encryption key generation request with respect to the folder from the client device, the encryption key generation request comprising an identification of the folder and authentication data of a user who accesses the folder; and a controller configured to register the authentication data and generate an encryption key associated with the folder in response to the encryption key generation request.

The communication module may be further configured to transmit the encryption key to the client device in response to the encryption key generation request.

The controller may be further configured to recognize another client device that has a same user identification as the client device, and the communication module may be further configured to transmit the encryption key to the another client device and the client device in response to the encryption key generation request from the client device.

BRIEF DESCRIPTION OF THE DRAWINGS

The above and/or other aspects will be more apparent by describing certain exemplary embodiments, with reference to the accompanying drawings, in which:

FIG. 17 illustrates a security setting table, according to an exemplary embodiment;

DETAILED DESCRIPTION

Figure 1:
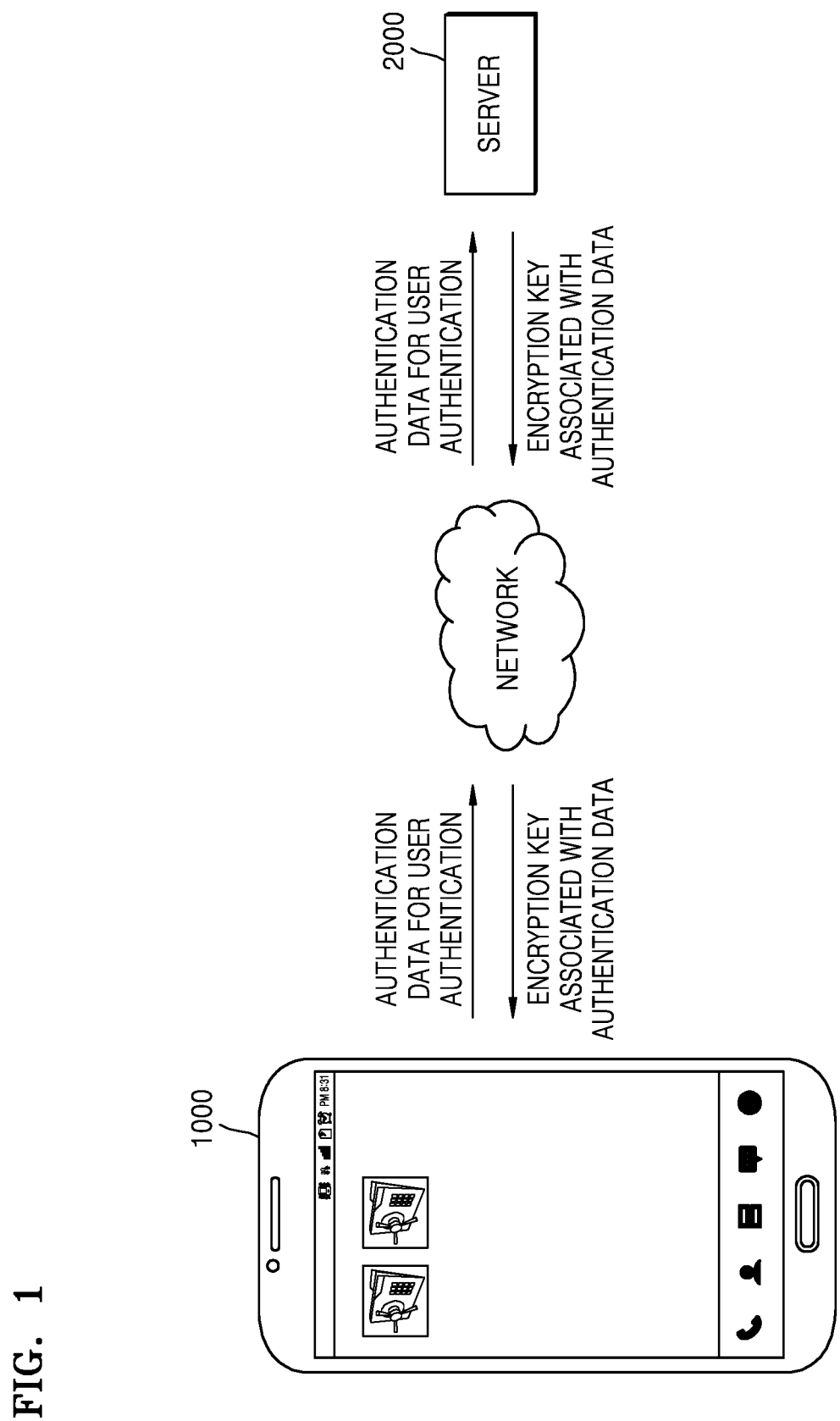
FIG. 1 illustrates an example in which a device encrypts a folder in the device by using an encryption key that is associated with authentication data and is received from a server, according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

Throughout the specification, it will also be understood that when an element is referred to as being "connected to" another element, it can be directly connected to the other element, or electrically connected to the other element while intervening elements may also be present.

Throughout the specification, the term "file system" refers to a system that stores or organizes files or documents so they may be easily retrieved and accessed in a computer. In general, the term "file system" refers to a system that manages a physical position of a file by using a medium such as a hard disk drive (HDD), a solid-state disk (SSD), or a CD-ROM capable of storing data. Also, the term "file system" may also refer to a system that manages data by providing access to data in a file server via a client that performs a network protocol (a network file system (NFS), a server message block (SMB), etc.), and a virtual system that manages data by providing access only to the data (e.g., a proc file system (procfs)). The file system may be used to store and extract data, and a plurality of pieces of data may be easily distinguished and identified therebetween via the file system.

Throughout the specification, the term "folder" refers to a unit by which files are grouped in the file system, and the folder may have a hierarchical structure. The folder is also called a 'directory' in MS-DOS and is a folder in Microsoft Windows, and may include file names and reference information of grouped files. Also, in order to support the hierarchical structure, the folder may include a subfolder. The fact that the folder includes the subfolder may mean that the folder includes a folder name and reference information of the subfolder. The device may display folders (or directories) on a screen of the device via a graphical user interface (GUI), and when a folder is selected according to a user input, files in the folder or a subfolder of the folder may be displayed on the screen of the device.

Throughout the specification, the expression "to encrypt a folder" may mean, as will be described later with reference to FIGS. 18 through 21, 1) to encrypt a name of a file or a name of a subfolder included in the folder, 2) to encrypt reference information for accessing the file or the subfolder, or 3) to encrypt contents of the file or the subfolder that is accessed by using the reference information.

Throughout the specification, the term "reference information" may correspond to information that indicates a path or an address (e.g., an index node (also, referred to as inode)) for accessing a particular file or a particular folder in a file system.

Throughout the specification, the expression "to authenticate a user of a device" may mean to authenticate a user who executes an encrypted folder in the device or to authenticate the execution of the encrypted folder in the device.

As used herein, the term "and/or" includes any and all combinations of one or more of the associated listed items. Expressions such as "at least one of," when preceding a list of elements, modify the entire list of elements and do not modify the individual elements of the list.

Hereinafter, one or more exemplary embodiments will be described more fully with reference to the accompanying drawings. Folders may be managed by a file system of a device 1000.

FIG. 1 illustrates an example in which the device 1000 encrypts a folder in the device 1000 by using an encryption key that is associated with authentication data and is received from a server 2000, according to an exemplary embodiment.

Referring to FIG. 1, the device 1000 according to the present embodiment may be connected to the server 2000 via a network so as to encrypt the folder in the device 1000. Also, the device 1000 may transmit, to the server 2000, the authentication data to be used in authenticating a user of the device 1000, and receive, from the server 2000, the encryption key that is associated with the authentication data.

Also, the server 2000 may authenticate the user by using the authentication data received from the device 1000. The server 2000 may associate the authentication data with the encryption key, store the encryption key, and manage the stored encryption key. If the device 100 includes a plurality of folders, the server 200 may provide a plurality of different encryption keys that correspond to each of the plurality of folders, respectively.

The device 1000 may be, but is not limited to, a smartphone, a tablet personal computer (PC), a PC, a smart television (TV), a mobile phone, a personal digital assistant (PDA), a laptop computer, a media player, a micro-server, a global positioning system (GPS) device, an electronic book terminal, a terminal for digital broadcasting, a navigation device, a kiosk, an MP3 player, a digital camera, and other mobile or non-mobile computing device. Also, the device 1000 may include various devices such as an electronic blackboard, a touch table, etc. that may receive a touch input. Also, the device 1000 may be a watch, glasses, a hair band, or a ring that has a communication function and a data processing function. However, examples of the device 1000 are not limited thereto, and thus, the device 1000 may include all types of devices capable of providing the authentication data to the server 2000 via the network and receiving the encryption key from the server 2000 via the network.

Also, the network may include a Local Area Network (LAN), a Wide Area Network (WAN), a Value Added Network (VAN), a mobile radio communication network, a satellite communication network, or a combination thereof, and may indicate a general-concept data communication network capable of allowing network parties shown in FIG. 1 to perform communication with one another without any problem and may include wired Internet, wireless Internet, and a mobile wireless communication network.

Figure 2:
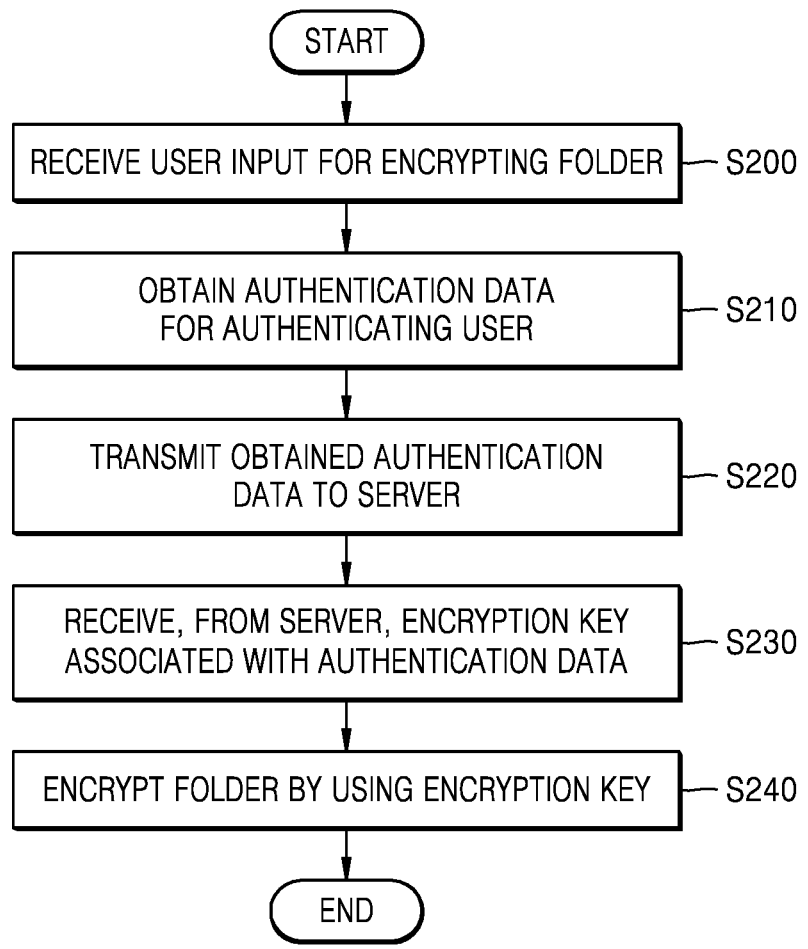
FIG. 2 illustrates encrypting a folder in the device by using an encryption key associated with authentication data, according to an exemplary embodiment.

FIG. 2 illustrates encrypting a folder in the device 1000 by using an encryption key associated with authentication data, according to an exemplary embodiment.

In operation S200, the device 1000 may receive a user input for encrypting the folder in the device 1000. The device 1000 may display the folder on a screen of the device 1000, and receive the user input of selecting the folder so as to encrypt the folder. For example, when a user selects the folder on the screen of the device 1000, a list of operations to be executed (hereinafter, referred to as the list of the execution operations) related to the selected folder may be displayed on the screen of the device 1000. Also, the device 1000 may receive a user input of selecting a field for folder encryption from the list of the execution operations. Also, the device 1000 may select the whole folder or may select some files in the folder and some subfolders of the folder.

In operation S210, the device 1000 may obtain authentication data for user authentication. That is, the device 1000 may obtain the authentication data for authenticating a user who will use the folder. The device 1000 may determine an authenticating method related to the selected folder, and may obtain the authentication data so as to request the server 2000 to authenticate the user by using the determined authenticating method. In this case, at least one authenticating method related to the selected folder may be previously set, and the device 1000 may obtain the authentication data for authenticating the user by using the preset authenticating method. The authenticating method may include, but is not limited to, an authenticating method using a one time password (OTP), an authenticating method using biological information, an authenticating method using an authentication certificate, and an authenticating method using a user identification (ID) and password. Also, the authentication data may include, but is not limited to, a password of an OTP device, the biological information, a password of the authentication certificate, and the user ID and password.

The device 1000 may display, on the screen of the device 1000, a selection list for selection of the authenticating method related to the selected folder, and receive a user input of selecting the authenticating method. However, one or more exemplary embodiments are not limited thereto, and thus, the device 1000 may determine, according to preset standards, the authenticating method related to the folder, without receiving a separate user input.

The device 1000 may display a user interface on the screen of the device 1000 so as to receive an input of the authentication data, and may obtain the authentication data, based on a user input via the user interface.

In operation S220, the device 1000 may transmit the authentication data to the server 2000. The device 1000 may transmit the authentication data to the server 2000 and thus, may request the encryption key for encryption of the folder. Also, the device 1000 may transmit, to the server 2000, an ID value and information about the authenticating method that are related to the folder selected by the device 1000.

In operation S230, the device 1000 may receive, from the server 2000, the encryption key that is associated with the authentication data. The server 2000 may associate the authentication data, which is received from the device 1000, with the user and the device 1000, and may store the authentication data. Also, the server 2000 may associate the encryption key, which is to be provided to the device 1000, with the authentication data that is received from the device 1000, and may store the encryption key. The server 2000 may provide the encryption key associated with the authentication data to the device 1000, and the device 1000 may receive the encryption key from the server 2000.

In operation S240, the device 1000 may encrypt the folder by using the received encryption key. In this case, a folder encrypting method may be preset in the device 1000. The preset folder encryption method may be used as a default setting unless a user of the device 1000 changes the default setting. Also, the device 1000 may encrypt the selected folder in the device 1000, by using the folder encrypting method that involves using the encryption key received from the server 2000. However, one or more exemplary embodiments are not limited thereto, and thus, when the device 1000 receives the encryption key from the server 2000, the device 1000 may also receive information about the folder encrypting method. In this case, the device 1000 may encrypt the selected folder in the device 1000, based on the information about the folder encrypting method that is received from the server 2000. For example, the device 1000 may encrypt at least one of reference information for accessing a folder that is managed by a file system, reference information for accessing a file in the folder that is managed by the file system, and a name of the folder and a name of the file, but one or more exemplary embodiments are not limited thereto. Also, after the device 1000 encrypts the folder, the device 1000 may discard the encryption key that was used in encrypting the folder. For example, when it is determined that the folder has been encrypted, the device 1000 may not store but may delete the encryption key that was used in encrypting the folder.

Figure 3A:
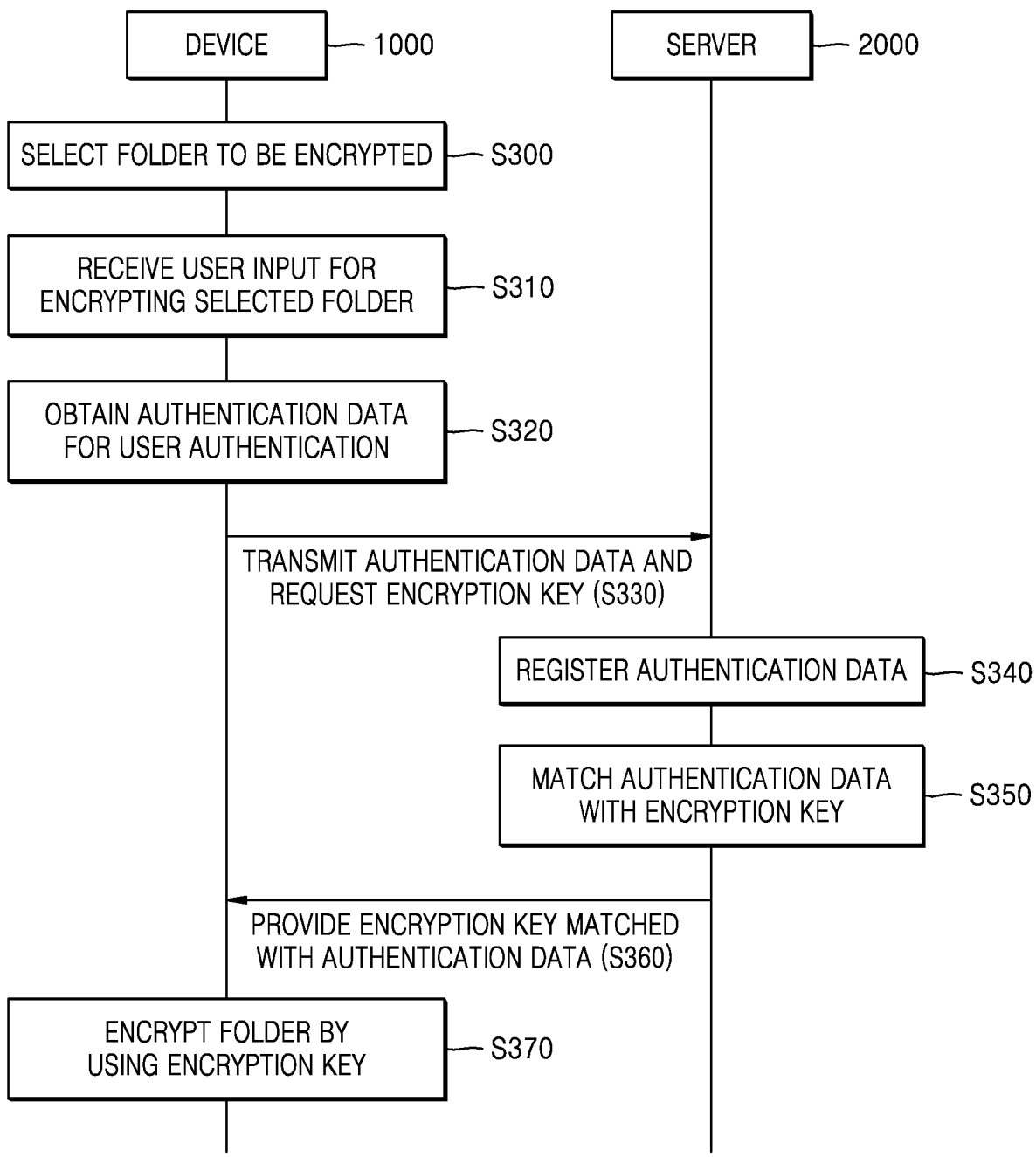
FIG. 3A illustrates registering authentication data to the server and encrypting a folder by using an encryption key that is matched with the authentication data and is received from the server, according to an exemplary embodiment.

FIG. 3A illustrates registering authentication data to the server 2000 and encrypting a folder by using an encryption key that is matched with the authentication data and received from the server 2000, according to an exemplary embodiment.

In operation S300, the device 1000 may select a folder to be encrypted. The device 1000 may display a list of folders in the device 1000 on a screen of the device 1000, and may receive a user input of selecting the folder from the list of the folders. The user input of selecting the folder may include, but is not limited to, a user input of selecting the folder by clicking a right button, a user input of selecting the folder by touching the folder over a preset time, etc. Also, the device 1000 may select the whole folder or some files and/or subfolders in the folder.

In operation S310, the device 1000 receives a user input for encrypting the folder. When the folder is selected in operation S300, the device 1000 may display a selection list of execution operations related to the folder, and receive a user input of selecting a field for folder encryption from the selection list.

Referring to operations S300 and S310, the device 1000 receives the user input of selecting the folder, and the user input of selecting the folder to be encrypted from the selection list of the execution operations related to the folder, but one or more exemplary embodiments are not limited thereto. When the device 1000 receives a user input that was preset with respect to the folder, the device 1000 may determine the received user input as a user input for selecting and encrypting the folder. For example, if a user touches or clicks the folder a preset number of times, the device 1000 may determine a received user input as a user input for selecting and encrypting the folder. Alternatively, if the user touches the folder and drags the folder with a preset pattern, the device 1000 may determine a received user input as a user input for selecting and encrypting the folder.

In operation S320, the device 1000 may obtain authentication data for user authentication. The device 1000 may determine an authenticating method related to the folder, and obtain the authentication data so as to request the server 2000 to authenticate the use by using the determined authenticating method. In this case, at least one authenticating method related to the folder may be previously set, and the device 1000 may obtain the authentication data for the user authentication by using the preset authenticating method. Alternatively, the device 1000 may display, on the screen of the device 1000, a selection list for selection of the authenticating method related to the folder, and receive a user input of selecting the authenticating method. However, one or more exemplary embodiments are not limited thereto, and thus, the device 1000 may determine, according to preset standards, the authenticating method related to the folder, without receiving a separate user input.

The device 1000 may display a user interface on the screen of the device 1000 so as to receive an input of the authentication data, and obtain the authentication data, based on a user input via the user interface. If a plurality of authenticating methods are selected with respect to the folder, the device 1000 may obtain a plurality of pieces of authentication data that correspond to the plurality of authenticating methods, respectively.

In operation S330, the device 1000 may transmit the authentication data to the server 2000, and may request an encryption key from the server 2000. Also, the device 1000 may transmit, to the server 2000, a user ID of the device 1000, an ID value of the device 1000, an ID value of the folder, and information about the authenticating method related to the folder.

In operation S340, the server 2000 may register the authentication data received from the device 1000. The server 2000 may match the authentication data received from the device 1000 with the user of the device 1000, the device 1000, the authenticating method, and the folder, and may store the matched authentication data in a database (DB) in the server 2000.

In operation S350, the server 2000 may match the authentication data with the encryption key. The server 2000 may obtain the encryption key for encrypting the folder, and may match the encryption key with the authentication data. The server 2000 may obtain the encryption key by extracting the encryption key stored in the DB in the server 2000 or by generating the encryption key.

If a preset standard with respect to folder encryption exists, the server 2000 may select an encryption key according to the preset standard, may match the selected encryption key with the authentication data, and may store the selected encryption key. For example, if an encrypting method is performed by using a symmetric-key algorithm, and an encryption level is 'high', the device 1000 may select a symmetric-key having more than a preset length as an encryption key. In this case, the server 2000 may set the selected encryption key (the selected symmetric-key) as a decryption key.

If the encrypting method is performed by using a asymmetric-key algorithm, the device 1000 may obtain an encryption key for folder encryption, separately obtain a decryption key for folder decryption, match the decryption key with the encryption key, and store the decryption key and the encryption key.

In operation S360, the server 2000 may provide the encryption key matched with the authentication data to the device 1000. The server 2000 may transmit, to the device 1000, the encryption key matched with the authentication data and information about the encrypting method.

In operation S370, the device 1000 may encrypt the folder by using the received encryption key. In this case, a folder encrypting method may be preset in the device 1000. Also, the device 1000 may encrypt the folder in the device 1000, by using the folder encrypting method the involves using the encryption key received from the server 2000. However, one or more exemplary embodiments are not limited thereto, and thus, when the device 1000 receives the encryption key from the server 2000, the device 1000 may also receive information about the folder encrypting method. In this case, the device 1000 may encrypt the folder in the device 1000, based on the information about the folder encrypting method that is received from the server 2000.

In order to encrypt the folder, the device 1000 may encrypt information about the folder in a file system of the device 1000. The device 1000 may encrypt some or all of reference information for accessing sub-data of the folder. Also, the device 1000 may encrypt some or all of a plurality of pieces of data in the folder.

Although FIG. 3A illustrates that the encryption key is provided only to the device 1000 (operation S360) that transmits the authentication data and the request for the encryption key to the server 2000 (operation S330), the present embodiment is not limited thereto. If the user of the device owns a plurality of devices capable of being connected to the server 2000 wirelessly or via wire, the encryption key may be transmitted to the plurality of devices as well so that an encryption state of the plurality of devices may be synchronized with the server 2000 and the device 1000. The plurality of devices may be registered in the server 2000 under the same user ID and password as the device 100. The server 2000 may be able to recognize that the user of the device 100 owns the plurality of the devices based on the registered user ID and password.

Figure 3B:
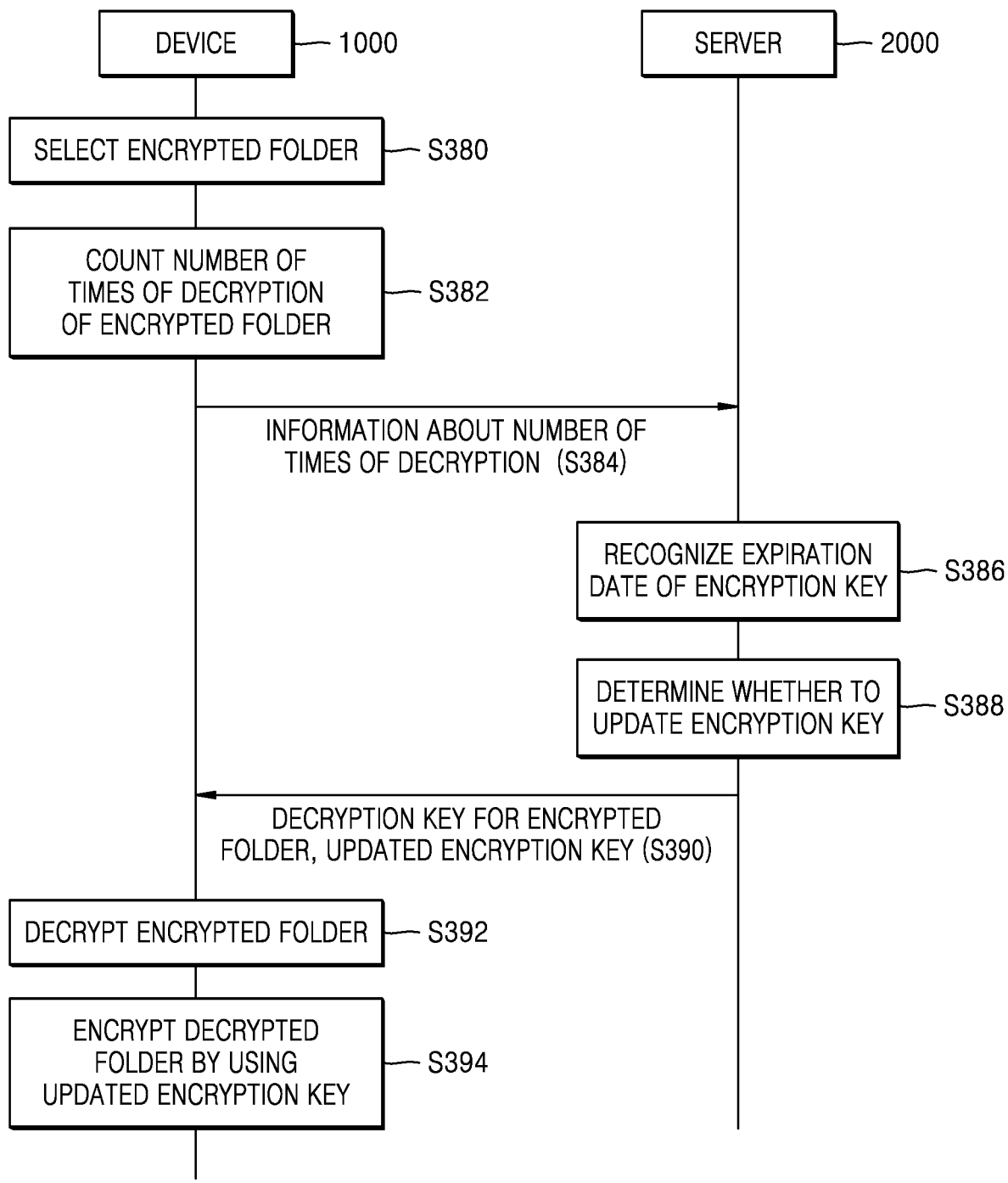
FIG. 3B illustrates updating an encryption key for an encrypted folder, according to an exemplary embodiment.

FIG. 3B illustrates updating an encryption key for an encrypted folder, according to an exemplary embodiment.

In operation S380, the device 1000 may select the encrypted folder, and in operation S382, the device 1000 may count the number of times of decryption of the encrypted folder. For each encrypted folder, the device 1000 may count how many times the encrypted folder has been decrypted.

In operation S384, the device 1000 may transmit information about the number of times of decryption to the server 2000. The device 1000 may transmit an ID value of the encrypted folder and the counted number of times to the server 2000.

In operation S386, the server 2000 may recognize an expiration date of an encryption key for the encrypted folder. The expiration date of the encryption key for the encrypted folder may be preset by the device 1000 or the server 2000.

For example, the expiration date may be a particular period from a time when the folder was encrypted, but one or more exemplary embodiments are not limited thereto. The expiration date may be reset when the server 2000 receives the ID value of the encrypted folder from the device 1000.

In operation S388, the server 2000 may determine whether to update the encryption key for the encrypted folder. In more detail, the server 2000 may determine whether to update the encryption key for the encrypted folder, based on at least one of the number of times of decryption of the encrypted folder and the recognized expiration date. For example, if the number of times of decryption of the encrypted folder is greater than the preset number of times, the server 2000 may determine to update the encryption key for the encrypted folder. As another example, a period from a time when the folder was encrypted to a current time is greater than the recognized expiration date, the server 2000 may determine to update the encryption key for the encrypted folder. However, a reference by which the server 2000 determines whether to update the encryption key for the encrypted folder is not limited to the aforementioned description, and the server 2000 may determine whether to update the encryption key for the encrypted folder, based on various references.

In operation S390, the server 2000 may transmit a decryption key for the encrypted folder and an updated encryption key to the device 1000. The server 2000 may extract the decryption key for the encrypted folder from a DB. The decryption key for the encrypted folder may be same as an encryption key that was used in encrypting the folder, but one or more exemplary embodiments are not limited thereto.

Also, the server 2000 may generate the updated encryption key or may extract the updated encryption key from the DB. The updated encryption key may be associated with the folder and then stored in the DB.

In operation S392, the device 1000 may decrypt the encrypted folder. The device 1000 may receive the decryption key for the encrypted folder from the server 2000, and decrypt the encrypted folder by using the decryption key.

In operation S394, the device 1000 may encrypt the decrypted folder by using the updated encryption key. After the device 1000 encrypts the decrypted folder by using the updated encryption key, the device 1000 may notify the server 2000 that the decrypted folder is encrypted by using the updated encryption key. Also, the device 1000 may discard the updated encryption key.

Figure 4:
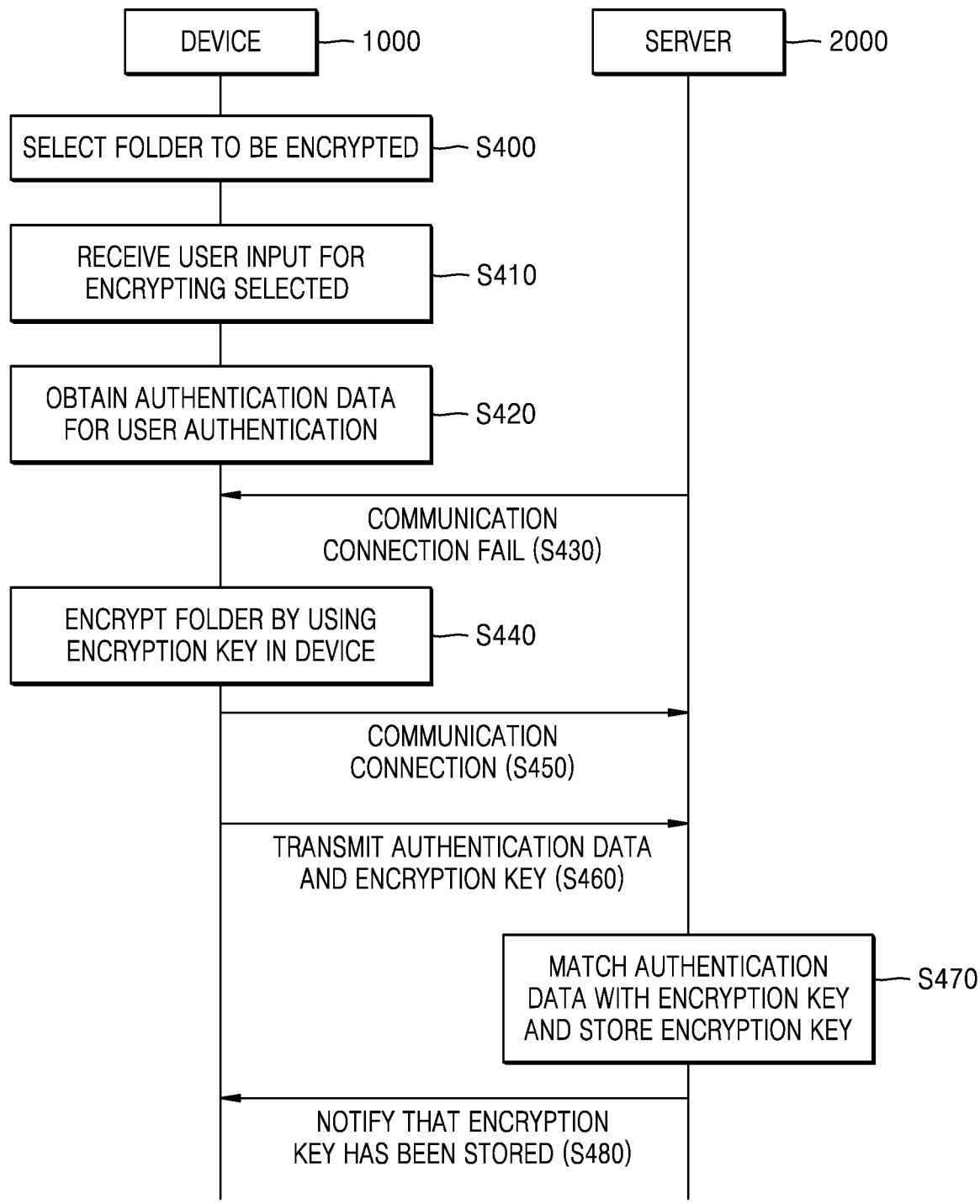
FIG. 4 illustrates an example in which, when communication connection between the device and the server fails, the device encrypts a folder in the device, according to an exemplary embodiment.

FIG. 4 illustrates an example in which, when communication connection between the device 1000 and the server 2000 fails, the device 1000 encrypts a folder in the device 1000, according to an exemplary embodiment.

Operations S400 through S420 of FIG. 4 correspond to operations S300 through S320 of FIG. 3, thus, detailed descriptions about operations S400 through S420 of FIG. 4 are omitted here.

In operation S430, communication connection between the device 1000 and the server 2000 may fail. If a network between the device 1000 and the server 2000 is unstable or is not established, the communication connection between the device 1000 and the server 2000 may fail.

In operation S440, the device 1000 may encrypt a folder by using an encryption key in the device 1000. As the communication connection between the device 1000 and the server 2000 fails, the device 1000 may encrypt the folder by using the encryption key in the device 1000. In this case, the device 1000 may determine the encryption key for encryption of the folder, based on a preset encrypting method, and may encrypt the folder by using the determined encryption key. The device 1000 may encrypt the folder by using the encryption key that is stored in the device 1000. Alternatively, the device 1000 may generate the encryption key and may encrypt the folder by using the generated encryption key.

The device 1000 may store the encrypted folder as a backup in the server 2000, and may delete the encrypted folder from the device 1000. For example, the device 1000 may delete files in the encrypted folder and a subfolder of the encrypted folder. In this case, the device 1000 may receive, from the server 2000, the encrypted folder that is stored as the backup in the server 2000, and may use the encrypted folder. However, one or more exemplary embodiments are not limited thereto.

In operation S450, the device 1000 may be connected with the server 2000 for communication. When the network between the device 1000 and the server 2000 becomes stable, the device 1000 may be connected with the server 2000 for communication.

In operation S460, the device 1000 may transmit authentication data and the encryption key to the server 2000. Also, the device 1000 may transmit information about the encrypting method for the encrypted folder to the server 2000. For example, the device 1000 may transmit, to the server 2000, the information indicating whether the folder was encrypted by using a symmetric-key algorithm or an asymmetric-key algorithm. Also, the device 1000 may transmit a decryption key for decryption of the encrypted folder to the server 2000. The decryption key may be same as or different from the encryption key.

In operation S470, the server 2000 may match the authentication data with the encryption key and store the encryption key. Also, the server 2000 may match the authentication data and the encryption key with a user of the device 1000, the device 1000, the encrypting method, and the encrypted folder.

If the encrypting method is performed by using the symmetric-key algorithm, the server 2000 may set the received encryption key as the decryption key. Alternatively, if the encrypting method is performed by using the asymmetric-key algorithm, the server 2000 may match a separate decryption key with the encryption key and store the decryption key and the encryption key.

In operation S480, the server 2000 may notify the device 1000 that the encryption key has been stored.

Figure 5:
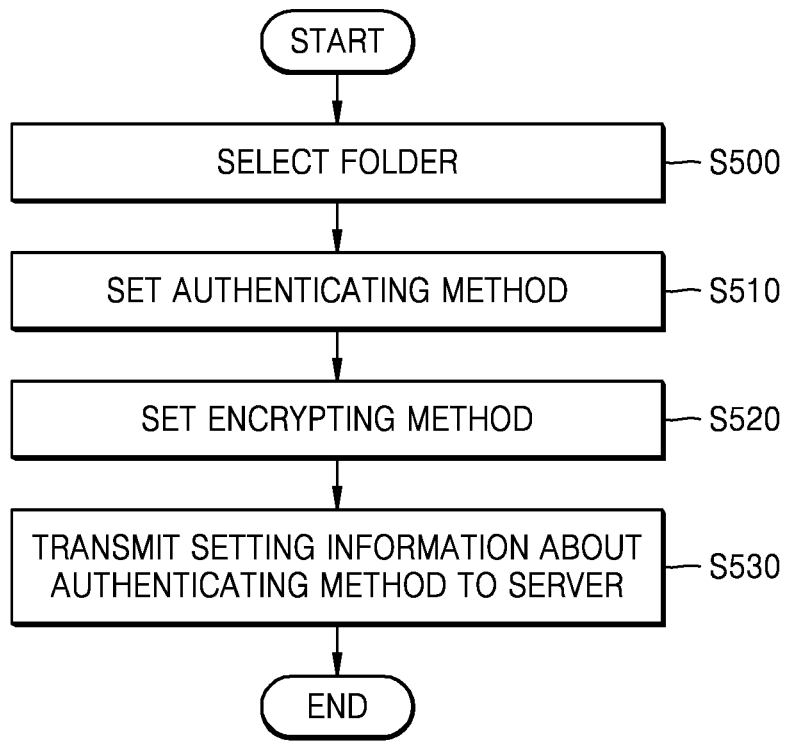
FIG. 5 illustrates setting an authenticating method for user authentication and an encrypting method for folder encryption, according to an exemplary embodiment.

FIG. 5 illustrates setting an authenticating method for user authentication and an encrypting method for folder encryption, according to an exemplary embodiment.

In operation S500, the device 1000 selects a folder for which the authenticating method is to be set. The device 1000 may display, on a screen of the device 1000, a user interface for receiving a user input of setting the authenticating method, and select a particular folder, based on a user input of selection.

In operation S510, the device 1000 may set the authenticating method for the selected folder. The device 1000 may select, based on the user input, at least one authenticating method for the selected folder. The authenticating method may include an authenticating method using an OTP device, an authenticating method using a user ID and password, an authenticating method using an authentication certificate that was issued to the user, and an authenticating method using biological information of the user.

In operation S520, the device 1000 may set the encrypting method for the selected folder. The device 1000 may set a length of an encryption key and the encrypting method for the selected folder. Also, the device 1000 may set a condition for encryption of the folder.

In operation S530, the device 1000 may transmit setting information about the authenticating method and the encrypting method to the server 2000. The device 1000 may transmit, to the server 2000, the setting information about the authenticating method for the selected folder, and authentication data associated with the selected encrypting method. Also, the device 1000 may transmit the setting information about the encrypting method for the selected folder to the server 2000.

Figure 6:
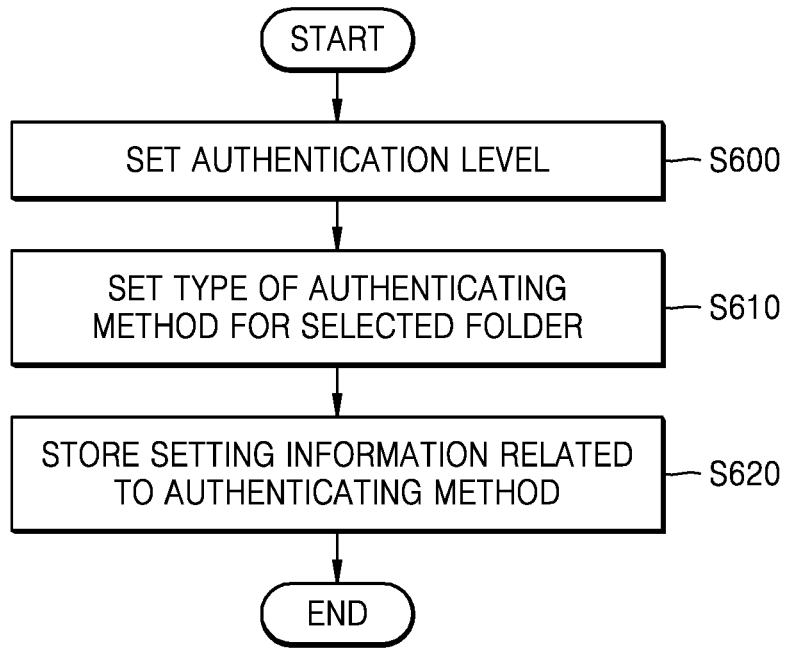
FIG. 6 is a flowchart of a method of setting an authenticating method for user authentication, the method performed by the device, according to an exemplary embodiment.

FIG. 6 illustrates setting an authenticating method for user authentication, according to an exemplary embodiment.

In operation S600, the device 1000 may set an authentication level of a selected folder. The device 1000 may display a selection list for setting the authentication level on a screen of the device 1000. Also, the device 1000 may determine the authentication level of the selected folder, based on a user input of selection via a user interface.

For example, 'high', 'middle', and 'low' may be displayed on the selection list for setting the authentication level, and the device 1000 may determine, based on a user input of selecting 'middle', the authentication level of the selected folder as 'middle'.

In operation S610, the device 1000 may set a type of the authenticating method for the selected folder. The device 1000 may display a selection list for setting the type of the authenticating method on the screen of the device 1000. Alternatively, the device 1000 may determine the authenticating method for the selected folder, based on a user input of selection via a user interface.

For example, the selection list for setting the type of the authenticating method may display at least one of 'a method using an OTP device', 'a method using a user ID/password', 'a method using an authentication certificate', and 'a method using biological information'.

Also, according to the authentication level determined in operation S600, the device 1000 may determine types and the number of encrypting methods to be included in the selection list for setting the type of the authenticating method.

In operation S620, the device 1000 may store setting information related to the authenticating method. The device 1000 may store the setting information related to the authenticating method in at least one of the device 1000, the server 2000, and another device of the user.

Figure 7:
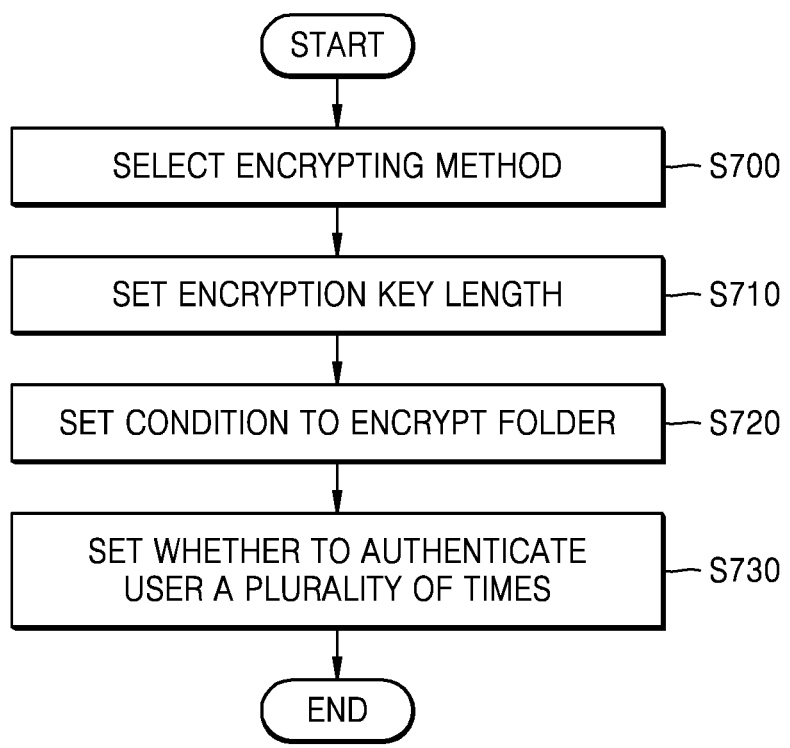
FIG. 7 illustrates setting a security level of folder encryption, according to an exemplary embodiment.

FIG. 7 illustrates setting a security level of folder encryption, according to an exemplary embodiment.

In operation S700, the device 1000 may select an encrypting method. For example, the device 1000 may select at least one of a symmetric-key algorithm and an asymmetric-key algorithm. However, one or more exemplary embodiments are not limited thereto, and the device 1000 may select one of various encrypting methods.

In operation S710, the device 1000 may set an encryption key length. When the encryption key length is set, an encryption key to be used in encrypting a folder may be determined according to the set encryption key length.

In operation S720, the device 1000 may set a condition to encrypt the folder. The device 1000 may set a security period and a security place for a selected folder. Also, the device 1000 may set an exceptional security period and an exceptional security place in which security is not applied to the selected folder. Also, the device 1000 may set a circumstance in which an authentication procedure is required for a user to access the selected folder. For example, the device 1000 may set a circumstance in which, in 10:00 a.m. through 18:00 p.m. of every Monday, the user can access the selected folder only after the user passes the authentication procedure. Also, as another example, the device 1000 may set a circumstance in which, when the device 1000 is located near a company, the user can access the selected folder only after the user passes the authentication procedure.

Also, the device 1000 may set a circumstance in which the authentication procedure is not required for the user to access the selected folder. For example, the device 1000 may set a circumstance in which, on every Sunday, the user may access the selected folder without the authentication procedure. As another example, the device 1000 may set a circumstance in which, when the device 1000 is located near home, the user may access the selected folder without the authentication procedure.

In operation S730, the device 1000 may set whether to authenticate the user a plurality of times. In order to allow the user to read an encrypted folder, the device 1000 may set whether the user is authenticated only by the server 2000 or is authenticated by each of the device 1000 and the server 2000. Also, in order to allow a plurality of users to read an encrypted folder, the device 1000 may set an user authentication condition by which the plurality of users have to be authenticated. In this case, authentication data for each of the plurality of users may be registered in the device 1000 or the server 2000.

FIGS. 8 through 15 illustrate examples in which the device 1000 sets a encrypting method for a folder in the device 1000, and encrypts the folder, according to exemplary embodiments.

Figure 8:
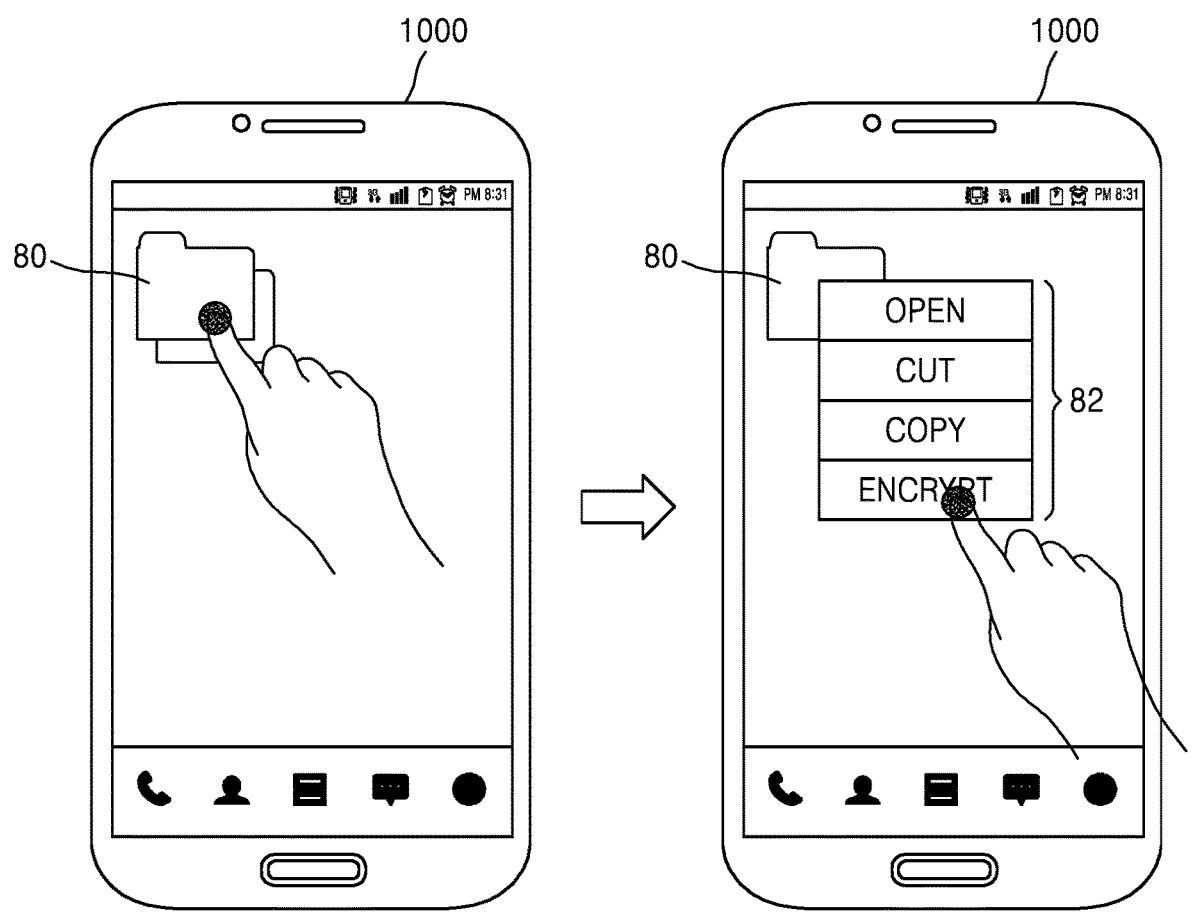
FIG. 8 illustrates an example in which the device receives a user input of selecting and encrypting a folder in the device, according to an exemplary embodiment.

FIG. 8 illustrates an example in which the device 1000 receives a user input of selecting and encrypting a folder in the device 1000, according to an exemplary embodiment.

Referring to FIG. 8, the device 1000 may display a folder 80 on a screen of the device 1000. Also, when the folder 80 displayed on the screen of the device 1000 is selected by a user, the device 1000 may display a list of execution operations 82 related to the folder 80. Afterward, the device 1000 may receive a user input of selecting "encrypt" from the list of execution operations 82.

Figure 9:
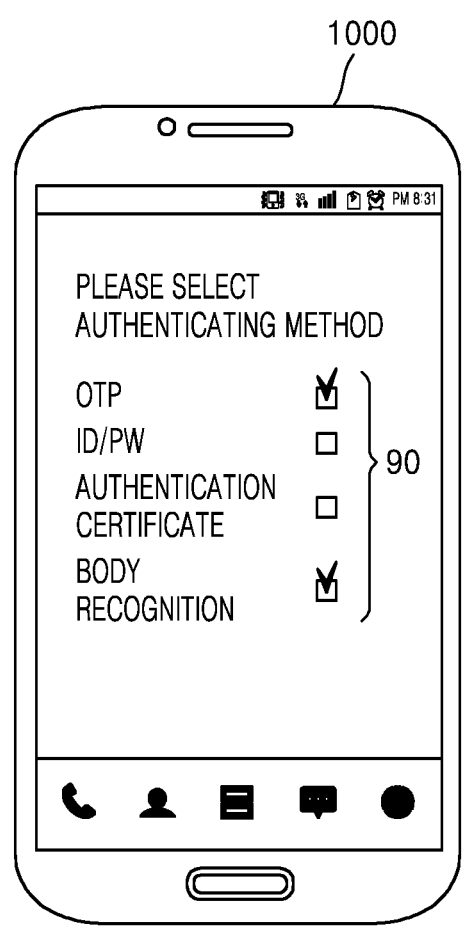
FIG. 9 illustrates an example in which the device displays a list of authenticating methods for authentication of a user who uses a folder, according to an exemplary embodiment.

FIG. 9 illustrates an example in which the device 1000 displays a list of authenticating methods 90 for authentication of a user who uses a folder, according to an exemplary embodiment.

Referring to FIG. 9, when the device 1000 receives the user input of selecting "encrypt" from the list of execution operations 82 shown in FIG. 8, the device 1000 may display the list of authenticating methods 90 related to the folder. The list of authenticating methods 90 related to the folder may be preset in the device 1000. Also, the list of authenticating methods 90 may include "OTP", "ID/PW", "authentication certificate", and "body recognition". For example, the device 1000 may select, based on a user input, "OTP" and "body recognition" from the list of authenticating methods 90.

Figure 10:
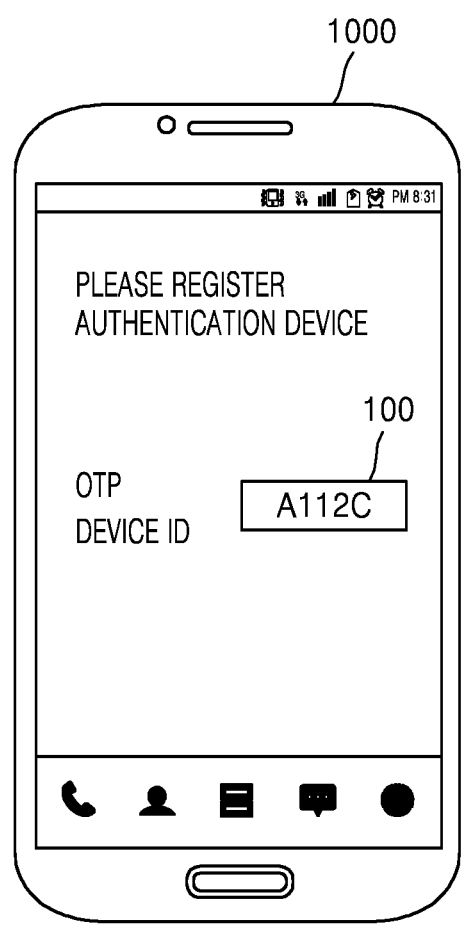
FIG. 10 illustrates an example in which the device registers an identification (ID) of a one time password (OTP) device in the server, according to an exemplary embodiment.

FIG. 10 illustrates an example in which the device 1000 registers an ID of an OTP device in the server 2000, according to an exemplary embodiment.

Referring to FIG. 10, when "OTP" is selected from the list of authenticating methods 90 shown in FIG. 9, the device 1000 may display, on the screen of the device 1000, an input field 100 for registration of an OTP device of a user in the server 2000. The device 1000 may receive a user input of an ID of the OTP device via the input field 100, and transmit the ID of the OTP device to the server 2000.

When the OTP device of the user is registered in the server 2000, the device 1000 may request the server 2000 for user authentication by using a password as authentication data, wherein the password is generated in real-time by the OTP device.

Figure 11:
FIG. 11 illustrates an example in which the device registers fingerprint information as authentication data in the server, according to an exemplary embodiment.

FIG. 11 illustrates an example in which the device 1000 registers fingerprint information as authentication data in the server 2000, according to an exemplary embodiment.

Referring to FIG. 11, when "OTP" is selected from the list of authenticating methods 90 shown in FIG. 9, the device 1000 may display a message "Please input your fingerprint" on the screen of the device 1000. The device 1000 may receive a user input of a fingerprint, and transmit the fingerprint of a user to the server 2000.

Figure 12:
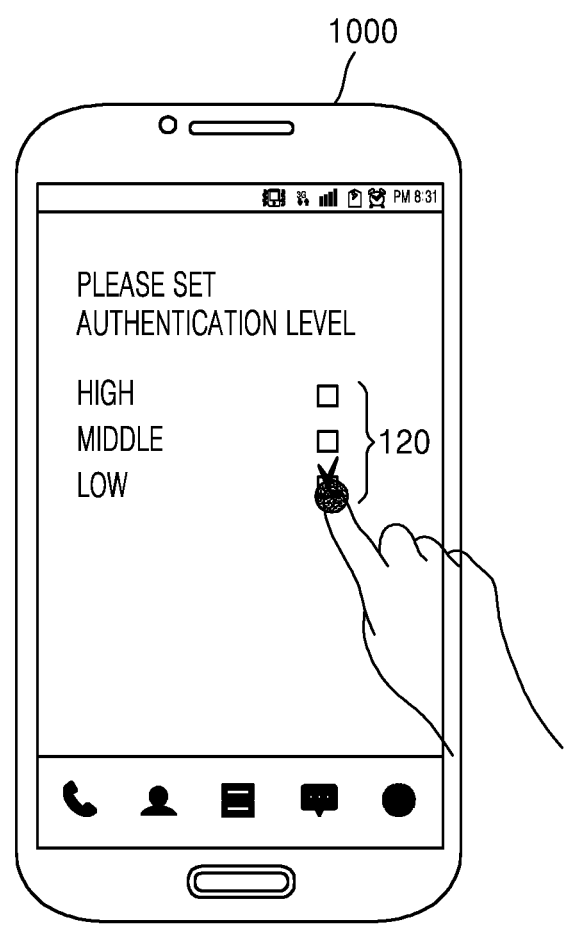
FIG. 12 illustrates an example in which the device sets an encryption level of a folder, according to an exemplary embodiment.

FIG. 12 illustrates an example in which the device 1000 sets an encryption level of a folder, according to an exemplary embodiment.

Referring to FIG. 12, the device 1000 may display a selection list 120 for setting an authentication level on the screen of the device 1000. The selection list 120 may show "high", "middle", and "low".

The device 1000 may receive a user input of selecting "low" from the selection list 120, and determine an authentication level of a selected folder, as "low".

Figure 13:
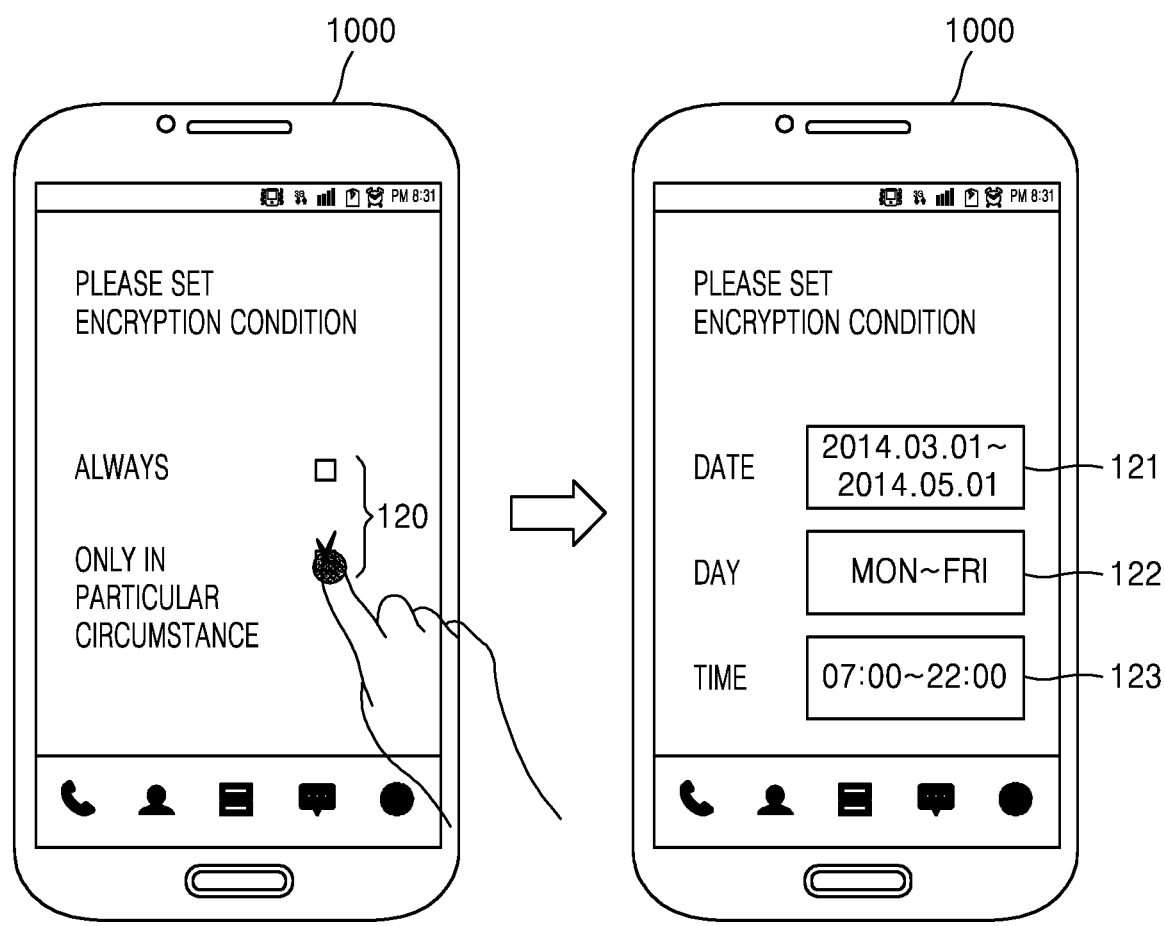
FIG. 13 illustrates an example in which the device sets an encryption condition, according to an exemplary embodiment.

FIG. 13 illustrates an example in which the device 1000 sets an encryption condition, according to an exemplary embodiment.

Referring to FIG. 13, the device 1000 may display a selection list 120 for selecting an encryption condition. For example, the selection list 120 may include "always" and "only in a particular circumstance". Then, the device 1000 may select "only in a particular circumstance" from the selection list 120, based on a user input.

When "only in a particular circumstance" is selected from the selection list 120, the device 1000 may display input fields 121, 122, and 123 for receiving inputs of particular conditions of the encryption condition. For example, the device 1000 may display the input field 121 for receiving an input of a weather condition, the input field 122 for receiving an input of a date condition, and the input field 123 for receiving an input of a time condition.

Also, the device 1000 may receive values that are input by a user via the input fields 121, 122, and 123, and thus, set the particular conditions of the encryption condition.

Figure 14:
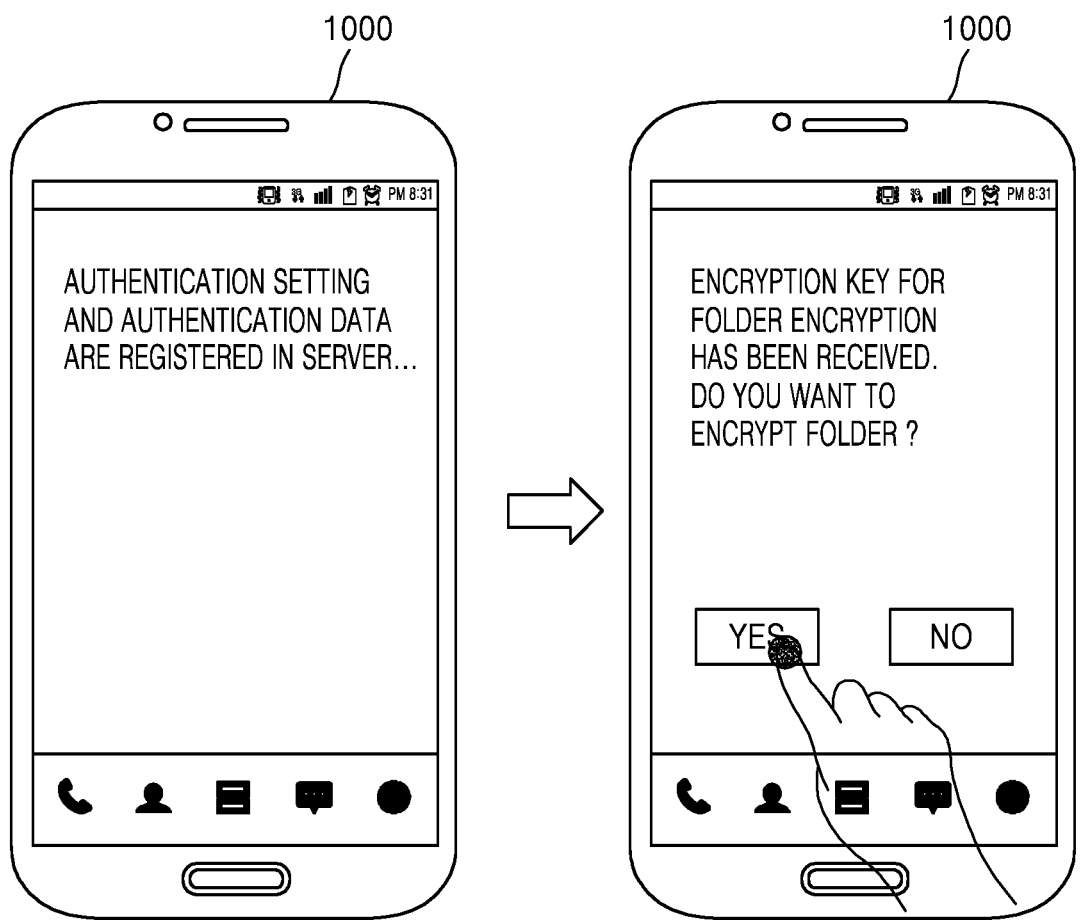
FIG. 14 illustrates an example in which the device registers authentication data in the server, and receives an encryption key matched with the authentication data from the server, according to an exemplary embodiment.

FIG. 14 illustrates an example in which the device 1000 registers authentication data in the server 2000, and receives an encryption key matched with the authentication data from the server 2000, according to an exemplary embodiment.

Referring to FIG. 14, when the particular conditions of the encryption condition are set, the device 1000 may transmit information about the authentication data and authentication setting to the server 2000, and request the server 2000 for the encryption key. Also, the device 1000 may display a message "authentication setting and authentication data are registered in server" on the screen of the device 1000.

When the authentication data is registered in the server 2000, the device 1000 may receive, from the server 2000, the encryption key that is matched with the authentication data. The device 1000 may receive the encryption key from the server 2000, and display a message "Encryption key for folder encryption has been received. Do you want to encrypt a folder?" on the screen of the device 1000. Also, the device 1000 may receive a user input for the folder encryption.

Figure 15:
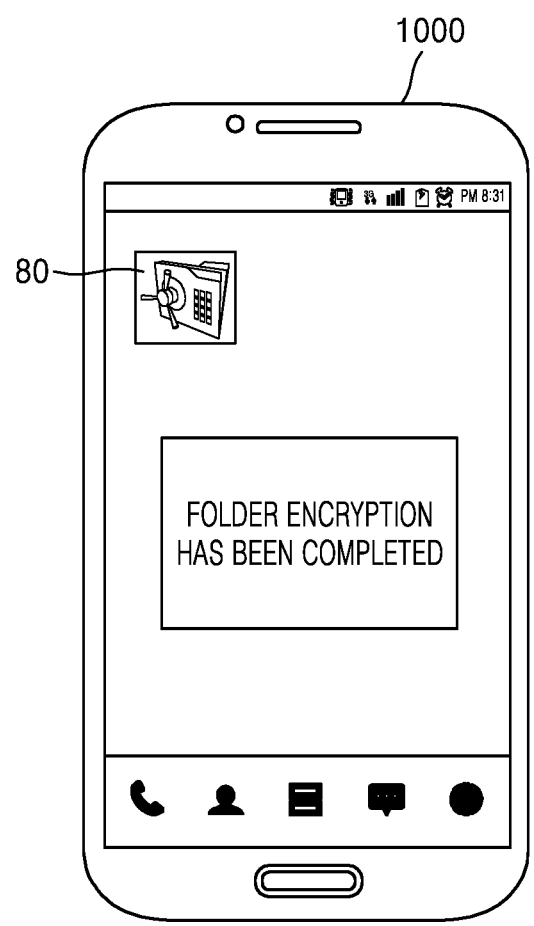
FIG. 15 illustrates an example in which the device encrypts a folder, according to an exemplary embodiment.

FIG. 15 illustrates an example in which the device 1000 encrypts a folder, according to an exemplary embodiment.

Referring to FIG. 15, when the user input for the folder encryption is received, the device 1000 may encrypt the folder by using the encryption key that is received from the server 2000. Also, the device 1000 may display a message "Folder encryption has been completed" on the screen of the device 1000.

Figure 16:
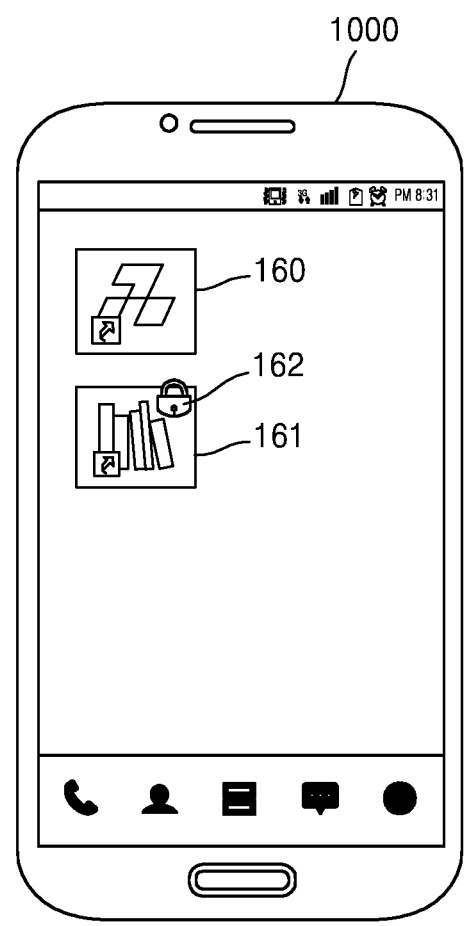
FIG. 16 illustrates an example in which the device displays a shortcut icon for executing a file in an encrypted folder, according to an exemplary embodiment.

FIG. 16 illustrates an example in which the device 1000 displays a shortcut icon for executing a file in an encrypted folder, according to an exemplary embodiment.

Referring to FIG. 16, the device 1000 may display, on the screen of the device 1000, shortcut icons 160 and 161 for executing particular files, respectively. An executable file that is linked to the shortcut icon 161 may be included in the encrypted folder. In this case, the device 1000 may display, on the shortcut icon 161, an object 162 indicating that the executable file linked to the shortcut icon 161 is included in the encrypted folder.

FIG. 17 illustrates a security setting table, according to an exemplary embodiment.

When an authenticating method and an encrypting method are set by the device 1000, the security setting table may be generated by the device 1000 or the server 2000. Also, the security setting table may be stored in the device 1000 or the server 2000.

Referring to FIG. 17, the security setting table may include a device field 170, a user ID field 171, a parent folder field 172, a subfolder field 173, an authenticating method field 174, a security level field 175, a security period field 176, and a security place field 177.

In the device field 170, an ID value of the device 1000 that stores a folder may be recorded, and in the user ID field 171, an ID value of a user of the device 1000 may be recorded. For example, 'Device A' and 'Device B' may be stored in the device field 170, and 'AAA' corresponding to 'Device A' and 'BBB' corresponding to 'Device B' may be stored in the user ID field. However, the present embodiment is not limited thereto, and 'AAA' instead of 'BBB' may be stored in the user ID field as corresponding to 'Device B'. In that case, a device corresponding to 'Device B' may be able to download data which is associated with a device corresponding to 'Device A', including information on folders, subfolders, authentication methods, security levels, security periods, and security places, from the server 2000.

In the parent folder field 172, an ID value of a parent folder may be recorded. For example, 'folder A', 'folder B', and 'folder C' may be recorded to the parent folder field 172.

In the subfolder field 173, an ID value of a subfolder may be recorded. For example, 'folder A-1', 'folder A-2', and 'folder-A-3' may be recorded as subfolders of 'folder A' to the subfolder field 173.

Also, in the authenticating method field 174, an ID value of an authenticating method that corresponds to the folder may be recorded. For example, in the authenticating method field 174, the ID value that indicates the authenticating method using at least one of an ID/PW, an authentication certificate, an OTP, and biological information may be recorded.

In the security level field 175, a value indicating a security level of the folder may be recorded. For example, 'high' or 'low' may be recorded in the security level field 175.

In the security period field 176, a period during which the folder is secured may be recorded. During the security period recorded in the security period field 176, the user may have to pass an authentication procedure so as to access the folder in the device 1000.

In the security place field 177, a place in which security is applied to the folder may be recorded. If the device 1000 is located in the place recorded in the security place field 177, the device 1000 may perform an authentication procedure via the server 2000 so as to allow the user to access the folder.

The server 2000 may manage, by using the security setting table shown in FIG. 17, various settings related to encryption and decryption of the folder in the device 1000.

FIGS. 18 through 21 illustrate examples in which the device 1000 encrypts a folder, according to exemplary embodiments.

Figure 18:
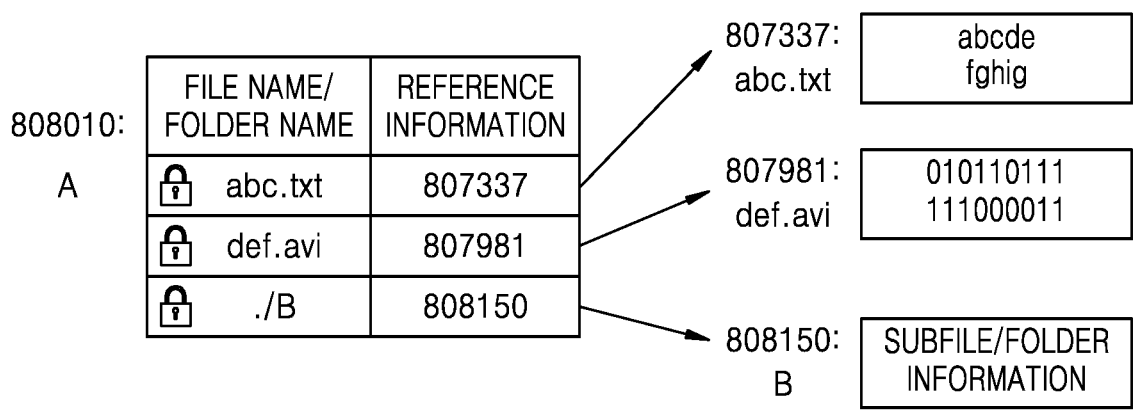
FIGS. 18 through 21 illustrate examples in which the device encrypts a folder, according to exemplary embodiments.
Figure 19:
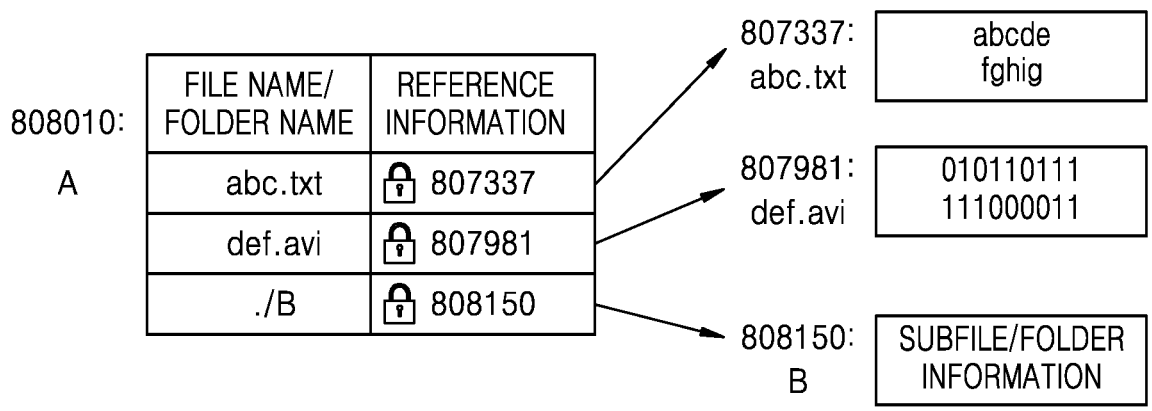

Referring to FIGS. 18 and 19, the device 1000 may encrypt information about the folder in a file system in the device 1000. Referring to FIG. 18, the device 1000 may encrypt a name of a file in the folder or a name of a subfolder of the folder. For example, the device 1000 may encrypt names of files 'abc.txt' and 'def.avi' in a folder A, and a name of a subfolder B of the folder A. If the device 1000 has encrypted the name of the file in the folder and the name of the subfolder of the folder, the name of the file in the folder and the name of the subfolder of the folder may not be displayed without user authentication.

The device 1000 may encrypt some or all of names of subfolders of the folder and names of files in the folder. Referring to FIG. 19, the device 1000 may encrypt a plurality of pieces of information about links for accessing a plurality of pieces of data in the folder. For example, the device 1000 may encrypt reference information indicating a link for accessing a file 'abc.txt' in the folder A, reference information indicating a link for accessing a file 'def.avi' in the folder A, and reference information indicating a link for accessing the subfolder B of the folder A.

When only reference information indicating a link for accessing the file in the folder and reference information indicating a link for accessing the subfolder of the folder are encrypted, the names of the file and the subfolder are displayed in the folder but access to the file and the subfolder may not be possible without user authentication.

The device 1000 may encrypt some or all of links for subfolders and files in the folder.

Figure 20:
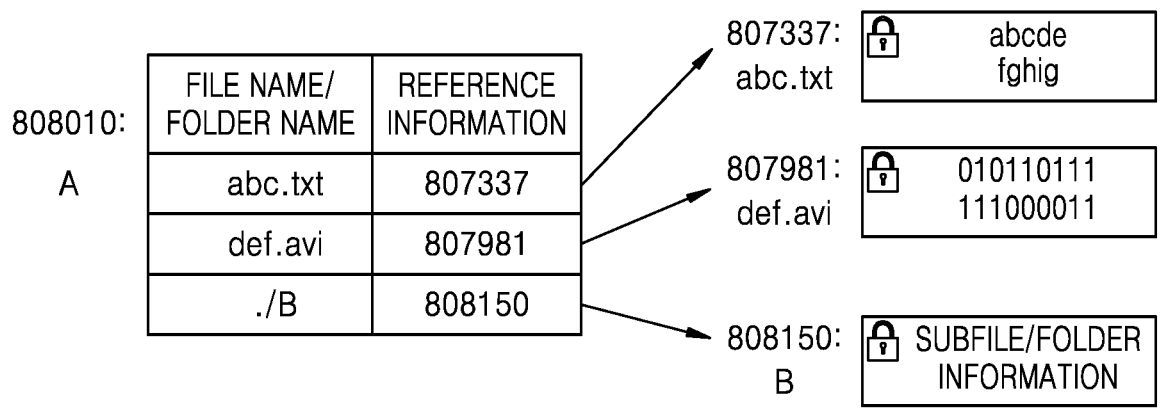

As illustrated in FIG. 20, the device 1000 may encrypt files in a folder and subfolders of the folder. Referring to FIG. 20, the device 1000 may encrypt together the files in the folder and the subfolders of the folder. For example, the device 1000 may encrypt files 'abc.txt' and 'def.avi' in a folder A and a subfolder B of the folder A. If the file and the subfolder are encrypted, names of the file and the subfolder may be displayed in the folder but the file and the subfolder may not be executed without user authentication.

When the device 1000 encrypts the folder, the encryption may include 1) encrypting the name of the file in the folder or the name of the subfolder of the folder, 2) encrypting reference information for accessing the file or the subfolder, 3) encrypting the file or the subfolder that is accessed by using the reference information, or a combination of 1), 2), and 3).

Figure 21:
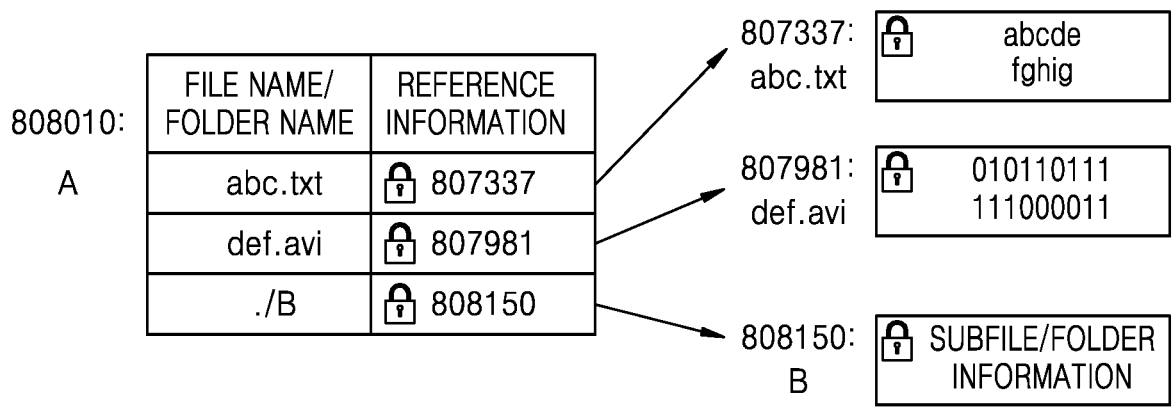

For example, as illustrated in FIG. 21, the device 1000 may encrypt i) two pieces of reference information about a file and a subfolder in a folder A of the device 1000, and ii) the file and the subfolder in the folder A.

Figure 22:
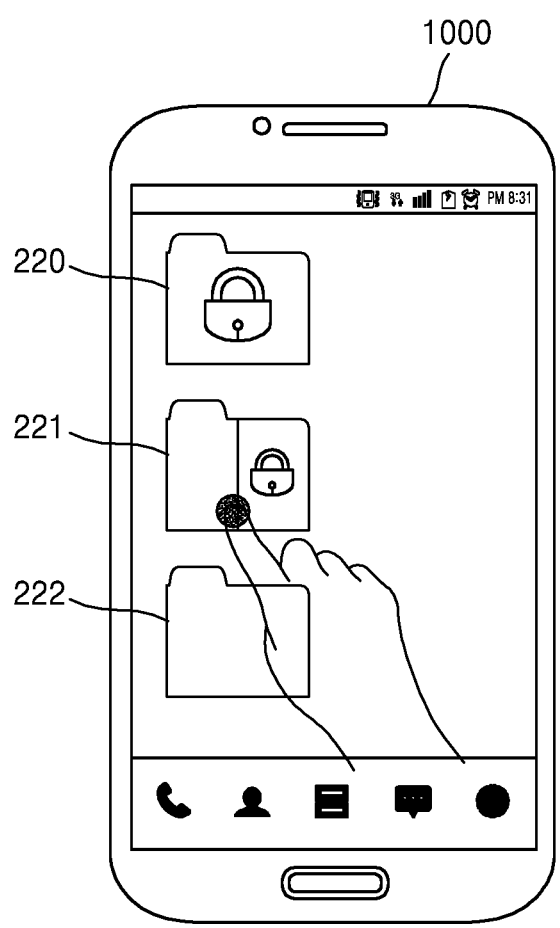
FIG. 22 illustrates an example in which the device displays an encrypted folder on a screen of the device, according to an exemplary embodiment.

FIG. 22 illustrates an example in which the device 1000 displays an encrypted folder on a screen of the device 1000, according to an exemplary embodiment.

Referring to FIG. 22, a folder 220 indicates a wholly-encrypted folder, a folder 221 indicates a folder in which some of a plurality of pieces of data in the folder are encrypted, and a folder 222 indicates a non-encrypted folder.

For example, the device 1000 may receive a user input of selecting the folder 221.

Figure 23:
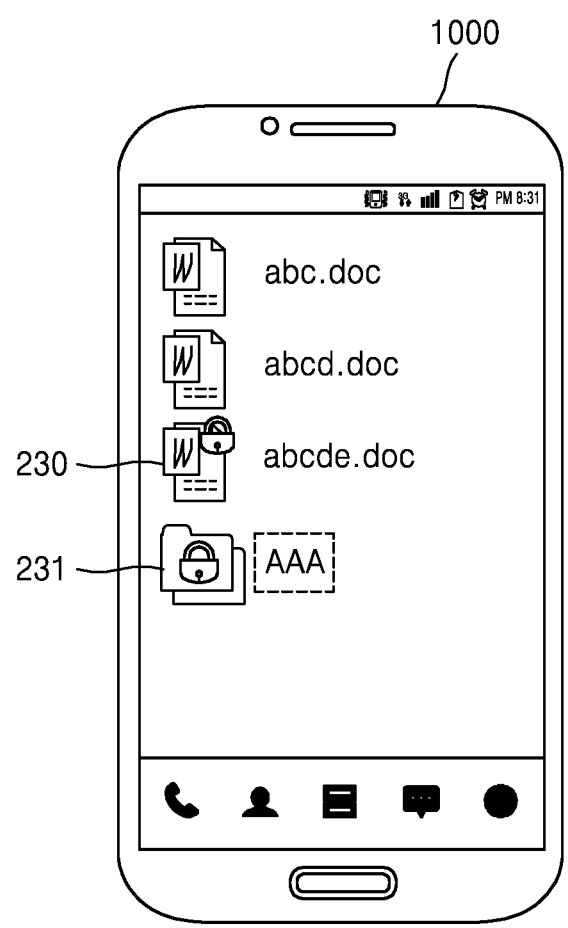
FIG. 23 illustrates an example in which the device displays, on a screen of the device, an encrypted file and non-encrypted files in a folder, and a subfolder of the folder, according to an exemplary embodiment.

FIG. 23 illustrates an example in which the device 1000 displays, on a screen of the device 1000, an encrypted file and non-encrypted files in a folder, and a subfolder of the folder, according to an exemplary embodiment.

Referring to FIG. 23, when the folder 221 is selected in FIG. 22, the device 1000 may display files in the selected folder and a subfolder of the selected folder. Also, a file 230 indicates an encrypted file in the folder 221, and a folder 231 indicates the subfolder of the folder 221.

Figure 24:
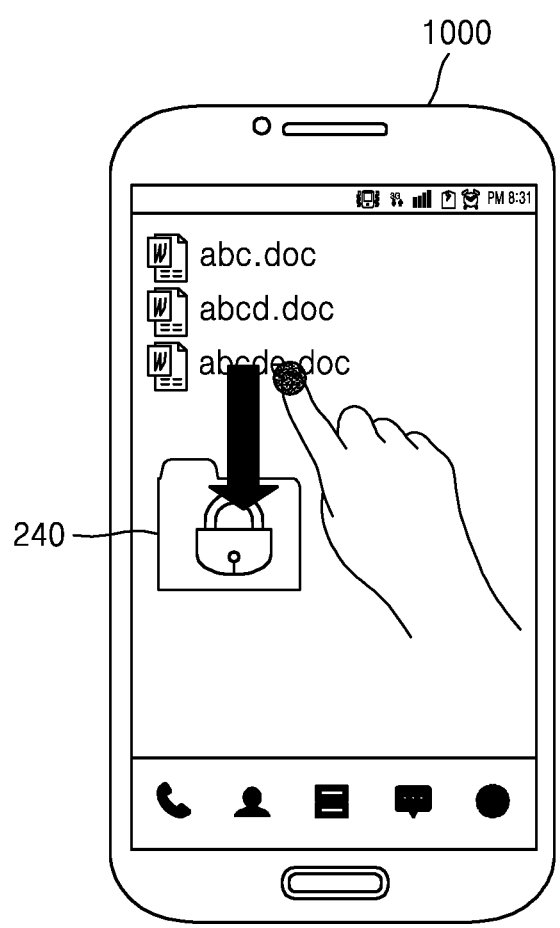
FIG. 24 illustrates an example in which a user moves a particular file into an encrypted folder, according to an exemplary embodiment.

FIG. 24 illustrates an example in which a user moves a particular file into an encrypted folder 240, according to an exemplary embodiment.

Referring to FIG. 24, the device 1000 may display files and the encrypted folder 240 on a screen of the device 1000. Also, the user may move a file 'abcde.doc' into the encrypted folder 240 by touching and dragging the file 'abcde.doc'. Accordingly, the file 'abcde.doc' may be stored in the encrypted folder 240, and the device 1000 has to decrypt the encrypted folder 240 so as to execute the file 'abcde.doc'.

More specifically, when the file 'abcde.doc' is moved into the folder 240, the file 'abcde.doc' may inherit security properties of the folder 240 and restore its original security properties when the file 'abcde.doc' is moved out of the folder 240. Here, when the file 'abcde.doc' is moved out of the folder 240, its security properties may be restored only when additional authentication of the user is successfully performed. According to another exemplary embodiment, the folder 240 may inherit security properties of the file 'abcde.doc' when the file 'abcde.doc' is moved into the folder 240. According to still another exemplary embodiment, when a file is moved into a folder, the file may inherit security properties of the folder if the folder has a higher security level than the folder while the folder may inherit security properties of the file if the file has a higher security level than the folder.

Figure 25:
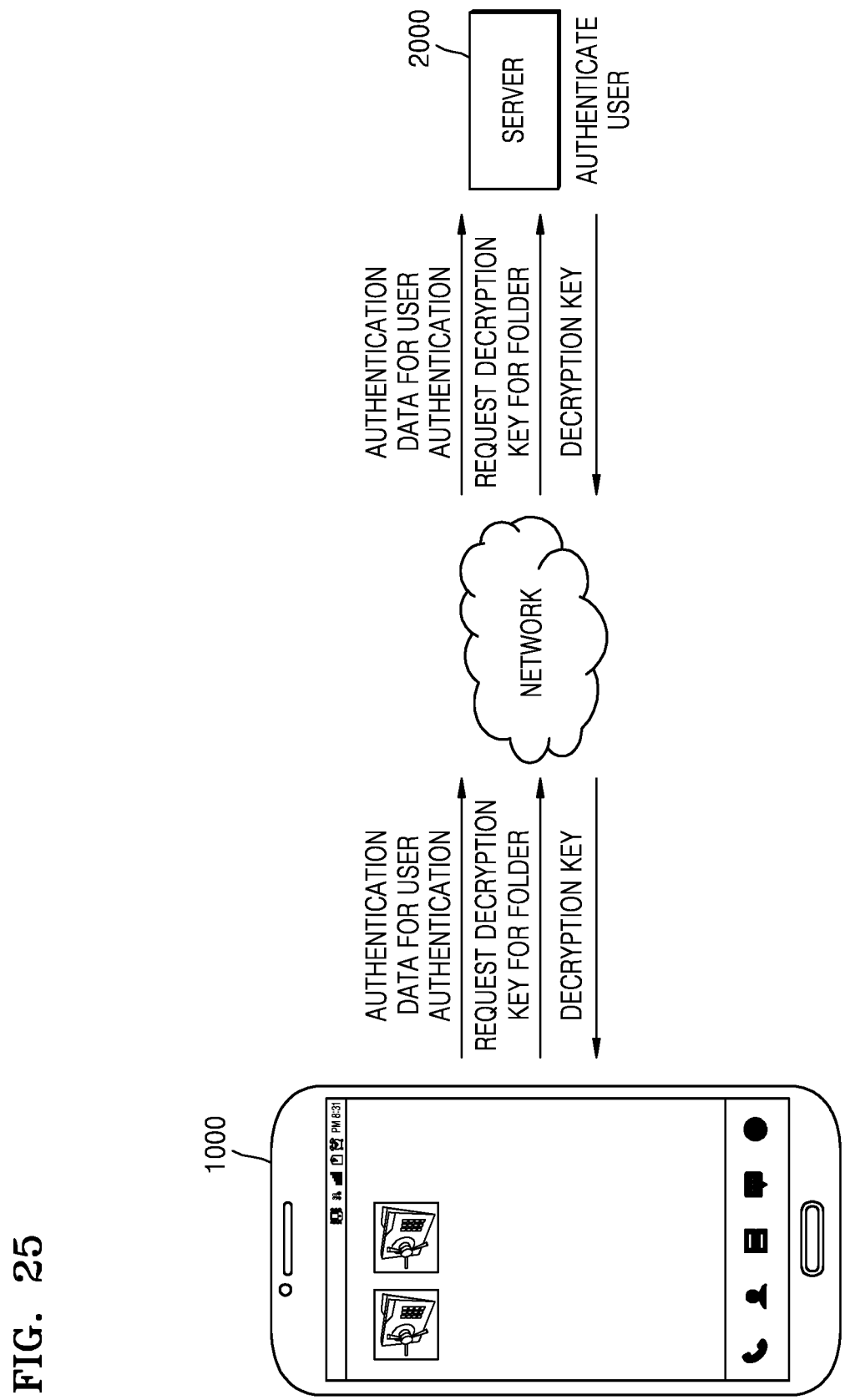
FIG. 25 illustrates an example in which the device decrypts an encrypted folder by using a decryption key that is matched with authentication data and is received from the server, according to an exemplary embodiment.

FIG. 25 illustrates an example in which the device 1000 decrypts an encrypted folder by using a decryption key that is matched with authentication data and is received from the server 2000, according to an exemplary embodiment.

Referring to FIG. 25, the device 1000 may be connected with the server 2000 so as to decrypt the encrypted folder in the device 1000. Also, the device 1000 may transmit, to the server 2000, the authentication data for authentication of a user of the device 1000, and may receive, from the server 2000, the decryption key that is matched with the authentication data.

Also, the server 2000 may authenticate the user by using the authentication data received from the device 1000. Also, the server 2000 may extract the decryption key matched with the authentication data from a DB of the server 2000.

Figure 26:
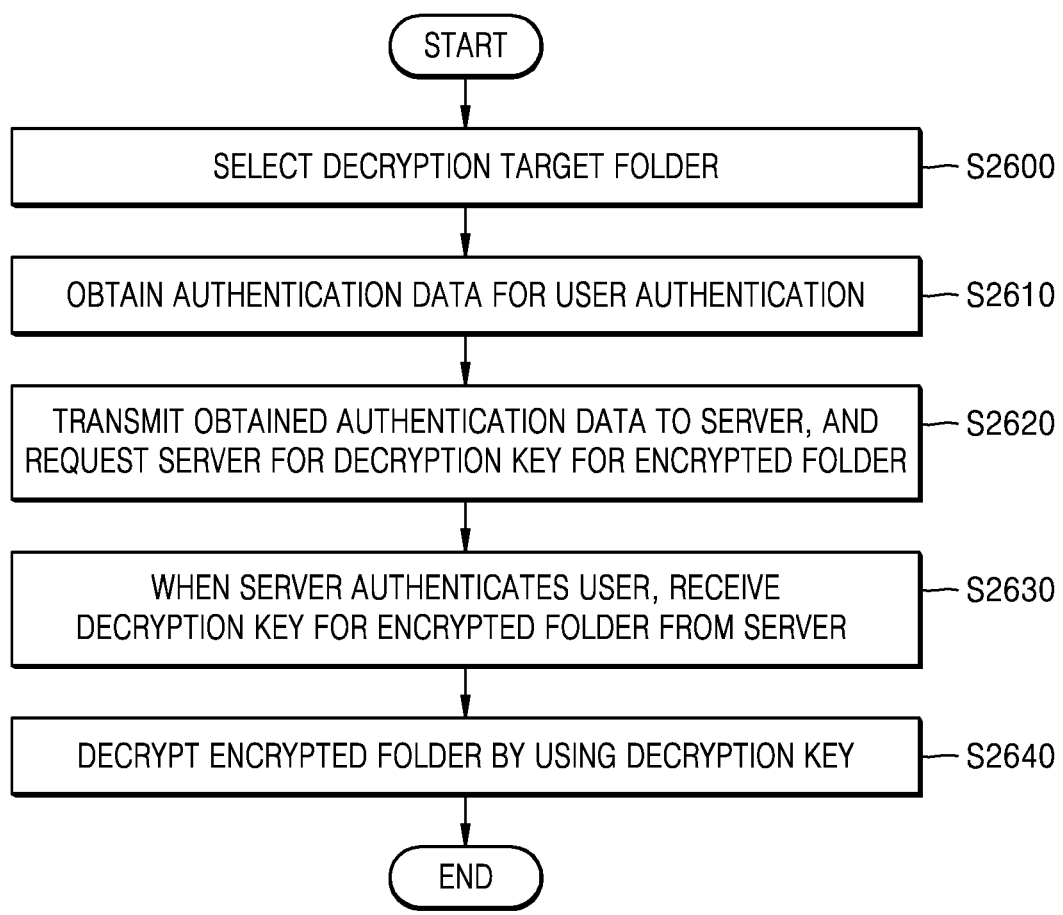
FIG. 26 illustrates decrypting an encrypted folder in the device by using a decryption key matched with authentication data, according to an exemplary embodiment.

FIG. 26 illustrates decrypting an encrypted folder in the device 1000 by using a decryption key matched with authentication data, according to an exemplary embodiment.

In operation S2600, the device 1000 may select a decryption target folder. The device 1000 may display a list of folders in the device 1000 on a screen of the device 1000, and receive a user input of selecting the encrypted folder from the displayed list. Alternatively, the device 1000 may select a wholly-encrypted folder or a partially-encrypted folder.

In operation S2610, the device 1000 may obtain authentication data for user authentication. The device 1000 may display a message indicating an authenticating method related to the encrypted folder, and obtain the authentication data based on a user input so as to make the user authentication performed on the encrypted folder by using the authenticating method. In this case, the device 1000 may obtain information about at least one authenticating method associated with the encrypted folder from a memory of the device 1000 or the server 2000.

If a plurality of authenticating methods are set for the encrypted folder, the device 1000 may obtain a plurality of pieces of authentication data that correspond to the plurality of authenticating methods, respectively.

In operation S2620, the device 1000 may transmit the obtained authentication data to the server 2000 and request the server 2000 for a decryption key. Also, the device 1000 may transmit a user ID of the device 1000, an ID value of the device 1000, and an ID value of the encrypted folder to the server 2000.

In operation S2630, when the server 2000 authenticates the user, the device 1000 may receive the decryption key for the encrypted folder from the server 2000. The server 2000 may authenticate the user by using the authentication data received from the device 1000. Then, when the user is authenticated, the device 1000 may receive, from the server 2000, the decryption key that is matched with the authentication data.

In operation S2640, the device 1000 may decrypt the encrypted folder by using the decryption key. Accordingly, the user of the device 1000 may use data in a decrypted folder.

Figure 27:
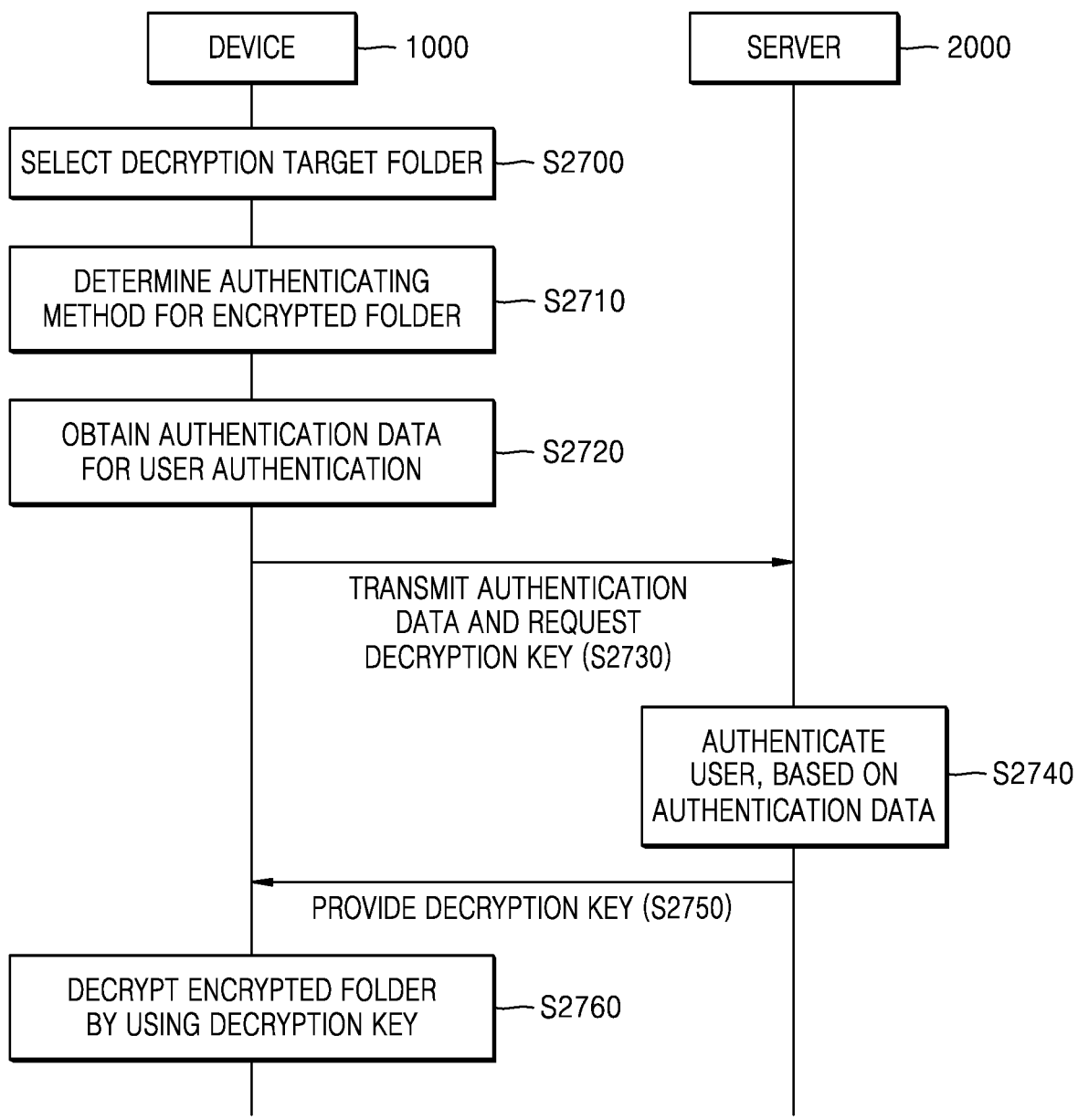
FIG. 27 illustrates providing authentication data to the server and decrypting an encrypted folder by using a decryption key that is matched with the authentication data and is received from the server, according to an exemplary embodiment.

FIG. 27 illustrates providing authentication data to the server 2000 and decrypting an encrypted folder by using a decryption key that is matched with the authentication data and is received from the server, according to an exemplary embodiment.

In operation S2700, the device 1000 may select a decryption target folder. The device 1000 may display a list of folders in the device 1000 on a screen of the device 1000, and receive a user input of selecting the encrypted folder from the displayed list.

In operation S2710, the device 1000 may determine an authenticating method for the encrypted folder. Based on a setting value that was preset for the encrypted folder, the device 1000 may determine the authenticating method to authenticate a user who attempts to decrypt the encrypted folder. If a plurality of authenticating methods are set for the encrypted folder, the device 1000 may display a list of the authenticating methods on the screen, and select at least one of the authenticating methods, based on a user input of selection.

In operation S2720, the device 1000 may obtain the authentication data for the user authentication. For example, if an authenticating method using an OTP is determined, the device 1000 may display, on the screen of the device 1000, an input field so as to receive an input of a password that is generated in an OTP device. Also, the device 1000 may obtain, as the authentication data, the password that is input by the user via the input field. As another example, if an authenticating method using a user ID and password is determined, the device 1000 may obtain, as the authentication data, a user ID and password input by the user. As another example, if an authenticating method using an authentication certificate that was issued to the user is determined, the device 1000 may obtain, as the authentication data, the authentication certificate and a password that is input by the user.

In operation S2730, the device 1000 transmits the authentication data to the server 2000, and requests the server 2000 for the decryption key. Also, the device 1000 may transmit, to the server 2000, the ID value of the encrypted folder and information about the authenticating method for the encrypted folder.

In operation S2740, the server 2000 may authenticate the user, based on the authentication data. The server 2000 may recognize the encrypted folder selected in the device 1000, and the authenticating method for the encrypted folder. Also, the server 2000 may determine whether the authentication data received from the device 1000 is valid, by using the recognized authenticating method. Then, according to a result of the determination, the server 2000 may authenticate the user. Afterward, when the user is authenticated, the server 2000 may extract the decryption key for decrypting the encrypted folder from the DB.

In operation S2750, the server 2000 may provide the decryption key for the encrypted folder to the device 1000, and in operation S2760, the device 1000 may decrypt the encrypted folder by using the decryption key. Accordingly, the user may use data in the decrypted folder in the device 1000.

Figure 28:
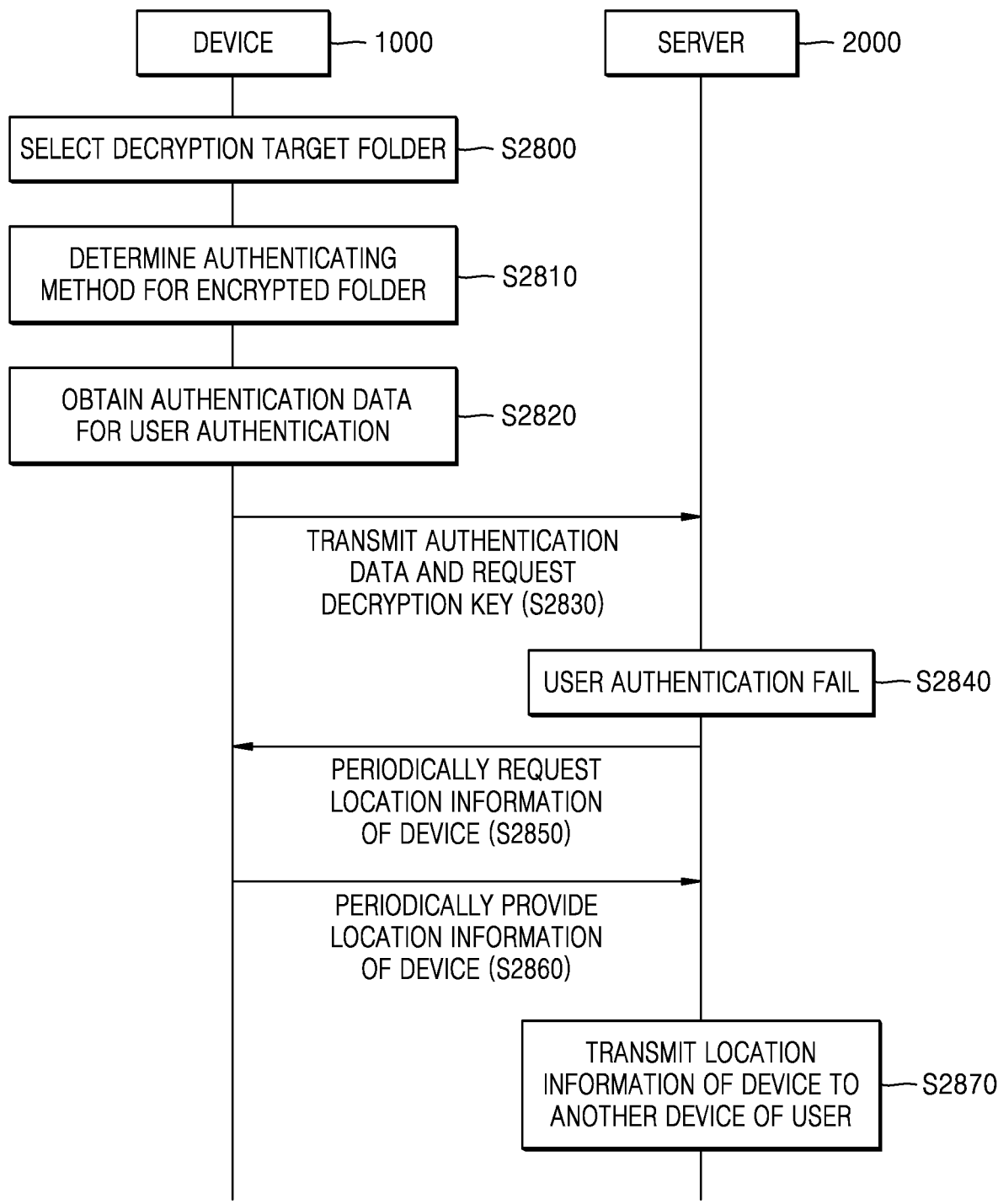
FIG. 28 illustrates detecting a location of the device, when authentication of a user of the device fails, according to an exemplary embodiment.

FIG. 28 illustrates detecting a location of the device 1000, when authentication of a user of the device 1000 fails, according to an exemplary embodiment.

Operations S2800 through S2830 of FIG. 28 correspond to operations S2700 through S2730 of FIG. 27, thus, detailed description about operations S2800 through S2830 are omitted here.

In operation S2840, the server 2000 may fail to authorize the user. The server 2000 may recognize the encrypted folder selected in the device 1000, and an authenticating method for the encrypted folder. Also, the server 2000 may determine whether the authentication data received from the device 1000 is valid, by using the recognized authenticating method. The server 2000 may determine whether the authentication data received from the device 1000 is valid, by determining whether the authentication data received from the device 1000 is same as authentication data stored in the server 2000. If the received authentication data is not same as the authentication data stored in the server 2000, the authentication of the user may fail. When the authentication of the user fails, the server 2000 may count the number of times of authentication failure.

In operation S2850, the server 2000 may periodically request the device 1000 for location information of the device 1000. When user authentication fails a preset number of times, the server 2000 may request the device 1000 for the location information of the device 1000.

In operation S2860, in response to the request from the server 2000, the device 1000 may periodically provide the location information of the device 1000 to the server 2000. Due to the failure of the user authentication, if the device 1000 receives the request of the location information from the server 2000, the device 1000 may obtain the location information without a separate user input, and may transmit the obtained location information to the server 2000.

In operation S2870, the device 1000 may transmit the location information of the device 1000 to another device of the user of the device 1000. In this case, a list of other devices to receive the location information of the device 1000 may be previously stored in the server 2000.

Figure 29:
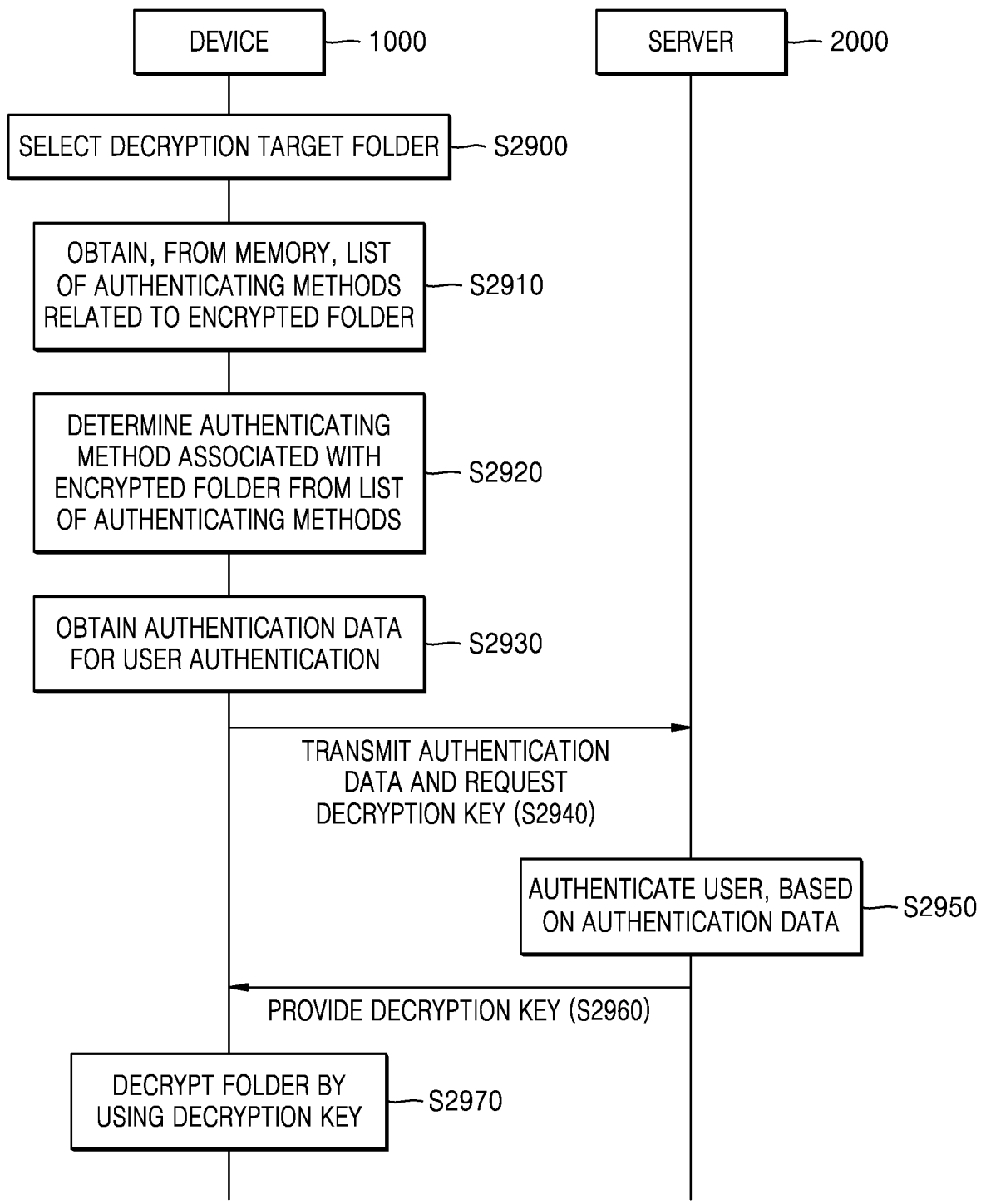
FIG. 29 illustrates decrypting an encrypted folder by obtaining, from a memory in the device, an authenticating method that is matched with the encrypted folder, according to an exemplary embodiment.

FIG. 29 illustrates decrypting an encrypted folder by obtaining, from a memory in the device 1000, an authenticating method that is matched with the encrypted folder, according to an exemplary embodiment.

Operations S2900, and S2930 through S2970 of FIG. 29 correspond to operations S2700, and S2720 through S2760 of FIG. 27, thus, detailed description about operations S2900, and S2930 through S2970 are omitted here.

In operation S2910, the device 1000 may obtain, from the memory, a list of authenticating methods related to the encrypted folder. The list of authenticating methods for authentication of a user who attempts to decrypt the encrypted folder may be previously stored in the memory in the device 1000. In this case, the device 1000 may extract, from the memory in the device 1000, the list of authenticating methods that correspond to the encrypted folder.

In operation S2920, the device 1000 may determine an authenticating method associated with the encrypted folder from the list of authenticating methods. In more detail, the device 1000 may display the list of authenticating methods on a screen of the device 1000, and select the authenticating method, based on a user input of selecting the authenticating method from the list of authenticating methods.

Figure 30:
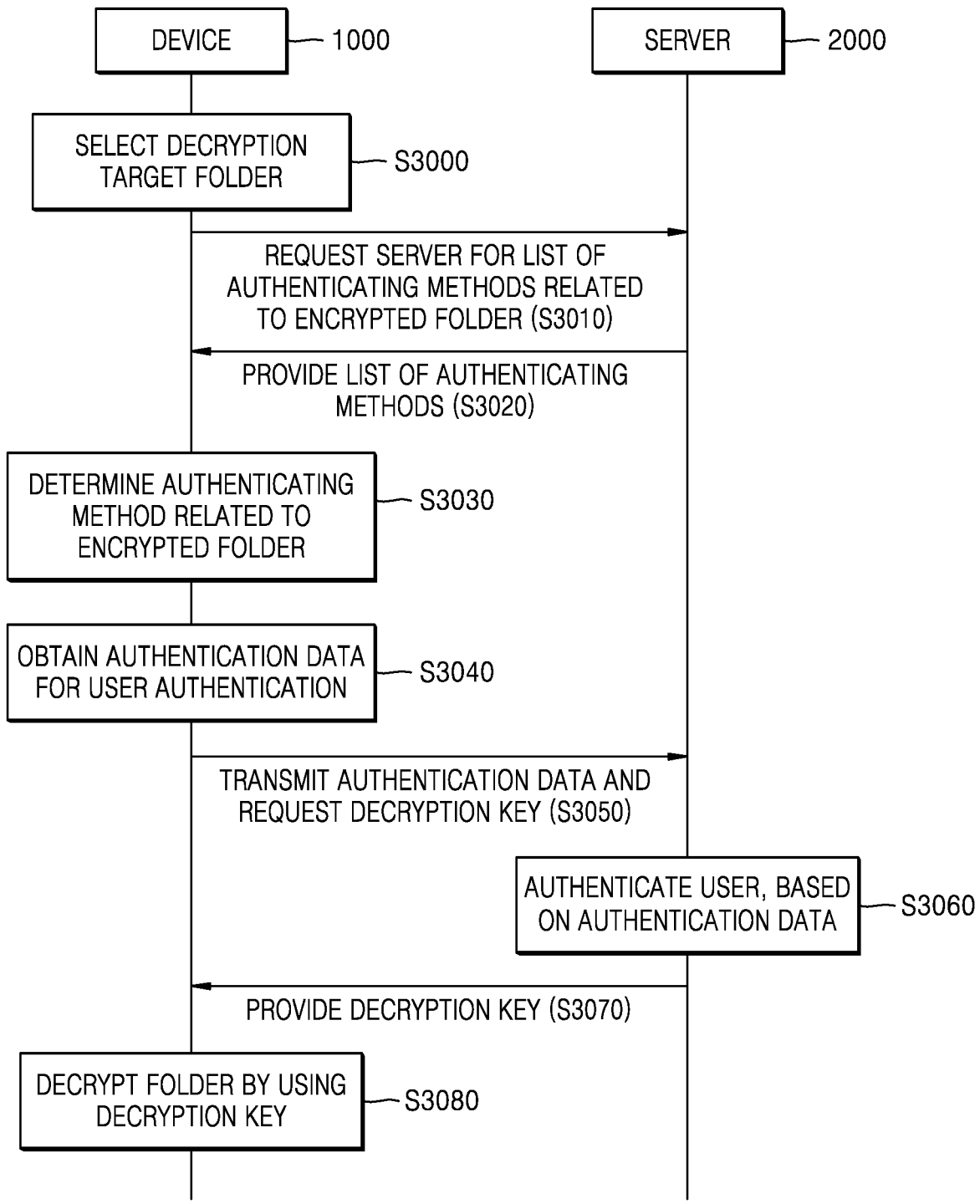
FIG. 30 illustrates obtaining, from the server, an authenticating method that is associated with an encrypted folder, and decrypting the encrypted folder, the method performed by the device, according to an exemplary embodiment.

FIG. 30 is a flowchart of a method of obtaining, from the server 2000, an authenticating method that is associated with an encrypted folder, and decrypting the encrypted folder, according to an exemplary embodiment.

Operations S3000, and S3040 through S3080 of FIG. 30 correspond to operations S2700, and S2720 through S2760 of FIG. 27, thus, detailed description about operations S3000, and S3040 through S3080 are omitted here.

In operation S3010, the device 1000 may request the server 2000 for a list of authenticating methods related to the encrypted folder. The list of authenticating methods for authentication of a user who attempts to decrypt the encrypted folder may be previously stored in the DB in the server 2000. In this case, the device 1000 may request the server 2000 for the list of authenticating methods that correspond to the encrypted folder. In this case, the device 1000 may transmit, to the server 2000, an ID value of the encrypted folder, an ID value of the device 1000, and an ID of the user.

In operation S3020, the server 2000 may provide, to the device 1000, the list of authenticating methods related to the encrypted folder. In response to the request from the device 1000, the server 2000 may recognize the encrypted folder, and extract, from the DB in the server 2000, the list of authenticating methods that correspond to the recognized encrypted folder. Then, the server 2000 may transmit the extracted list of authenticating methods to the device 1000.

In operation S3030, the device 1000 may determine an authenticating method related to the encrypted folder. In more detail, the device 1000 may display the list of authenticating methods on a screen of the device 1000, and select the authenticating method, based on a user input of selecting the authenticating method from the list of authenticating methods.

FIGS. 31 through 35 illustrate an example in which the device 1000 decrypts an encrypted folder, based on a user input of authentication data, according to an exemplary embodiment.

Figure 31:
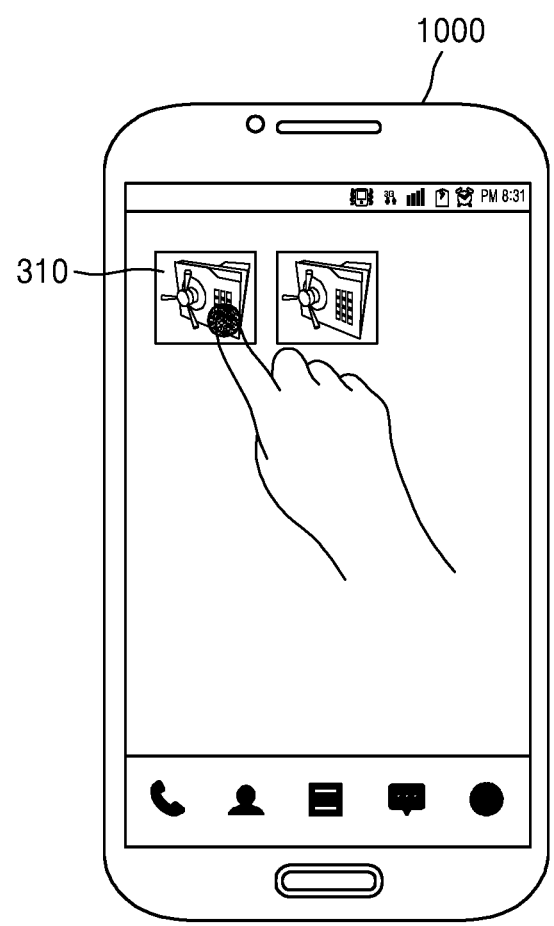
FIGS. 31 through 35 illustrate an example in which the device decrypts an encrypted folder, based on a user input of authentication data, according to an exemplary embodiment.

Referring to FIG. 31, the device 1000 may display a list of folders on a screen of the device 1000. Then, the device 1000 may receive a user input of selecting an encrypted folder 310.

Figure 32:
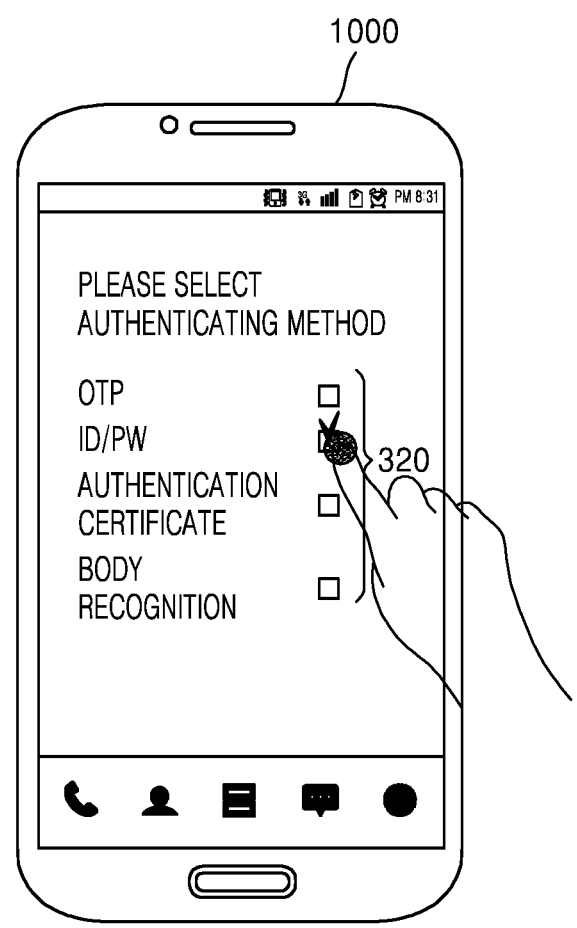

Referring to FIG. 32, when the encrypted folder 310 is selected, the device 1000 may display a list of authenticating methods 320 associated with the encrypted folder 310 on the screen of the device 1000. For example, the list of authenticating methods 320 associated with the encrypted folder 310 may include "OTP", "ID/PW", "authentication certificate", and "biological information". Also, the device 1000 may select at least one authenticating method, based on a user input of selection. For example, the device 1000 may select "ID/PW".

Figure 33:
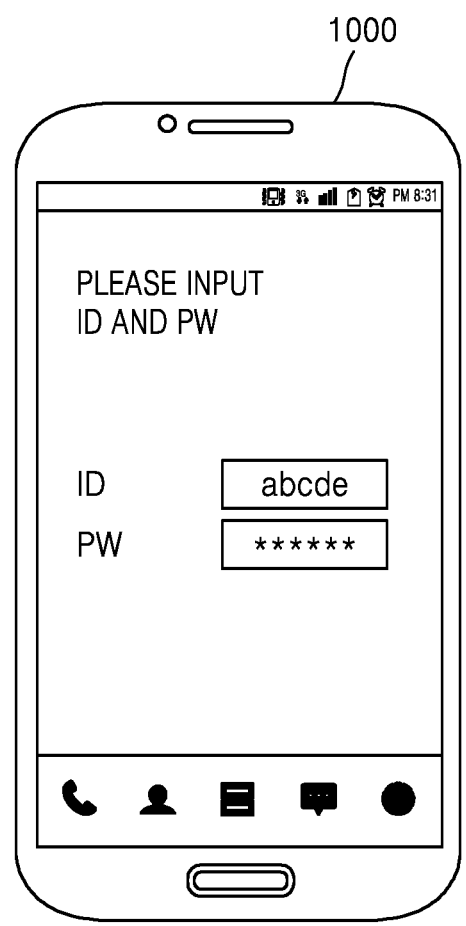

Referring to FIG. 33, when "ID/PW" is selected from the list of authenticating methods 320, the device 1000 may display an input field so as to receive a user input of an ID and password of a user. Then, the device 1000 may receive the user input of the ID and password of the user.

Figure 34:
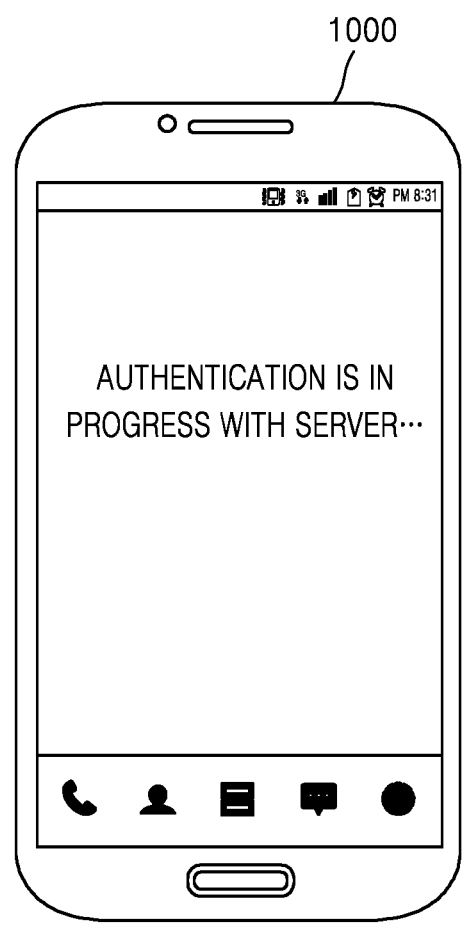

Referring to FIG. 34, when the ID and password of the user are input to the input field, the device 1000 may authenticate the user via the server 2000. The device 1000 may transmit an ID value of the encrypted folder 310, and the input ID and password of the user to the server 2000, and request the server 2000 for user authentication. The device 1000 may display a message "Authentication is in progress with server" on the screen of the device 1000.

Figure 35:
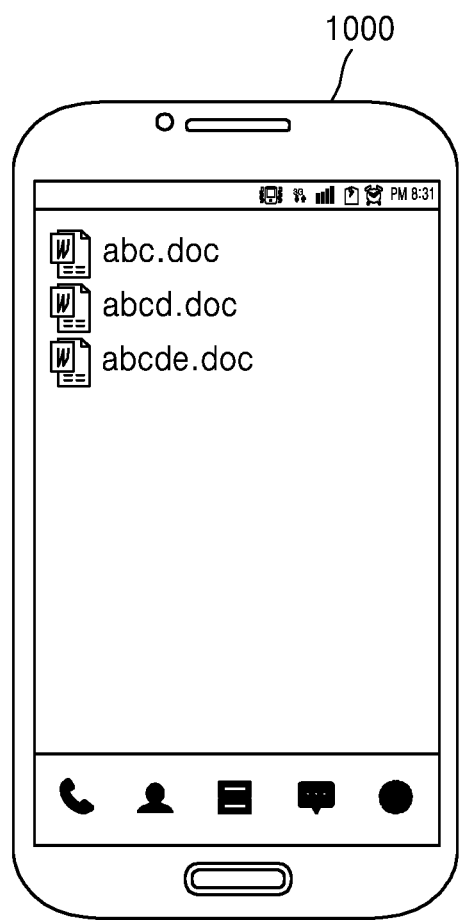

Referring to FIG. 35, when the user authentication with respect to the encrypted folder 310 is completed, the device 1000 may receive a decryption key for decrypting the encrypted folder 310 from the server 2000, and decrypt the encrypted folder 310 by using the decryption key. Afterward, the device 1000 may read the decrypted folder 310, and display files in the decrypted folder 310 on the screen of the device 1000.

Figure 36:
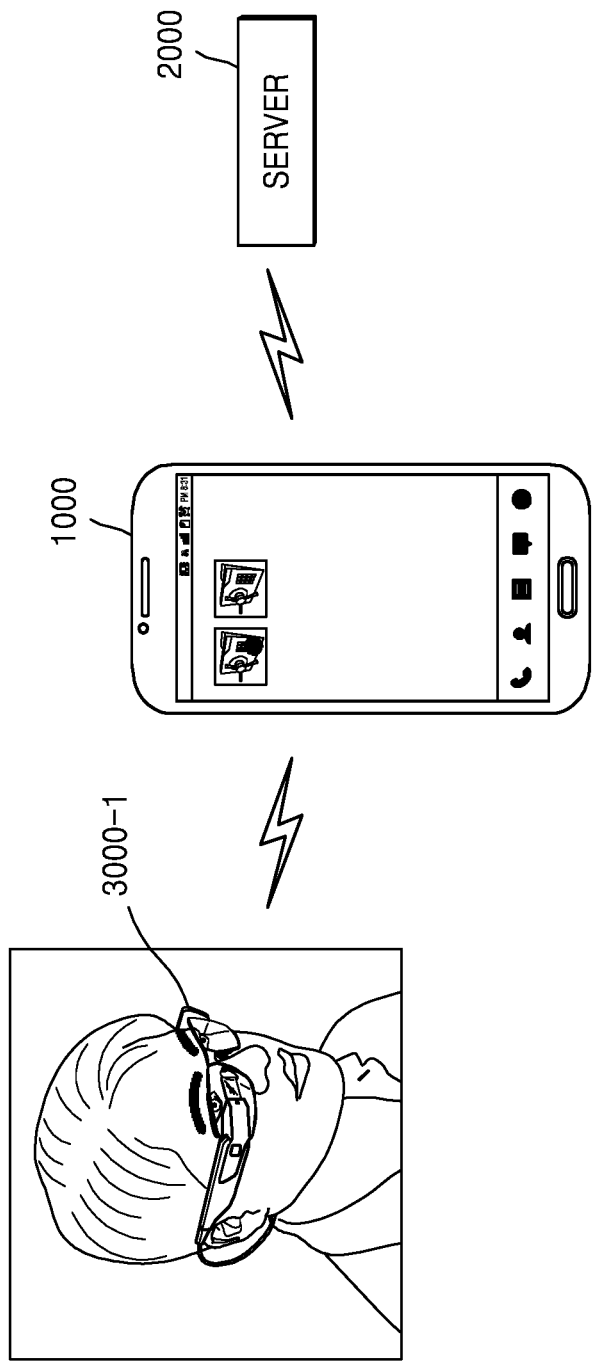
FIGS. 36 and 37 illustrate examples in which, when the device detects a peripheral device of a user, the device automatically requests the server to perform user authentication for decryption of an encrypted folder, according to exemplary embodiments.
Figure 37:
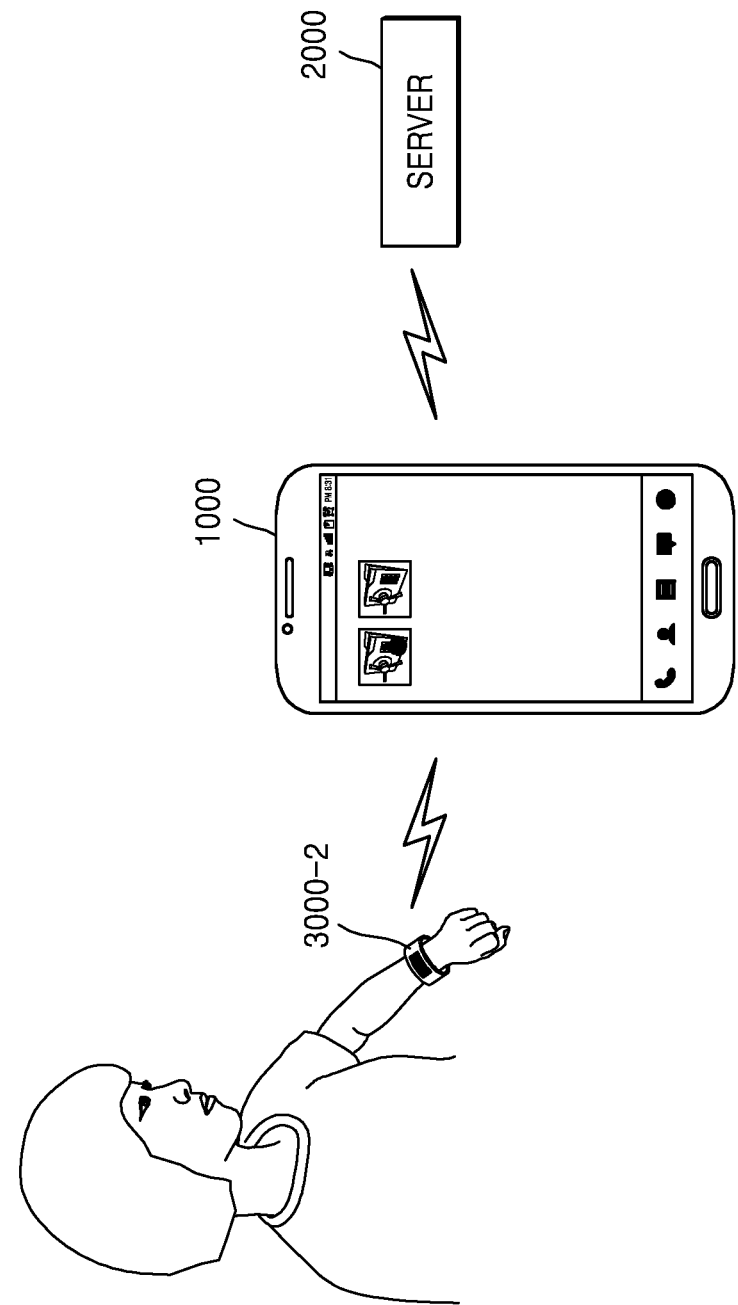

FIGS. 36 and 37 illustrate examples in which, when the device 1000 detects a peripheral device of a user, the device 1000 automatically requests the server 2000 to perform user authentication for decryption of an encrypted folder, according to exemplary embodiments.

Referring to FIG. 36, when a user who wears a glasses device 3000-1 selects an encrypted folder of the device 1000, the glasses device 3000-1 may capture a pupil of the user and generate a pupil image, and the device 1000 may receive the pupil image of the user from the glasses device 3000-1. In order to decrypt the encrypted folder, the device 1000 may transmit, to the server 2000, the pupil image received from the glasses device 3000-1, and automatically request user authentication.

Referring to FIG. 37, when a user who wears a watch device 3000-2 selects an encrypted folder of the device 1000, the watch device 3000-2 may check a pulse of the user and generate pulse information, and the device 1000 may receive the pulse information of the user from the watch device 3000-2. In order to decrypt the encrypted folder, the device 1000 may transmit, to the server 2000, the pulse information received from the watch device 3000-2, and automatically request user authentication.

Figure 38:
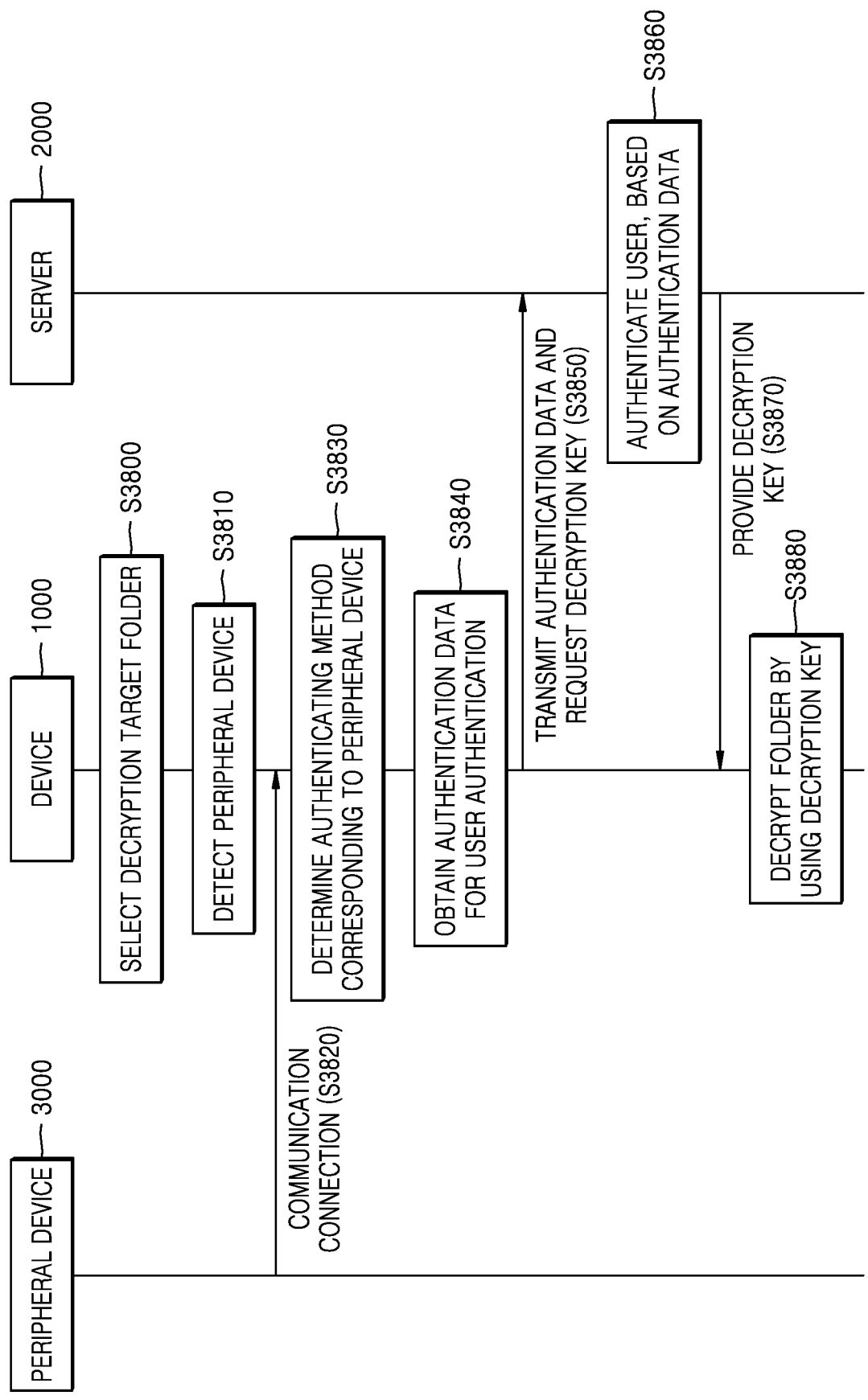
FIG. 38 illustrates an example in which, when the device detects a peripheral device, the device requests the server to perform user authentication for decryption of an encrypted folder, according to an exemplary embodiment.

FIG. 38 illustrates an example in which, when the device 1000 detects a peripheral device 3000, the device 1000 requests the server 2000 to perform user authentication for decryption of an encrypted folder, according to an exemplary embodiment.

In operation S3800, the device 1000 may select a decryption target folder. The device 1000 may display a list of folders in the device 1000 on a screen of the device 1000, and receive a user input of selecting the encrypted folder from the displayed list.

In operation S3810, when the decryption target folder is selected, the device 1000 may detect the peripheral device 3000 around the device 1000. The device 1000 may recognize the peripheral device 3000, and determine whether the recognized peripheral device 3000 is a preset device.

The peripheral device 3000 may be, but is not limited to, a smartphone, a tablet PC, a PC, a smart TV, a mobile phone, a PDA, a laptop computer, a media player, a micro-server, a GPS device, an electronic book terminal, a terminal for digital broadcasting, a navigation device, a kiosk, an MP3 player, a digital camera, and other mobile or non-mobile computing device. Also, the peripheral device 3000 may include various devices such as an electronic blackboard, a touch table, etc. that may receive a touch input. Also, the peripheral device 3000 may be a watch, glasses, a hair band, or a ring that has a communication function and a data processing function.

In operation S3820, the device 1000 may be connected with the peripheral device 3000 for communication. The device 1000 and the peripheral device 3000 may be connected with each other via short-distance communication but one or more exemplary embodiments are not limited thereto.

Also, referring to FIG. 38, the device 1000 performs operation S3820 after operation S3810, but one or more exemplary embodiments are not limited thereto. That is, the device 1000 may perform operations S3810 and S3820 together, or may perform operation S3810 after operation S3820.

In operation S3830, the device 1000 determines an authenticating method that corresponds to the peripheral device 3000. The authenticating method that corresponds to the peripheral device 3000 may be previously set, and when the device 1000 detects the peripheral device 3000, the device 1000 may determine the authenticating method. The preset authenticating method may include, but is not limited to, an authenticating method that uses biological information obtained by the peripheral device 3000.

In operation S3840, the device 1000 may obtain authentication data for the user authentication. When the device 1000 detects the peripheral device 3000, the device 1000 may request the peripheral device 3000 for biological information of a user, and receive the biological information of the user from the peripheral device 3000. For example, the biological information of the user received from the peripheral device 3000 may include, but is not limited to, a face image of the user, a pupil image of the user, a fingerprint image of the user, or a pulse of the user.

Also, when the device 1000 detects the peripheral device 3000, the device 1000 may obtain preset authentication data, based on a user input with respect to the device 1000. Alternatively, when the device 1000 detects the peripheral device 3000, the device 1000 may obtain preset authentication data that is stored in the device 1000.

Operations S3850 through S3880 of FIG. 38 correspond to operations S2730 through S2760 of FIG. 27, thus, detailed descriptions about operations S3850 through S3880 are omitted here.

When the device 1000 detects the peripheral device 3000, the device 1000 may automatically perform operations S3830 through S3880 without receiving a separate user input, but one or more exemplary embodiments are not limited thereto.

Figure 39:
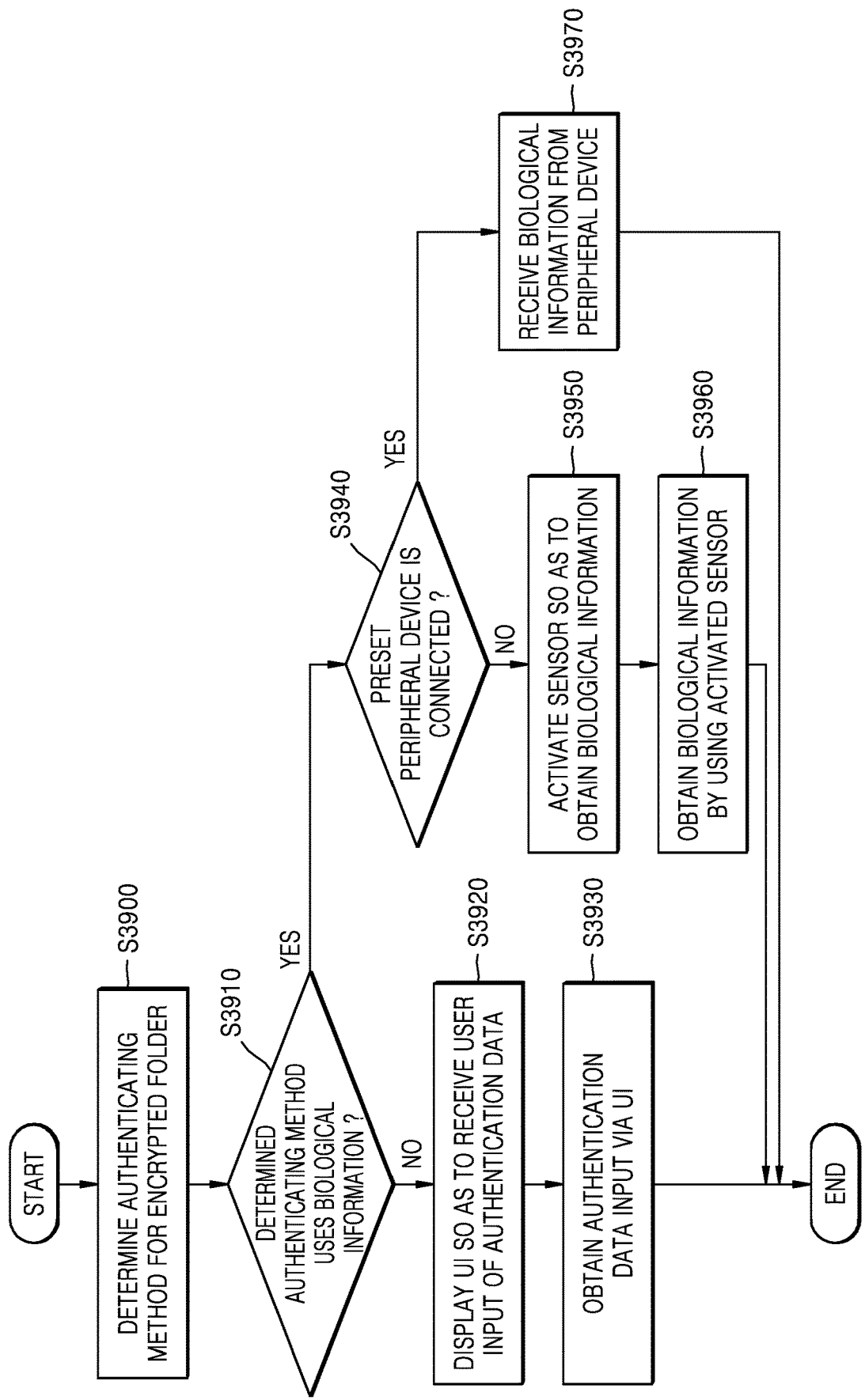
FIG. 39 illustrates obtaining authentication data so as to decrypt an encrypted folder, according to an exemplary embodiment.

FIG. 39 illustrates obtaining authentication data so as to decrypt an encrypted folder, according to an exemplary embodiment.

In operation S3900, the device 1000 may determine an authenticating method for the encrypted folder, and in operation S3910, the device 1000 may determine whether the determined authenticating method uses biological information.

As a result of the determination in operation S3910, if the determined authenticating method does not use biological information, in operation S3920, the device 1000 may display a user interface to receive a user input of authentication data. Then, in operation S3930, the device 1000 may obtain the authentication data that is input via the user interface.

As the result of the determination in operation S3910, if the determined authenticating method uses biological information, in operation S3940, the device 1000 may determine whether the preset peripheral device 3000 is detected.

As a result of the determination in operation S3940, if the preset peripheral device 3000 is not detected, in operation S3950, the device 1000 may activate a sensor in the device 1000 to obtain the biological information. For example, the device 1000 may activate at least one of a fingerprint recognition sensor, a camera sensor to recognize the face of the user, and a voice sensor to recognize a voice command of the user, but one or more exemplary embodiments are not limited thereto. In operation S3960, the device 1000 may obtain the biological information by using the activated sensor.

As the result of the determination in operation S3940, if the preset peripheral device 3000 is detected, in operation S3970, the device 1000 may receive biological information from the peripheral device 3000. The device 1000 may request biological information that is preset in the peripheral device 3000, and receive, from the peripheral device 3000, the biological information that is generated by the peripheral device 3000 in response to the request.

FIGS. 40 through 43 illustrate an example in which the device 1000 detects the peripheral device 3000 and decrypts an encrypted folder, according to an exemplary embodiment.

Figure 40:
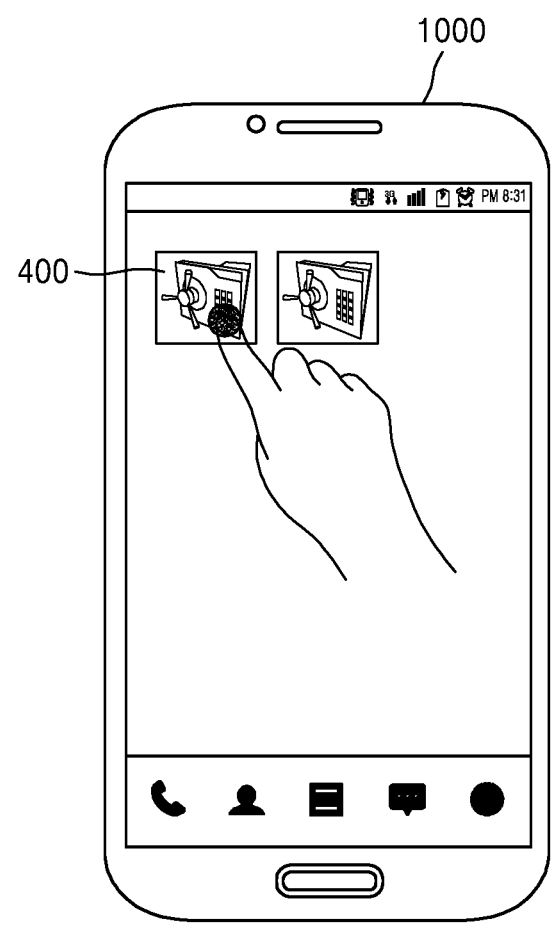
FIGS. 40 through 43 illustrate an example in which the device detects the peripheral device and decrypts an encrypted folder, according to an exemplary embodiment.
Figure 41:
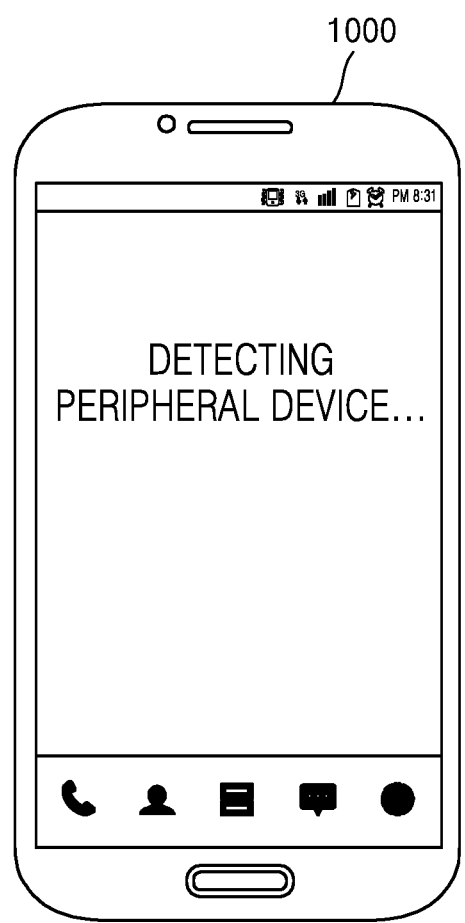

Referring to FIG. 40, the device 1000 may display a list of folders and receive a user input of selecting an encrypted folder 400 from the list. Referring to FIG. 41, when the device 1000 receives the user input of selecting the encrypted folder 400, the device 1000 may detect the preset peripheral device 3000. The device 1000 may display a message "Detecting a peripheral device" on a screen of the device 1000 while the device 1000 detects the peripheral device 3000.

Figure 42:
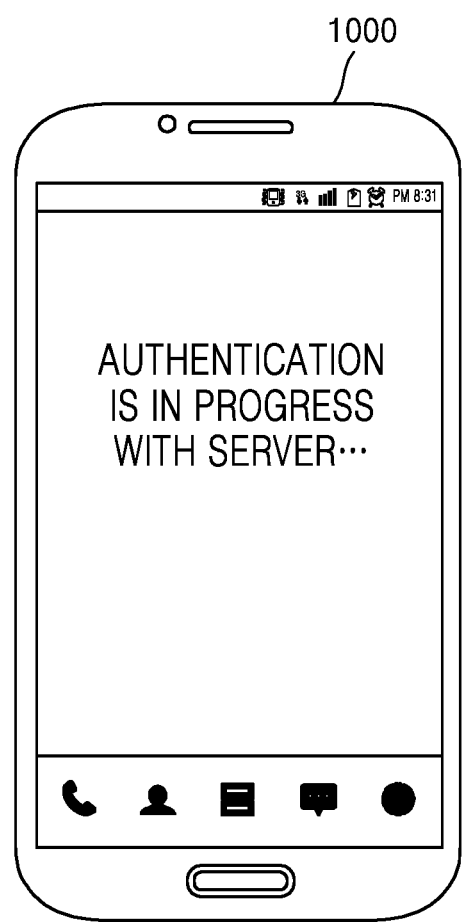

Referring to FIG. 42, when the preset peripheral device 3000 is detected, the device 1000 may obtain preset authentication data from the preset peripheral device 3000, and transmit the authentication data to the server 2000. Also, the device 1000 may request the server 2000 for a decryption key for the encrypted folder 400, and request the server 2000 to perform authentication on a user of the device 1000. The device 1000 may display a message "Authentication is in progress with server" on the screen of the device 1000.

Figure 43:
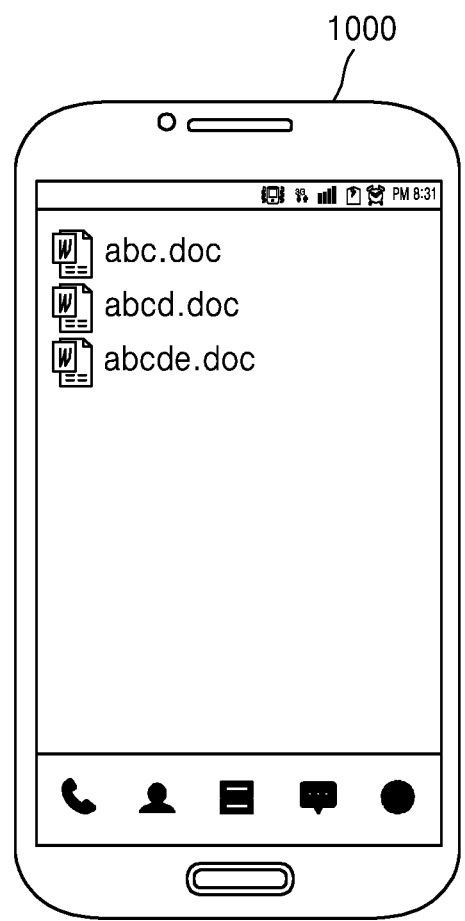

Referring to FIG. 43, when the authentication of the user with respect to the encrypted folder 400 is completed, the device 1000 may receive the decryption key for decrypting the encrypted folder 400 from the server 2000, and may decrypt the encrypted folder 400 by using the decryption key. Also, the device 1000 may read the decrypted folder 400, and may display files in the decrypted folder 400 on the screen of the device 1000.

Figure 44:
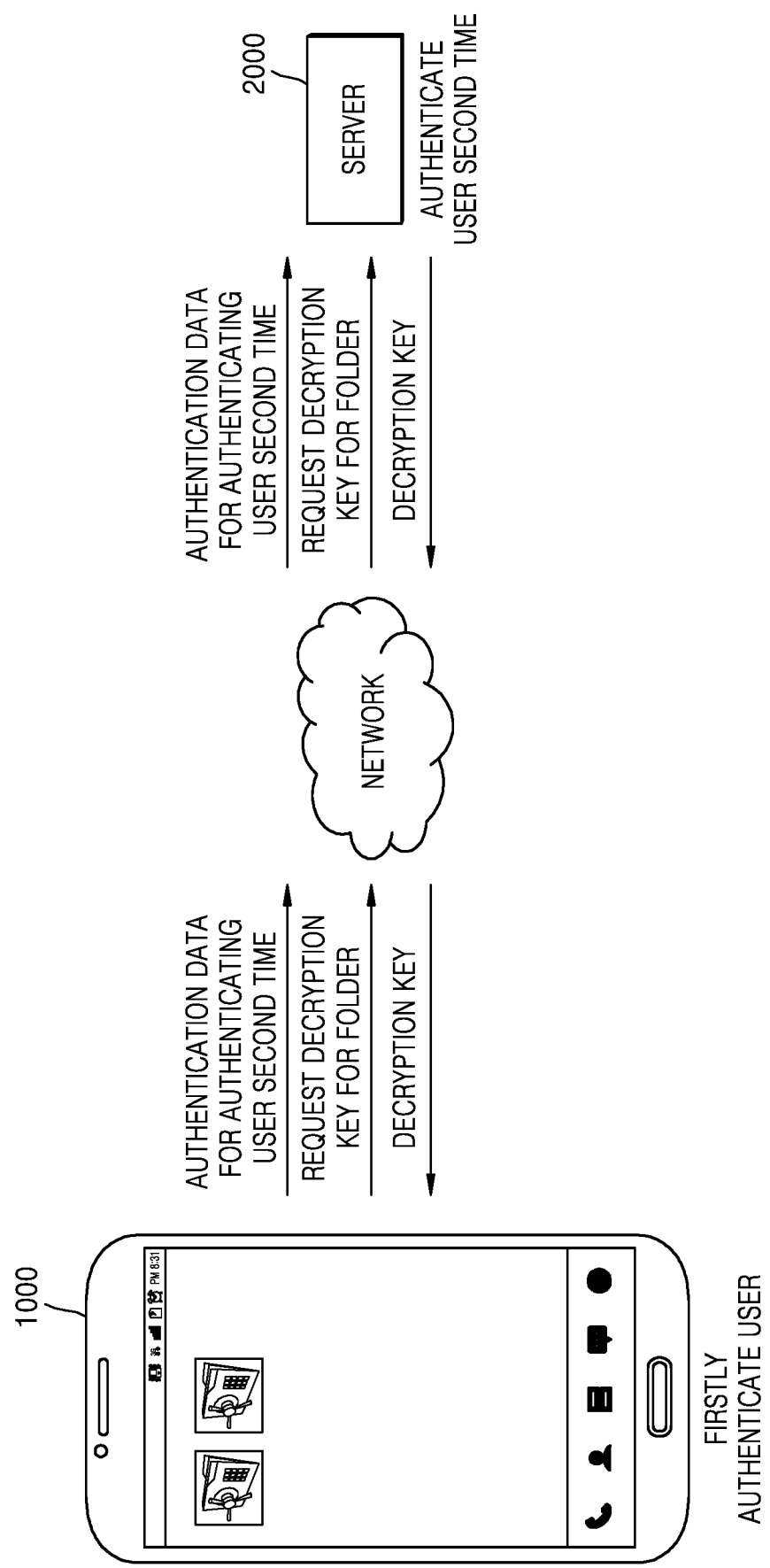
FIG. 44 illustrates an example in which the device authenticates a user sequentially via the device and the server so as to decrypt an encrypted folder, according to an exemplary embodiment.

FIG. 44 illustrates an example in which the device 1000 authenticates a user sequentially via the device 1000 and the server 2000 so as to decrypt an encrypted folder, according to an exemplary embodiment.

Referring to FIG. 44, the device 1000 may perform first authentication on the user who attempts to decrypt the encrypted folder in the device 1000, and request the server 2000 to perform second authentication on the user. The device 1000 may obtain authentication data for the second authentication on the user by using an authenticating method associated with the encrypted folder and provide the obtained authentication data to the server 2000, so that the device 1000 may request the server 2000 for the second authentication.

The server 2000 may perform the second authentication on the user who attempts to access the encrypted folder in the device 1000, by using the authentication data received from the device 1000. When the second authentication is completed, the server 2000 may provide, to the device 1000, a decryption key for decrypting the encrypted folder in the device 1000.

Figure 45:
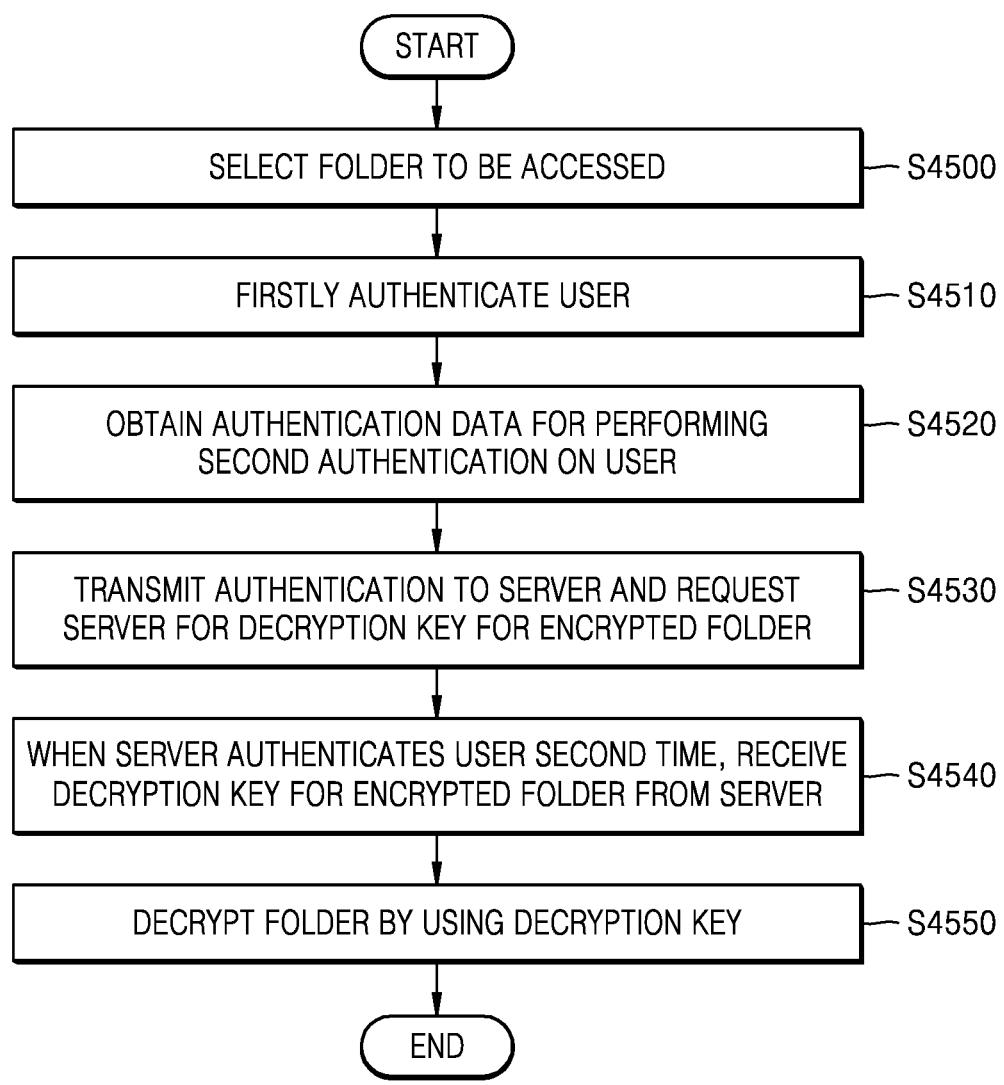
FIG. 45 illustrates decrypting an encrypted folder in the device by authenticating a user in a sequential manner, according to an exemplary embodiment.

FIG. 45 illustrates decrypting an encrypted folder in the device 1000 by authenticating a user in a sequential manner, according to an exemplary embodiment.

In operation S4500, the device 1000 may select the encrypted folder. In more detail, the device 1000 may display a list of folders on a screen of the device 1000, and select at least one encrypted folder, based on a user input of selecting the at least one encrypted folder from the list.

In operation S4510, the device 1000 may firstly authenticate a user. In more detail, the device 1000 may firstly authenticate the user who attempts to use data in the encrypted folder. For example, the device 1000 may receive an input of a user ID and password from the user, and firstly authenticate the user by using the user ID and password. However, a method of firstly authenticating the user is not limited thereto. For example, the device 1000 may firstly authenticate the user by using an OTP, an authentication certificate, or biological information. In this case, the method of firstly authenticating the user and authentication data therefor may be preset in the device 1000.

In operation S4520, the device 1000 may obtain authentication data for performing second authentication on the user. The device 1000 may determine an authenticating method related to the encrypted folder, and obtain the authentication data to request the server 2000 to authenticate the user a second time by using the determined authenticating method. In this case, at least one authenticating method related to the encrypted folder may be preset, and the device 1000 may obtain the authentication data for the second authentication of the user by using the preset authenticating method.

A method of authenticating the user a second time may include at least one of an authenticating method using an OTP device, an authenticating method using a user ID/password, an authenticating method using an authentication certificate that was issued to the user, and an authenticating method using biological information of the user In operation S4530, the device 1000 may transmit the authentication data to the server 2000 and thus, request the server 2000 for a decryption key for the encrypted folder. Also, the device 1000 may transmit, to the server 2000, an ID value of the encrypted folder selected in the device 1000, and information about the authenticating method related to the encrypted folder.

In operation S4540, when the server 2000 authenticates the user the second time, the device 1000 may receive the decryption key about the encrypted folder from the server 2000. The server 2000 may authenticate the user the second time by using the authentication data received from the device 1000. Also, when the user is authenticated the second time, the device 1000 may receive a decryption key for the encrypted folder from the server 2000.

In operation S4550, the device 1000 may decrypt the encrypted folder by using the decryption key. Accordingly, the user may use the data in the decrypted folder in the device 1000.

Figure 46:
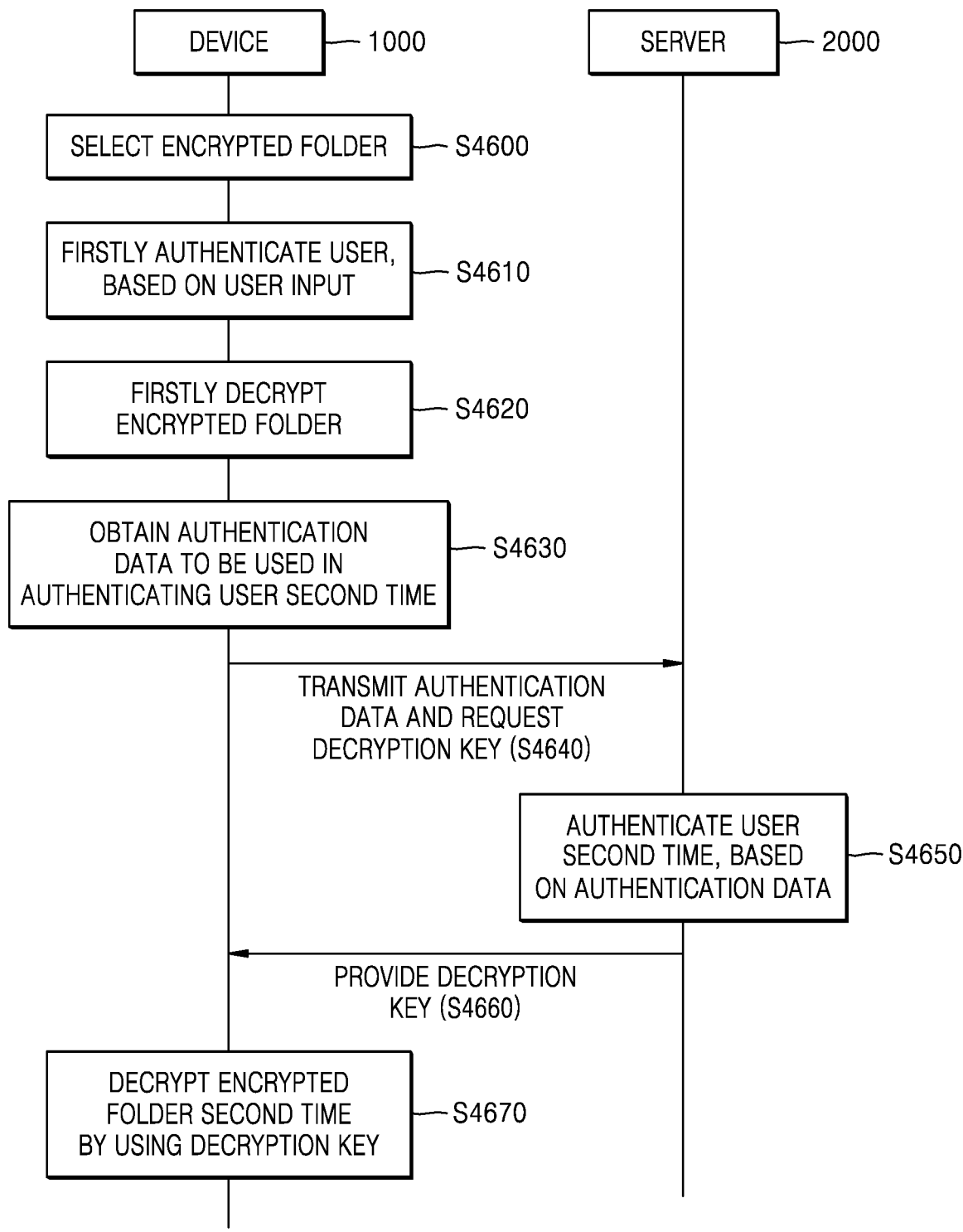
FIG. 46 illustrates an example in which, when the server authenticates a user a second time, the device obtains a decryption key for an encrypted folder from the server, according to an exemplary embodiment.

FIG. 46 illustrates an example in which, when the server 2000 authenticates a user a second time, the device 1000 obtains a decryption key for an encrypted folder from the server 2000, according to an exemplary embodiment.

In operation S4600, the device 1000 may select the encrypted folder. The device 1000 may display a list of folders on a screen of the device 1000, and select at least one encrypted folder, based on a user input of selecting the at least one encrypted folder from the list.

In operation S4610, the device 1000 may firstly authenticate a user, based on a user input. That is, the device 1000 may firstly authenticate the user who attempts to use data in the encrypted folder. For example, the device 1000 may receive a user ID and password from the user, and firstly authenticate the user, based on the user ID and password. However, a method of firstly authenticating the user is not limited thereto.

In operation S4620, when the user was firstly authenticated, the device 1000 may firstly decrypt the encrypted folder. In this case, the encrypted folder may have been generated in a manner that a folder was firstly encrypted by using an encryption key for the server 2000 and then was encrypted the second time by using an encryption key for the device 1000.

In operation S4630, the device 1000 obtains authentication data to be used in authenticating the user the second time. The device 1000 may determine an authenticating method related to the encrypted folder, and obtain the authentication data so as to request the server 2000 to authenticate the user the second time by using the determined authenticating method. In this case, at least one authenticating method related to the encrypted folder may be preset, and the device 1000 may obtain the authentication data to be used in authenticating the user the second time by using the preset authenticating method.

For example, if a method of authenticating the user the second time by using an OTP is determined, the device 1000 may receive a password from the server 2000, and display the password on a screen of the device 1000. Then, the device 1000 may obtain, as the authentication data, a value of the password that is input by the user after the user checks the displayed password.

As another example, if a method of authenticating the user the second time by using a user ID and password is determined, the device 1000 may obtain, as the authentication data, the user ID and password that are input by the user.

As another example, if a method of authenticating the user the second time by using an authentication certificate that was previously issued to the user is determined, the device 1000 may obtain, as the authentication data, the authentication certificate and a password that is input by the user.

In operation S4640, the device 1000 may transmit the authentication data to the server 2000 and request the server for a decryption key for the encrypted folder. Also, the device 1000 may transmit, to the server 2000, an ID value of the encrypted folder selected in the device 1000, and information about the authenticating method related to the encrypted folder.

In operation S4650, the server 2000 authenticates the user the second time, based on the authentication data. The server 2000 may recognize the encrypted folder selected in the device 1000, and the authenticating method for the encrypted folder. Also, the server 2000 may determine whether the authentication data received from the device 1000 is valid, by using the recognized authenticating method. Then, according to a result of the determination, the server 2000 may authenticate the user.

In operation S4660, the server 2000 may provide the decryption key for the encrypted folder to the device 1000, and in operation S4670, the device 1000 decrypts the encrypted folder the second time by using the decryption key. Accordingly, the user may use the data in the decrypted folder in the device 1000.

Figure 47:
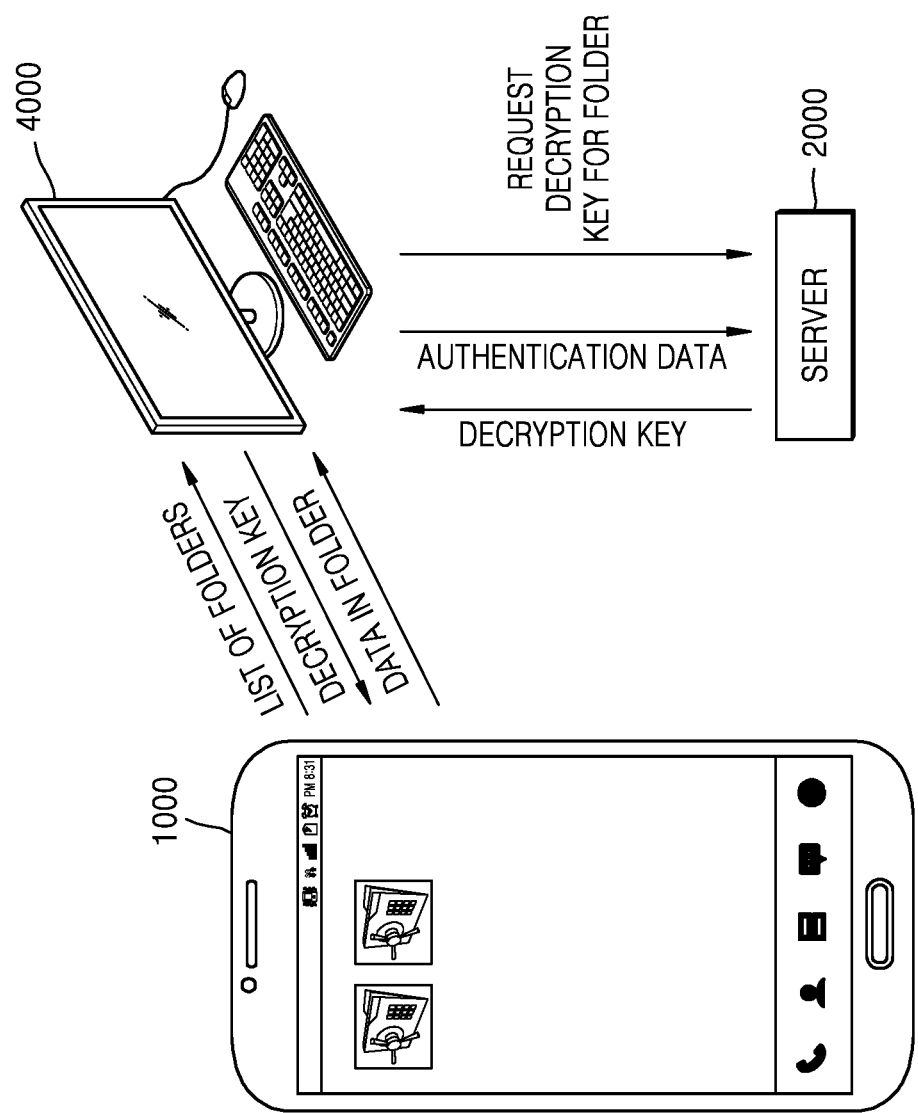
FIG. 47 illustrates an authentication system in which an external device accesses a folder in the device, according to an exemplary embodiment.

FIG. 47 illustrates an authentication system in which an external device 4000 accesses a folder in the device 1000, according to an exemplary embodiment.

Referring to FIG. 47, the external device 4000 may be connected with the device 1000 and the server 2000. The external device 4000 may receive a list of folders from the device 1000, select a particular folder from the list, and request the server 2000 for a decryption key related to the selected folder to access the selected folder.

The external device 4000 may be, but is not limited to, a smartphone, a tablet PC, a PC, a smart TV, a mobile phone, a PDA, a laptop computer, a media player, a micro-server, a GPS device, an electronic book terminal, a terminal for digital broadcasting, a navigation device, a kiosk, an MP3 player, a digital camera, and other mobile or non-mobile computing device. Also, the external device 4000 may include various devices such as an electronic blackboard, a touch table, etc. that may receive a touch input. Also, the external device 4000 may be a watch, glasses, a hair band, or a ring that has a communication function and a data processing function. However, examples of the external device 4000 are not limited thereto, and thus, the external device 4000 may include all types of devices capable of exchanging data with the device 1000 and the server 2000 via a network.

Also, a user of the external device 4000 may be same as a user of the device 1000.

Figure 48:
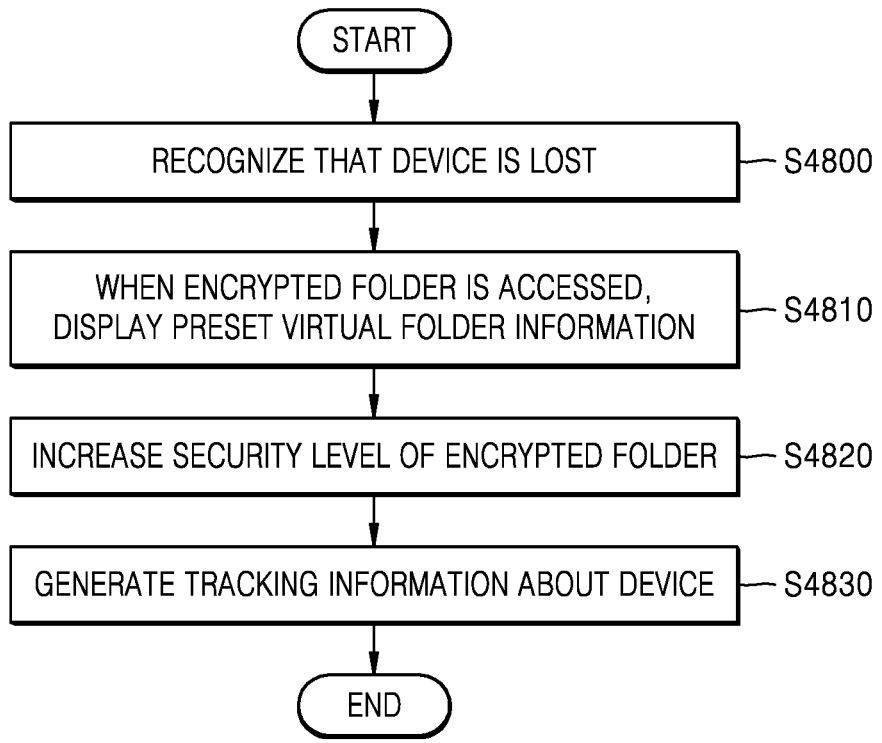
FIG. 48 illustrates an example in which, when the device is lost, the device increases a level of its security with respect to a folder, according to an exemplary embodiment.

FIG. 48 illustrates an example in which, when the device 1000 is lost, the device 1000 increases a level of its security with respect to a folder, according to an exemplary embodiment.

In operation S4800, the device 1000 may recognize that the device 1000 is lost. That is, when a user of the device 1000 lost the device 1000, the user may transmit a loss notification signal to the device 1000 via another device or the server 2000. When the device 1000 receives the loss notification signal, the device 1000 may recognize that the device 1000 is lost. Alternatively, if authentication for executing an encrypted folder in the device 1000 fails a preset number of times, the device 1000 may recognize that the device 1000 is lost.

In operation S4810, when the encrypted folder is accessed, the device 1000 may display preset virtual folder information. The virtual folder information may be used to pretend that data other than real data in a folder is included in the folder. For example, it is assumed that a file A and a file B are included in an encrypted folder of the device 1000 that is lost, and in this regard, if the device 1000 receives a user input of selecting the encrypted folder, the device 1000 may display a file C and a file D on a screen of the device 1000. Alternatively, in a case where the device 1000 is lost, if the device 1000 receives a user input of selecting the encrypted folder, the device 1000 may display a window as an empty window, wherein the window is supposed to display data in the encrypted folder. According to another exemplary embodiment, if the device 100 receives the loss notification signal, the device 100 may encrypt all the files and folders stored in the device 100 at the highest security level available.

Alternatively, in a case where the device 1000 is lost, if the device 1000 receives a user input of selecting the encrypted folder, the device 1000 may display a list of folders and subfolders in the encrypted folder and prevent the folders and the subfolders from being executed.

In operation S4820, the device 1000 may increase a security level of the encrypted folder. In more detail, the device 1000 may additionally encrypt the encrypted folder. Alternatively, the device 1000 may decrypt the encrypted folder and encrypt the decrypted folder by using an encryption key that is secured further than an encryption key that was originally used to encrypt the encrypted folder. Alternatively, the device 1000 may increase a level of a user authenticating method performed to decrypt the encrypted folder. For example, the device 1000 may change the user authenticating method or add another user authenticating method. Also, the device 1000 may change setting so that the device 1000 may activate security of a folder, regardless of a security period and a security place.

In operation S4830, the device 1000 may generate tracking information about the device 1000. The device 1000 may periodically obtain location information of the device 1000, and transmit the location information to the server 200 or another device of a user of the device 1000.

Also, the device 1000 may capture an image of a user who currently uses the device 1000, and transmit the captured image to the server 200 or another device of the user of the device 1000. In this case, the device 1000 may not display, on a screen of the device 1000, a GUI for capturing the image of the user who currently uses the device 1000. Therefore, the user who currently uses the device 1000 may not recognize that the device 1000 captures his/her image. Also, the device 1000 may store the captured image in its secret folder, depending on a network status of the device 1000. For example, if a network function of the device 1000 is inactive, the device 1000 may store the captured image in its secret folder, and afterward, when the network function of the device 1000 is activated, the device 1000 may transmit the captured image to the server 200 or another device of the user of the device 1000.

Here, the secret folder that stores the captured image may not be displayed on the screen of the device 1000 via a GUI that is provided by the device 1000. In this case, the device 1000 may store the captured image in a particular space of a memory of the device 1000.

The device 1000 may record a voice of the user who currently uses the device 1000, and transmit the recorded voice data to the server 200 or another device of the user of the device 1000. In this case, the device 1000 may not display, on the screen of the device 1000, a GUI for recording the voice of the user who currently uses the device 1000. Therefore, the user who currently uses the device 1000 may not recognize that the device 1000 records his/her voice. Also, the device 1000 may store the recorded voice data in its secret folder, depending on a network status of the device 1000. For example, if the network function of the device 1000 is inactive, the device 1000 may store the recorded voice data in its secret folder, and afterward, when the network function of the device 1000 is activated, the device 1000 may transmit the recorded voice data to the server 200 or another device of the user of the device 1000.

Figure 49:
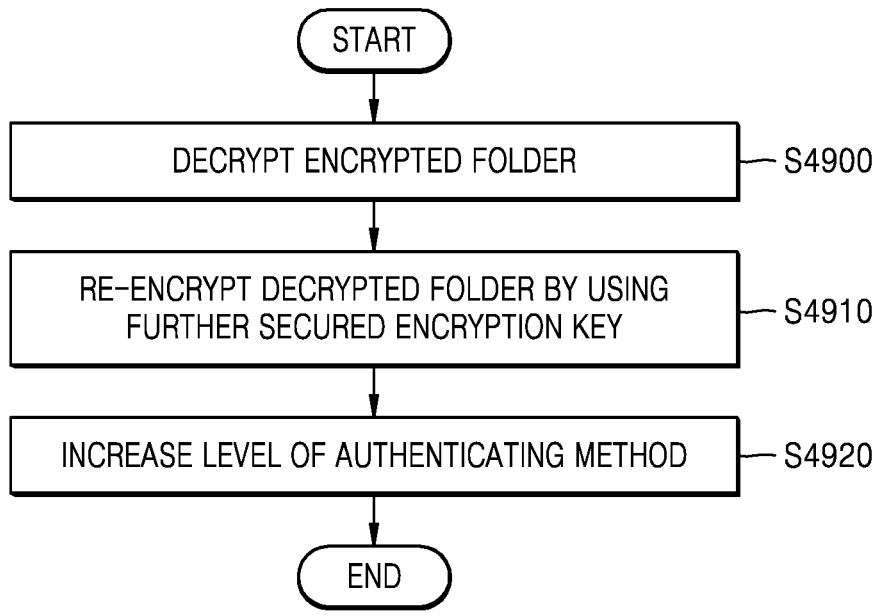
FIG. 49 illustrates increasing a security level of an encrypted folder by re-encrypting the encrypted folder, according to an exemplary embodiment.

FIG. 49 illustrates increasing a security level of an encrypted folder by re-encrypting the encrypted folder, according to an exemplary embodiment.

In operation S4900, the device 1000 may decrypt the encrypted folder. The device 1000 may recognize that the device 1000 is lost and decrypt the encrypted folder in the device 1000.

In operation S4910, the device 1000 may re-encrypt the decrypted folder by using a further secured encryption key. The device 1000 may obtain the encryption key that is further secured than an encryption key that was used in encrypting the encrypted folder. Then, the device 1000 may re-encrypt the decrypted folder by using the obtained further secured encrypted key.

In operation S4920, the device 1000 may increase a level of a user authenticating method. The device 1000 may add an authenticating method for decryption of the encrypted key. For example, in a case where the user authenticating method for decryption of the encrypted key is an authenticating method using a user ID and password, an authenticating method using biological information may be added as the user authenticating method for decryption of the encrypted key. In this case, in order to authenticate a user who attempts to decrypt the encrypted folder, the device 1000 may receive a user ID and password from the user and also receive an input of biological information of the user from the user.

The device 1000 may change the authenticating method for decryption of the encrypted key. For example, in a case where the user authenticating method for decryption of the encrypted key is the authenticating method using the user ID and password, the user authenticating method for decryption of the encrypted key may be changed to an authenticating method using an OTP device. In this case, in order to authenticate the user who attempts to decrypt the encrypted folder, the device 1000 may receive an input of a password of the OTP device from the user.

Figure 50:
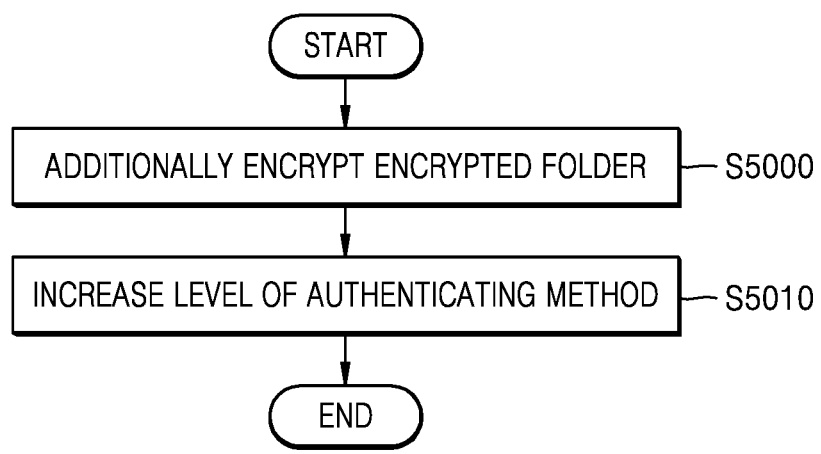
FIG. 50 illustrates increasing a security level of an encrypted folder by additionally encrypting the encrypted folder, according to an exemplary embodiment.

FIG. 50 illustrates increasing a security level of an encrypted folder by additionally encrypting the encrypted folder, according to an exemplary embodiment.

In operation S5000, the device 1000 may additionally encrypt the encrypted folder. The device 1000 may recognize that the device 1000 is lost, and thus, may additionally encrypt the encrypted folder in the device 1000.

In operation S5010, the device 1000 may increase a level of an authenticating method for user authentication. The device 1000 may add an authenticating method for decryption of the encrypted folder. Also, the device 1000 may change an authenticating method for decryption of the encrypted folder.

Figure 51:
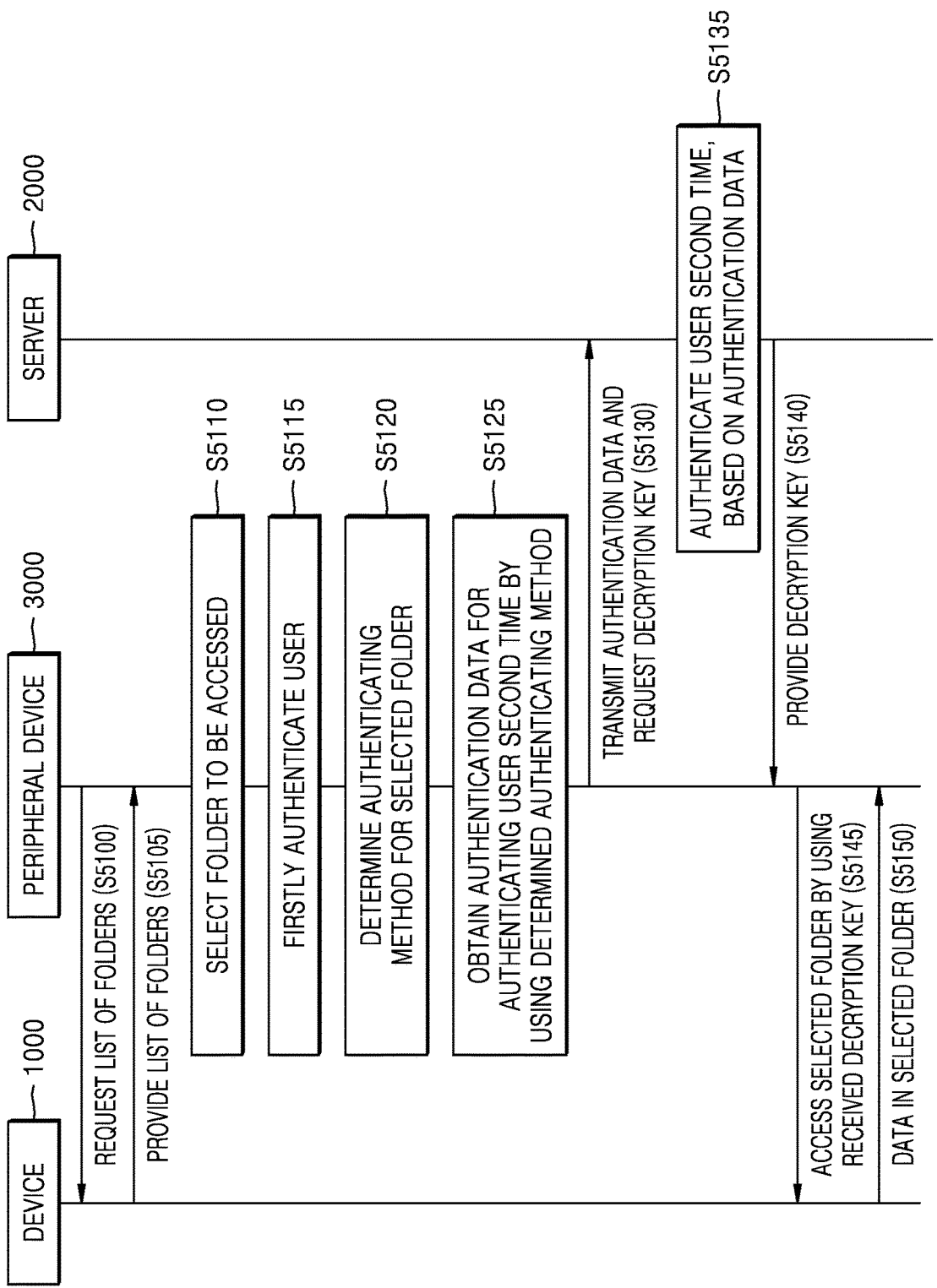
FIG. 51 illustrates accessing a folder in the device, according to an exemplary embodiment.

FIG. 51 illustrates accessing a folder in the device 1000, according to an exemplary embodiment.

In operation S5100, the external device 4000 may request the device 1000 for a list of folders. The external device 4000 may be connected with the device 1000 for communication, and request the device 1000 for the list of folders in the device 1000.

In operation S5105, the device 1000 may provide the list of folders to the external device 4000. The device 1000 may provide, in response to the request from the external device 4000, the list of folders in the device 1000 to the external device 4000. In this case, one or more folders that are providable to the external device 4000 according to an ID value of the external device 4000 may be preset. The device 1000 may provide a list of preset folders to the external device 4000. However, one or more exemplary embodiments are not limited thereto.

In operation S5110, the external device 4000 may select a folder to be accessed. The external device 4000 may display the list of folders on a screen of the external device 4000, and select the folder, based on a user input of selecting the folder from the list of folders.

In operation S5125, the external device 4000 may firstly authenticate a user. The external device 4000 may firstly authenticate the user who attempts to use data in the folder. For example, the external device 4000 may receive an input of a user ID and password from the user, and firstly authenticate the user based on the input user ID and password. However, a method of firstly authenticating the user is not limited thereto. In this case, the external device 4000 may previously receive, from the device 1000 or the server 2000, data required for the external device 4000 to firstly authenticate the user. In this case, operation S5125 may be omitted.

In operation S5120, the external device 4000 may determine an authenticating method for the selected folder. The external device 4000 may determine the authenticating method so as to make the server 2000 authenticate the selected folder a second time. The external device 4000 may display a list of authenticating methods for the selected folder on the screen, and select, based on a user input of selection, at least one authenticating method from the list of authenticating methods. In this case, the external device 4000 may previously receive, from the device 1000 or the server 2000, the preset list of authenticating methods for the selected folder.

In operation S5125, the external device 4000 may obtain authentication data for authenticating the user the second time by using the determined authenticating method. The external device 4000 may obtain the authentication data so as to request the server 2000 to authenticate the user the second time by using the determined authenticating method.

For example, in a case where a method of authenticating the user the second time by using an OTP is determined, the external device 4000 may receive a user input of a password of an OTP device.

For example, in a case where a method of authenticating the user the second time by using a user ID and password is determined, the external device 4000 may obtain, as the authentication data, a user ID and password input by the user.

For example, in a case where a method of authenticating the user the second time by using an authentication certificate that was issued to the user is determined, the external device 4000 may obtain, as the authentication data, the authentication certificate and a password that is input by the user.

In operation S5130, the external device 4000 may transmit the authentication data to the server 2000, and request the server 2000 for a decryption key for the selected folder. Also, the external device 4000 may transmit, to the server 2000, an ID value of the selected folder, and information about the authenticating method related to the selected folder.

In operation S5135, the server 2000 may authenticate the user the second time, based on the authentication data. The server 2000 may recognize the selected folder and the authenticating method related to the selected folder. Also, the server 2000 may determine whether the authentication data received from the device 1000 is valid, by using the recognized authenticating method. Then, the server 2000 may authenticate the user, based a result of the determination. When the user is authenticated the second time, the server 2000 may obtain a decryption key for decrypting the selected folder.

In operation S5140, the server 2000 may provide the decryption key for the selected folder to the external device 4000, and in operation S5145, the external device 4000 may access the selected folder by using the received decryption key. The external device 4000 may provide, to the device 1000, the decryption key received from the server 2000, and thus may access the selected folder in the device 1000, and in operation S5150, the device 1000 may transmit data in the selected folder to the external device 4000.

Figure 52:
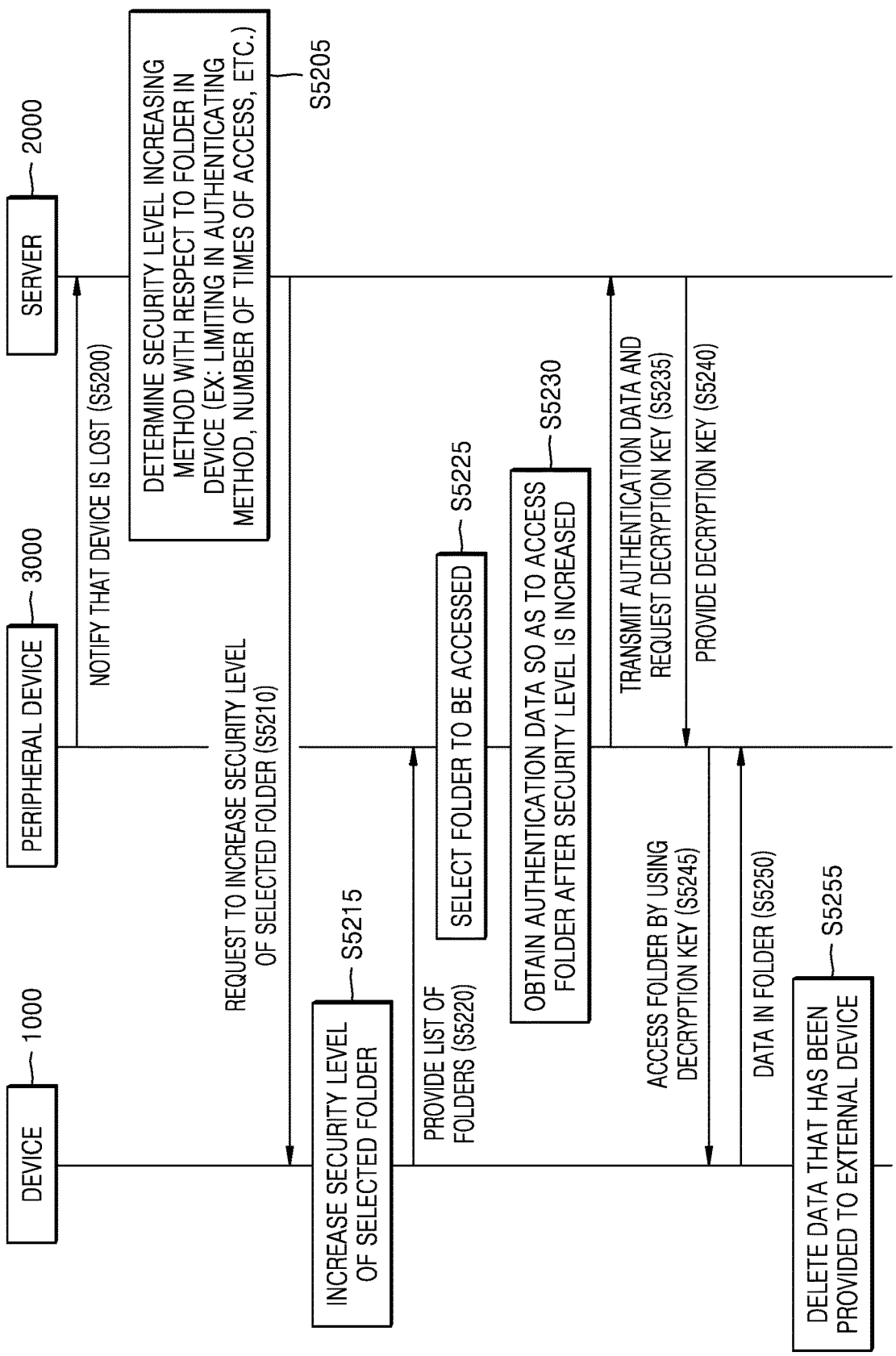
FIG. 52 illustrates an example in which, when the device is lost, the server increases a security level of a folder in the device, according to an exemplary embodiment.

FIG. 52 illustrates an example in which, when the device 1000 is lost, the server 2000 increases a security level of a folder in the device 1000, according to an exemplary embodiment.

In operation S5200, the external device 4000 may notify the server 2000 that the device 1000 is lost. Based on a user input of a user who lost the device 1000, the external device 4000 may transmit a loss notification signal to the server 2000.

In operation S5205, the server 2000 may determine a security level increasing method with respect to the folder in the device 1000. For example, the security level increasing method may include, but is not limited to, a method of applying a further-secured authenticating method to the folder, a method of changing an encryption level of the folder, and a method of limiting the number of times of accessing the folder. As the encryption level is changed, the folder may be additionally encrypted or may be re-encrypted by using another encryption key. Alternatively, the security level increasing method with respect to the folder may be preset by the server 2000. For example, an authenticating method for a folder 'A' is a method of using a user ID and password, the server 2000 may change the authenticating method for the folder 'A' as an authenticating method using an authentication certificate. Also, the server 2000 may change setting so that the device 1000 may activate security of the selected folder, regardless of a security period and a security place.

In operation S5210, the server 2000 may request the device 1000 to increase a security level of the selected folder. The server 2000 may provide, to the device 1000, security level increase information indicating how to increase the security level of the selected folder. For example, the server 2000 may provide, to the device 1000, information indicating the changed authenticating method, information indicating changed encryption, and information indicating the number of times of accessing the selected folder.

In operation S5215, the device 1000 may increase the security level of the selected folder. In more detail, the device 1000 may increase the security level of the selected folder in the device 1000 by using the security level increase information received from the server 2000. For example, the device 1000 may change an authentication condition to access the selected folder in the device 1000. As another example, the device 1000 may change setting so that the device 1000 may activate security of the selected folder, regardless of a security period and a security place. When the security of the selected folder is activated, the device 1000 or the external device 4000 may access the selected folder only when the user is authenticated.

In operation S5220, the device 1000 may provide a list of folders to the external device 4000. In response to a request from the external device 4000, the device 1000 may provide the list of folders in the device 1000 to the external device 4000.

In operation S5225, the external device 4000 may select the folder to be accessed. The external device 4000 may display the list of folders on a screen of the external device 4000, and select the folder based on a user input of selecting the folder.

In operation S5230, the external device 4000 may obtain authentication data so as to access the folder after the security level is increased. The external device 4000 may obtain the security level increase information about the folder from the device 1000 or the server 2000, and obtain, based on the security level increase information, the authenticate data so as to authenticate the user who uses the folder.

In S5235, the external device 4000 may transmit the authentication data to the server 2000 and request the server 2000 for a decryption key related to the folder, and in operation S5240, the server 2000 may provide the decryption key related to the folder to the external device 4000. In operation S5245, the external device 4000 may access the folder in the device 1000 by using the decryption key received from the server 2000.

In operation S5250, the device 1000 may provide data in the folder to the external device 4000. The device 1000 may receive the decryption key from the external device 4000, and may transmit the data in the folder to the external device 4000. In operation S5255, the device 1000 may delete the data that has been provided to the external device 4000.

Figure 53:
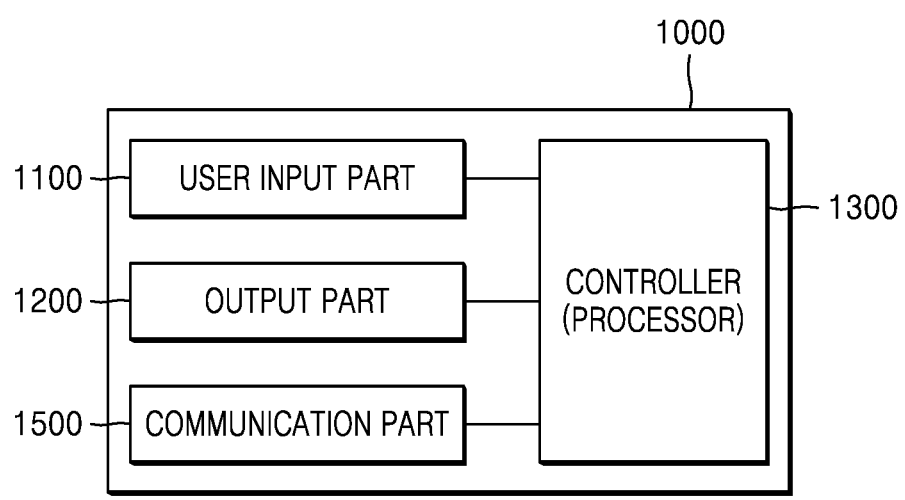
FIGS. 53 and 54 are block diagrams illustrating the device, according to exemplary embodiments.
Figure 54:
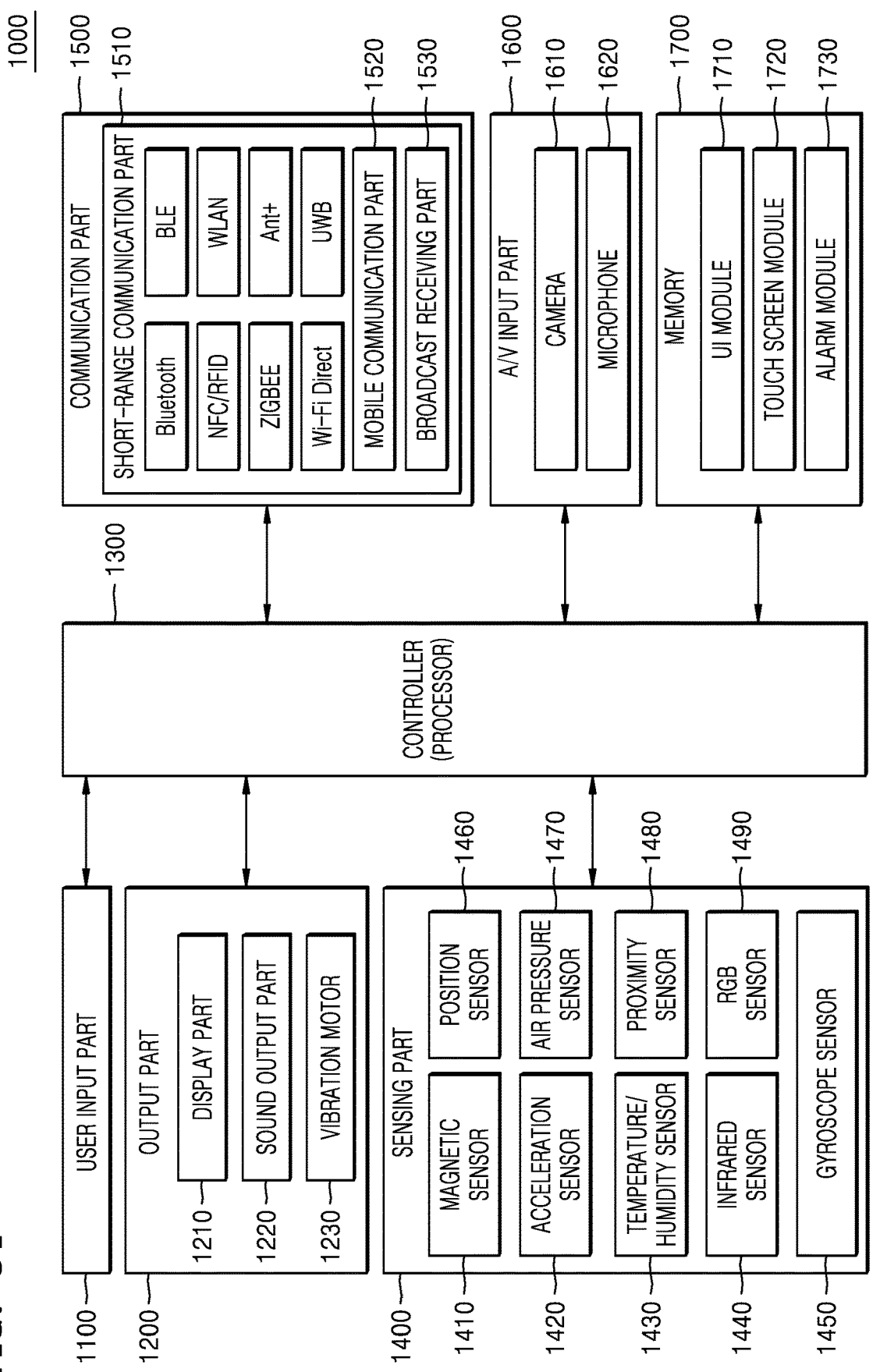

FIGS. 53 and 54 are block diagrams illustrating the device 1000, according to exemplary embodiments.

As illustrated in FIG. 53, the device 1000 may include a user input part 1100, an output part 1200, a controller 1300, and a communication part 1500.

However, not all elements shown in FIG. 53 are necessary elements of the device 1000. That is, the device 1000 may be embodied with more or less elements than the elements shown in FIG. 53.

For example, as illustrated in FIG. 54, in one or more exemplary embodiments, the device 1000 may further include a sensing part 1400, an audio/video (A/V) input part 1600, and a memory 1700, as well as the user input part 1100, the output part 1200, the controller 1300, and the communication part 1500.

The user input part 1100 may be a part by which a user inputs data so as to control the device 1000. For example, the user input part 1100 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a piezo effect type touch pad, or the like), a jog wheel, a jog switch, etc., but one or more exemplary embodiments are not limited thereto.

The user input part 1100 may receive a user input of selecting an encryption target folder and a user input of receiving an encrypted folder. Also, the user input part 1100 may receive a user input of authentication data.

The output part 1200 may output an audio signal, a video signal, or a vibration signal and may include a display part 1210, a sound output part 1220, a vibration motor 1230, or the like.

The display part 1210 displays and outputs information that is processed in the device 1000. For example, the display part 1210 may display a folder, an encrypted folder, a window indicating data in a folder, a GUI for receiving an input of authentication data, or the like.

When the display part 1210 and a touch pad form a mutual layer structure and then are formed as a touch screen, the display part 1210 may be used as both an output device and input device. The display part 1210 may include at least one of a liquid crystal display (LCD), a thin film transistor-liquid crystal display (TFT-LCD), an organic light-emitting diode (OLED) display, a flexible display, a three-dimensional (3D) display, and an electrophoretic display. Also, according to a type of the device 1000, the device 1000 may include at least two display parts 1210. Here, the at least two display parts 1210 may be disposed to face each other by using a hinge.

The sound output part 1220 may output audio data that is received from the communication part 1500 or stored in the memory 1700. The sound output part 1220 may also output a sound signal (e.g., a call signal receiving sound, a message receiving sound, a notifying sound, or the like) related to capabilities performed by the device 1000. The sound output part 1220 may include a speaker, a buzzer, or the like.

The vibration motor 1230 may output a vibration signal. For example, the vibration motor 1230 may output the vibration signal that corresponds to an output of the audio data (e.g., the call signal receiving sound, the message receiving sound, or the like) or video data. Also, when a touch is input to the touch screen, the vibration motor 1230 may output a vibration signal.

The controller 1300 (also referred to as 'processor 1300) may generally control all operations of the device 1000. For example, the controller 1300 may control the user input part 1100, the output part 1200, the sensing part 1400, the communication part 1500, the A/V input part 1600, etc. by executing programs stored in the memory 1700.

In more detail, the controller 1300 may receive a user input for encrypting a folder in the device 1000. The controller 1300 may display the folder on a screen of the controller 1300, and receive the user input of selecting the folder so as to encrypt the folder. For example, when the user selects the folder on the screen of the device 1000, a list of execution operations related to the folder may be displayed on the screen of the device 1000. Also, the controller 1300 may receive a user input of selecting a field for folder encryption from the list of the execution operations. Also, the controller 1300 may select the whole folder or may select some files in the folder and some subfolders of the folder.

The controller 1300 may obtain authentication data for authenticating the user. The controller 1300 may determine an authenticating method related to the folder, and obtain the authentication data so as to request the server 2000 to authenticate the user by using the determined authenticating method. In this case, at least one authenticating method related to the folder may be previously set, and the controller 1300 may obtain the authentication data for authenticating the user by using the preset authenticating method.

The controller 1300 may display, on the screen of the device 1000, a selection list for selection of the authenticating method related to the folder, and may receive a user input of selecting the authenticating method. However, one or more exemplary embodiments are not limited thereto, and thus, the controller 1300 may determine, according to preset standards, the authenticating method related to the folder, without receiving a separate user input.

The controller 1300 may display a user interface on the screen of the device 1000 so as to receive an input of the authentication data, and obtain the authentication data, based on a user input via the user interface.

The controller 1300 may transmit the authentication data to the server 2000. The controller 1300 may transmit the authentication data to the server 2000 and thus, request an encryption key for encryption of the folder. Also, the controller 1300 may transmit, to the server 2000, an ID value and information about the authenticating method that are related to the folder selected in the device 1000.

The controller 1300 may receive the encryption key related to the authentication data from the server 2000. The controller 1300 may encrypt the folder by using the received encryption key. In this case, a folder encrypting method may be preset in the device 1000. Also, the controller 1300 may encrypt the folder in the device 1000, by using the folder encrypting method using the encryption key received from the server 2000. However, one or more exemplary embodiments are not limited thereto, and thus, when the controller 1300 receives the encryption key from the server 2000, the controller 1300 may also receive information about the folder encrypting method. In this case, the controller 1300 may encrypt the folder in the controller 1300, based on the information about the folder encrypting method that is received from the server 2000. Also, after the controller 1300 encrypts the folder, the controller 1300 may discard the encryption key that was used in encrypting the folder. For example, when it is determined that the folder has been encrypted, the controller 1300 may not store but may delete the encryption key that was used in encrypting the folder.

Also, the controller 1300 may transmit the number of times of decryption of an encrypted folder to the server 2000. The controller 1300 may transmit an ID value of the encrypted folder and the counted number of times to the server 2000. The controller 1300 may receive a decryption key and an updated encryption key with respect to the encrypted folder from the server 2000. The controller 1300 may decrypt the encrypted folder by using the decryption key, and may encrypt the decrypted folder by using the updated encryption key. After the controller 1300 encrypts the decrypted folder by using the updated encryption key, the controller 1300 may notify the server 2000 that the decrypted folder has been encrypted by using the updated encryption key. Also, the controller 1300 may discard the updated encryption key.

Also, if a network between the device 1000 and the server 2000 is unstable or is not established, the controller 1300 may encrypt the folder by using an encryption key in the device 1000. In this case, the controller 1300 may determine the encryption key so as to encrypt the folder by using a preset encrypting method, and encrypt the folder by using the determined encryption key. The controller 1300 may encrypt the folder by using the encryption key that is stored in the device 1000. Alternatively, the controller 1300 may generate the encryption key and encrypt the folder by using the generated encryption key.

Afterward, as the network between the device 1000 and the server 2000 becomes stable, the controller 1300 may transmit the authentication data and the encryption key to the server 2000. Also, the controller 1300 may transmit information about the encrypting method related to the folder to the server 2000. For example, the controller 1300 may transmit, to the server 2000, the information indicating whether the folder was encrypted by using a symmetric-key algorithm or an asymmetric-key algorithm. Also, the controller 1300 may transmit the decryption key for decryption of the folder to the server 2000. The decryption key may be same as or different from the encryption key.

The controller 1300 selects a folder for which the authenticating method is to be set and may set the authenticating method for the selected folder.

The controller 1300 may select, based on a user input, at least one authenticating method for the selected folder. The authenticating method may include an authenticating method using an OTP device, an authenticating method using a user ID/password, an authenticating method using an authentication certificate that has been issued to the user, and an authenticating method using biological information of the user.

The controller 1300 may set the encrypting method for the selected folder. The controller 1300 may set the encrypting method for the selected folder and may set a length of the encryption key. Also, the controller 1300 may set a condition for encryption of the selected folder.

The controller 1300 may transmit setting information about the authenticating method and the encrypting method to the server 2000. The controller 1300 may transmit, to the server 2000, the setting information about the authenticating method for the selected folder, and authentication data associated with the selected encrypting method. Also, the controller 1300 may transmit the setting information about the encrypting method for the selected folder to the server 2000.

The controller 1300 may select a decryption target folder. The controller 1300 may display a list of folders in the device 1000 on the screen of the device 1000, and receive a user input of selecting the encrypted folder from the displayed list. Alternatively, the controller 1300 may select a wholly-encrypted folder or a partially-encrypted folder.

The controller 1300 may obtain authentication data for user authentication. The controller 1300 may display a message indicating an authenticating method related to a selected folder, and obtain the authentication data based on a user input so as to make the user authentication performed on the selected folder by using the authenticating method related to the selected folder. In this case, the controller 1300 may obtain information about at least one authenticating method associated with the selected folder from a memory of the device 1000 or the server 2000.

If a plurality of authenticating methods are set with respect to the selected folder, the controller 1300 may obtain a plurality of pieces of authentication data that correspond to the plurality of authenticating methods, respectively.

The controller 1300 may transmit the obtained authentication data to the server 2000 and request the server 2000 for a decryption key. The controller 1300 may transmit, to the server 2000, a user ID of the device 1000, an ID value of the device 1000, an ID value of the selected folder.

When the server 2000 authenticates the user, the controller 1300 may receive, from the server 2000, the decryption key for the selected folder. The server 2000 may authenticate the user by using the authentication data received from the device 1000. Also, when the user is authenticated, the controller 1300 may receive, from the server 2000, the decryption key that is matched with the authentication data. The controller 1300 may decrypt the selected folder by using the decryption key, and thus, may execute data in the decrypted folder.

When the encrypted folder is selected, the controller 1300 may detect the peripheral device 3000 around the device 1000. The controller 1300 may recognize the peripheral device 3000, and determine whether the recognized peripheral device 3000 is a preset device.

The controller 1300 may determine an authenticating method that corresponds to the peripheral device 3000. The authenticating method that corresponds to the peripheral device 3000 may be previously set, and when the peripheral device 3000 is detected, the controller 1300 may determine the authenticating method. The preset authenticating method may include, but is not limited to, an authenticating method that uses biological information obtained by the peripheral device 3000.

The controller 1300 may obtain authentication data for authenticating the user. When the peripheral device 3000 is detected, the device 1000 may request the peripheral device 3000 for the biological information of the user, and may receive the biological information of the user from the peripheral device 3000. Also, when the peripheral device 3000 is detected, the controller 1300 may obtain the authentication data, based on a user input. Then, the controller 1300 may provide the obtained authentication data to the server 2000.

The controller 1300 may firstly authenticate the user who attempts to use data in the selected folder, and obtain authentication data to be used in authenticating the user the second time. The controller 1300 may provide the obtained authentication data to the server 2000 and request the server 2000 for a decryption key and to authenticate the user the second time.

The controller 1300 may recognize that the device 1000 is lost. That is, as the user of the device 1000 lost the device 1000, the controller 1300 may receive a loss notification signal with respect to the device 1000 from another device of the user or the server 2000. When the controller 1300 receives the loss notification signal, the controller 1300 may recognize that the device 1000 is lost. Alternatively, if authentication for executing the encrypted folder in the device 1000 fails a preset number of times, the controller 1300 may recognize that the device 1000 is lost.

When the encrypted folder is selected, the controller 1300 may display preset virtual folder information. Alternatively, in a case where the device 1000 is lost, if the device 1000 receives a user input of selecting the encrypted folder, the controller 1300 may display a window as an empty window, wherein the window is supposed to display data in the encrypted folder. Alternatively, in a case where the device 1000 is lost, if the device 1000 receives a user input of selecting the encrypted folder, the controller 1300 may display a list of folders and subfolders in the encrypted folder and prevent the folders and the subfolders in the encrypted folder from being executed. According to another exemplary embodiment, if the device 100 receives the loss notification signal from the server 2000 or another device of the user of the device 100, the device 100 may encrypt all the folders, subfolders, and files stored in the device 100 at the highest security level available. As a result, the device 100 may display all the folders, subfolders, and files as being encrypted.

The controller 1300 may increase a security level of the encrypted folder. In more detail, the controller 1300 may additionally encrypt the encrypted folder. Alternatively, the controller 1300 may decrypt the encrypted folder and may encrypt the decrypted folder by using an encryption key that is secured further than an encryption key that was originally used in encrypting the encrypted folder. Alternatively, the device 1000 may increase a level of a user authenticating method performed to decrypt the encrypted folder.

The controller 1300 may generate tracking information about the device 1000. The controller 1300 may periodically obtain location information of the device 1000, and transmit the location information to the server 200 or another device of the user of the device 1000.

Also, the controller 1300 may capture an image of a user who currently uses the device 1000, and transmit the captured image to the server 200 or another device of the user of the device 1000. In this case, the controller 1300 may not display, on the screen of the device 1000, a GUI for capturing the image of the user who currently uses the device 1000. Also, the controller 1300 may store the captured image in its secret folder, depending on a network status of the device 1000.

Also, the controller 1300 may record a voice of the user who currently uses the device 1000, and transmit the recorded voice data to the server 200 or another device of the user of the device 1000. In this case, the controller 1300 may not display, on the screen of the device 1000, a GUI for recording the voice of the user who currently uses the device 1000.

The controller 1300 may store the encrypted folder of the device 1000 as a backup in the server 2000, and delete files and subfolders in the encrypted folder from the device 1000.

The sensing part 1400 may sense a state of the device 1000 or a status around the device 1000 and transfer sensed information to the controller 1300.

The sensing part 1400 may include at least one selected from a magnetic sensor 1410, an acceleration sensor 1420, a temperature/humidity sensor 1430, an infrared sensor 1440, a gyroscope sensor 1450, a position sensor (e.g., GPS) 1460, an air pressure sensor 1470, a proximity sensor 1480 and an RGB sensor (i.e., a luminance sensor) 1490, but one or more exemplary embodiments are not limited thereto. Functions of the sensors may be intuitionally deduced by one of ordinary skill in the art by referring to names of the sensors, and thus, detailed descriptions thereof are omitted here.

The communication part 1500 may include one or more elements allowing the device 1000 to communicate with the server 2000 or the external device 4000. For example, the communication part 1500 may include a short-range communication part 1510, a mobile communication part 1520, and a broadcast receiving part 1530.

The short-range communication part 1510 may include, but is not limited thereto, a Bluetooth communication part, a Bluetooth Low Energy (BLE) communication part, a near field wireless communication part, a wireless local area network (WLAN) communication part, a ZigBee communication part, an infrared Data Association (IrDA) communication part, a Wi-Fi Direct (WFD) communication part, an ultra wideband (UWB) communication part, or an Ant+ communication part.

The mobile communication part 1520 exchanges a wireless signal with at least one selected from a base station, an external terminal, and a server on a mobile communication network. The wireless signal may include various types of data according to communication in regard to a sound call signal, a video call signal, or a text/multimedia message.

The broadcast receiving part 1530 receives a broadcast signal and/or information related to broadcast from the outside through a broadcast channel. The broadcast channel may include a satellite channel and a ground wave channel. According to an embodiment, the device 1000 may not include the broadcast receiving part 1530.

The communication part 1500 may exchange information with the server 2000 and the external device 4000, wherein the information is used in encrypting and decrypting a folder and in authenticating execution of the folder.

The A/V input part 1600 may receive an input of an audio signal or a video signal and may include a camera 1610 and a microphone 1620. The camera 1610 may obtain an image frame such as a still image or a moving picture via an image sensor during a video call mode or an image-capturing mode. An image that is captured via the image sensor may be processed by the controller 1300 or a separate image processing unit.

The image frame that is processed by the camera 1610 may be stored in the memory 1700 or transmitted to an external source via the communication part 1500. According to a configuration of the device 1000, two or more cameras 1610 may be arranged.

The microphone 1620 receives an input of an external sound signal and processes the received sound signal into electrical voice data. For example, the microphone 1620 may receive a sound signal from the external device 4000 or a speaker. In order to remove noise that occurs while the sound signal is externally input, the microphone 1620 may use various noise removing algorithms.

The memory 1700 may store a program for processing and controlling the controller 1300, and store a plurality of pieces of data that are input to the device 1000 or output from the device 1000.

The memory 1700 may include a storage medium of at least one type selected from a flash memory, a hard disk, a multimedia card type memory, a card type memory such as an SD or XD card memory, a random access memory (RAM), a static random access memory (SRAM), a read-only memory (ROM), an electrically erasable programmable read-only memory (EEPROM), a programmable read-only memory (PROM), a magnetic memory, a magnetic disc, and an optical disc.

The programs stored in the memory 1700 may be classified into a plurality of modules according to their functions, for example, a user interface (UI) module 1710, a touch screen module 1720, an alarm module 1730, etc.

The UI module 1710 may provide a specialized UI or a GUI in connection with the device 1000 for each application. The touch screen module 1720 may detect a user's touch gesture on a touch screen and transmit information related to the touch gesture to the controller 1300. In one or more exemplary embodiments, the touch screen module 1720 may recognize and analyze a touch code. The touch screen module 1720 may be configured by using additional hardware including a controller.

Various sensors may be arranged in or near the touch screen so as to detect a touch or a proximate touch on the touch sensor. An example of the sensor to detect the touch on the touch screen may include a tactile sensor. The tactile sensor detects a contact of a specific object at least as sensitively as a person can detect. The tactile sensor may detect various types of information such as the roughness of a contact surface, the hardness of the contact object, the temperature of a contact point, or the like.

An example of the sensor to detect the touch on the touch screen may include a proximity sensor.

The proximity sensor detects the existence of an object that approaches a predetermined detection surface or exists nearby by using a force of an electro-magnetic field or an infrared ray, instead of a mechanical contact. Examples of the proximity sensor include a transmission-type photoelectric sensor, a direction reflection-type photoelectric sensor, a mirror reflection-type photoelectric sensor, a high frequency oscillation-type proximity sensor, a capacity-type proximity sensor, a magnetic proximity sensor, an infrared-type proximity sensor, or the like. The touch gesture (i.e., an input) of the user may include a tap gesture, a touch & hold gesture, a double tap gesture, a drag gesture, a panning gesture, a flick gesture, a drag & drop gesture, a swipe gesture, or the like.

The alarm module 1730 may generate a signal for notifying the user of an occurrence of an event in the device 1000. Examples of the event that occurs in the device 1000 may include a call signal reception, a message reception, a key signal input, schedule notification, or the like. The alarm module 1730 may output a video-format alarm signal via a display part 1210, output an audio-format alarm signal via the sound output part 1220, or a vibration signal via the vibration motor 1230.

Figure 55:
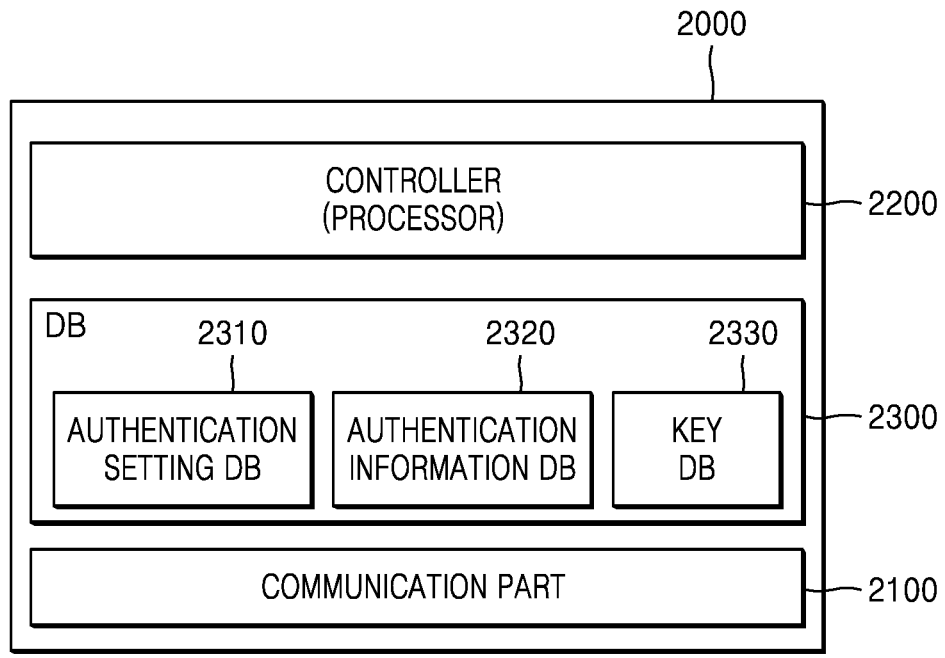
FIG. 55 is a block diagram illustrating the server, according to an exemplary embodiment.

FIG. 55 is a block diagram illustrating the server 2000, according to an exemplary embodiment.

As illustrated in FIG. 55, the server 2000 may include a communication part 2100, a controller 2200, and a DB 2300. Also, the DB 2300 of the server 2000 may include an authentication setting DB 2310, an authentication information DB 2320, and a key DB 2330.

The communication part 2100 may include one or more elements allowing the server 2000 to communicate with the device 1000 or the external device 4000. The communication part 2100 may exchange information with the device 1000 and the external device 4000, wherein the information is required for authentication to make the folder executed. Also, the communication part 2100 may exchange an encryption key and a decryption key for the folder with the device 1000 and the external device 4000.

The controller 2200 (also referred to as 'processor 2200') may generally control all operations of the server 2000. For example, the controller 2200 may control the communication part 2100, the DB 2300, etc. by executing programs stored in the DB 2300.

The controller 2200 may receive the obtained authentication data from the device 1000, and receive, from the device 1000, a request for the encryption key for the folder in the device 1000.

Also, the controller 2200 may register the authentication data received from the device 1000. In more detail, the controller 2200 may match the authentication data received from the device 1000 with the user of the device 1000, the device 1000, the authenticating method, and the folder, and store the matched authentication data in the DB 2300 in the server 2000.

The controller 2200 may match the authentication data with the encryption key. The controller 2200 may obtain the encryption key for encrypting the folder, and match the encryption key with the authentication data. The controller 2200 may obtain the encryption key by extracting the encryption key stored in the DB 2300 in the server 2000 or by generating the encryption key.

If a preset standard with respect to folder encryption exists, the controller 2200 may select an encryption key according to the preset standard, match the selected encryption key with the authentication data, and store the selected encryption key. If the encrypting method is performed by using a asymmetric-key algorithm, the device 1000 may obtain an encryption key for folder encryption, separately obtain a decryption key for folder decryption, match the decryption key with the encryption key, and store the decryption key and the encryption key.

The controller 2200 may provide the encryption key matched with the authentication data to the device 1000. The controller 2200 may transmit, to the device 1000, the encryption key matched with the authentication data and information about the encrypting method.

The controller 2200 may update the encryption key for the selected folder. In more detail, the controller 2200 may receive, from the device 1000, information about the number of times of decryption of the selected folder in the device 1000. Also, the controller 2200 may recognize an expiration date of an encryption key for the encrypted folder. The controller 2200 may determine whether to update the encryption key for the encrypted folder. In more detail, the controller 2200 may determine whether to update the encryption key for the encrypted folder, based on at least one of the number of times of decryption of the encrypted folder and the recognized expiration date. For example, if the number of times of decryption of the encrypted folder is greater than the preset number of times, the controller 2200 may determine to update the encryption key for the encrypted folder. As another example, a period from a time when the folder was encrypted to a current time is greater than the recognized expiration date, the controller 2200 may determine to update the encryption key for the encrypted folder. However, a reference by which the server 2000 determines whether to update the encryption key for the encrypted folder is not limited to the aforementioned description, and the controller 2200 may determine whether to update the encryption key for the encrypted folder, based on various references. The controller 2200 may transmit a decryption key and an updated encryption key for the encrypted folder to the device 1000. The controller 2200 may extract the decryption key for the encrypted folder from the DB 2300. The decryption key for the encrypted folder may be same as an encryption key that was used in encrypting the selected folder, but one or more exemplary embodiments are not limited thereto. The server 2000 may generate the updated encryption key or extract the updated encryption key from the DB 2300. The updated encryption key may be associated with the folder and then stored in the DB 2300.

The controller 2200 may authenticate execution of the encrypted folder in the device 1000, and may provide the decryption key for the encrypted folder to the device 1000. In more detail, the controller 2200 may receive, from the device 1000, authentication data so as to authenticate execution of the encrypted folder. Also, the controller 2200 may receive, from the device 1000, an ID value of the folder selected in the device 1000 and information about the authenticating method related to the selected folder.

The controller 2200 may authenticate the user of the device 1000, based on the authentication data. Authenticating the user of the device 1000 may mean authenticating the user who executes the encrypted folder in the device 1000 or authenticating execution of the encrypted folder in the device 1000. The controller 2200 may authenticate the user by comparing the authentication data received from the device 1000 with authentication data stored in the DB 2300. When the user is authenticated, the controller 2200 may extract the decryption key for decryption of the encrypted folder from the DB 2300. The controller 2200 may provide the decryption key for the encrypted folder to the device 1000. Accordingly, the user of the device 1000 may use data in the folder. In addition, the controller 2200 may provide the description key to other devices which are owned by the user of the device 1000 and connected to the server 2000 through the communication part 2100 so that an encryption state of the other devices may be synchronized with the device 1000. The other devices may be registered in the DB 2300 of the server 2000 under the same user ID and password as the device 100. The controller 2200 may be able to recognize that the user of the device 100 owns the other devices based on the registered user ID and password.

When user authentication fails a preset number of times, the controller 2200 may request the device 1000 for tracking information. Accordingly, the device 1000 may generate location information of the device 1000, a captured image of the user who uses the device 1000, and recorded voice data of the user who uses the device 1000. The controller 2200 may receive the tracking information from the device 1000.

The DB 2300 may include the authentication setting DB 2310, the authentication information DB 2320, and the key DB 2330. The authentication setting DB 2310 may store information about the authenticating method and encryption/decryption methods related to the selected folder. The authenticating method and encryption/decryption methods related to the selected folder may be set according to a preset standard.

The authentication information DB 2320 may store authentication data related to the selected folder. When the ID value of the selected folder and the authentication data are received from the device 1000, the authentication information DB 2320 may associated the ID value of the selected folder with the authentication data and may store them.

The key DB 2330 may store the encryption key and the decryption key for the selected folder. The encryption key may be equal to or different from the decryption key. When the encryption key is updated, the key DB 2330 may store the updated encryption key.

Figure 56:
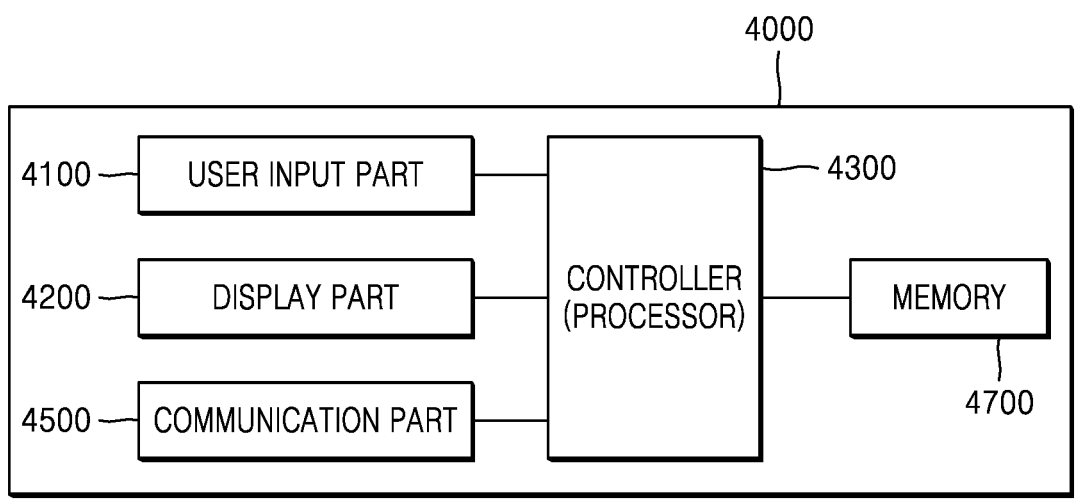
FIG. 56 is a block diagram illustrating the external device, according to an exemplary embodiment.

FIG. 56 is a block diagram illustrating the external device 4000, according to an exemplary embodiment.

Referring to FIG. 56, the external device 4000 may include a user input part 4100, a display part 4200, a controller 4300, a communication part 4500, and a memory 4700.

The user input part 4100 may receive a user input of data for controlling the external device 4000, and the display part 4200 may display and may output information that is processed in the external device 4000. The communication part 4500 may include one or more elements allowing the external device 4000 to communicate with the device 1000, and the memory 4700 may store information that is processed in the external device 4000.

The controller 4300 (also referred to as 'processor 4300) may generally control all operations of the external device 4000. For example, the controller 4300 may control the user input part 4100, the display part 4200, the communication part 4500, etc. by executing programs stored in the memory 4700.

In more detail, the controller 4300 may receive a list of folders in the device 1000 from the device 1000. The controller 4300 may firstly authenticate a user who selects a folder to be accessed and attempts to use data in the selected folder.

The controller 4300 may determine an authenticating method so as to make the server 2000 authenticate the selected folder the second time. The controller 4300 may obtain authentication data to be used in authenticating the user the second time by using the determined authenticating method. The controller 4300 may transmit the authentication data to the server 2000 and request the server 2000 for a decryption key for the selected folder. Also, the controller 4300 may transmit, to the server 2000, an ID value of the selected folder and information about the authenticating method related to the selected folder.

When the user is authenticated the second time by the server 2000, the controller 4300 may receive, from the server 2000, the decryption key for decrypting the selected folder. Afterward, the controller 4300 may access the selected folder in the device 1000 by providing the decryption key for the selected folder to the device 1000, and receive data in the selected folder from the device 1000.

The controller 4300 may not firstly authenticate the user of the selected folder and request the server 2000 to authenticate the user of the selected folder.

The one or more exemplary embodiments may be embodied as computer readable code/instructions on a recording medium, e.g., a program module to be executed in computers, the program module including computer-readable commands. The computer storage medium may include any usable medium that may be accessed by computers, volatile and non-volatile medium, and detachable and non-detachable medium. Also, the computer storage medium may include a computer storage medium and a communication medium. The computer storage medium includes all volatile and non-volatile media, and detachable and non-detachable media which are technically implemented to store information including computer readable commands, data structures, program modules or other data. The communication medium stores computer-readable commands, data structures, program modules, other data as modulation-type data signals such as carrier signals, or other transmission mechanisms, and may include other information transmission mediums.

Throughout the specification, a term "unit" or "part" indicates a hardware component such as a processor or a circuit, and/or a software component that is executed by a hardware component such as a processor.

The foregoing exemplary embodiments are merely exemplary and are not to be construed as limiting. The present disclosure can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A first device comprising:
   a transceiver configured to communicate with a second device and a server;
   a display configured to display a folder icon corresponding to an encrypted folder stored in the second device;
   an input interface that receives a first user input to select the folder icon from a user of the first device, and receives a second user input to input user authentication data;
   a memory storing at least one instruction; and
   a processor configured to execute the at least one instruction to:
   control the transceiver to transmit the user authentication data, to the server;
   control the transceiver to transmit, to the second device, a key for accessing the encrypted folder, the key received in response to the user of the first device being authenticated by the server based on the user authentication data;
   control the transceiver to receive data, from the second device, included in the encrypted folder; and
   control the display to display the data included in the encrypted folder,
   wherein a security level of the encrypted folder is increased by the second device in response to a request, from the server, to increase the security level of the encrypted folder.

2. The first device of claim 1, wherein the input interface receives the user identification data in response to receiving the first user input to select the folder icon.

3. The first device of claim 1, wherein the processor is further configured to execute the at least one instruction to display a graphic user interface (GUI) for selecting at least one authenticating method to authenticate the user who accesses a folder corresponding to the selected folder icon, in response to receiving the first user input to select the folder icon, and
   the input interface receives a third user input to select the at least one authenticating method from a selection list included in the GUI.

4. The first device of claim 3, wherein the authenticating method includes at least one of an authenticating method using a one-time password (OTP) and an authenticating method using biological information.

5. The first device of claim 1, wherein the security level of the encrypted folder is increased in response to a loss notification signal transmitted to the server, and
   wherein the processor is further configured to execute the at least one instruction to obtain the user authentication data to access the encrypted folder after the security level of the encrypted folder is increased.

6. The first device of claim 1, wherein the processor is further configured to execute the at least one instruction to control the transceiver to transmit the key to the second device.

7. A method of controlling a first device, the method comprising:
- displaying, by the first device, a folder icon corresponding to an encrypted folder stored in a second device;
- receiving, by the first device, a first user input to select the folder icon from a user of the first device;
- receiving, by the first device, a second user input to input user authentication data;
- transmitting, by the first device, the user authentication data, to a server;
- transmitting, by the first device and to the second device, a key for accessing the encrypted folder, the key received in response to the user of the first device being authenticated by the server based on the user authentication data;
- receiving, by the first device, data, from the second device, included in the encrypted folder; and
- displaying, by the first device, the data included in the encrypted folder,
- wherein a security level of the encrypted folder is increased by the second device in response to a request, from the server, to increase the security level of the encrypted folder.

8. The method of claim 7, the method further comprising:
receiving, by the first device, the user identification data in response to receiving the first user input to select the folder icon.

9. The method of claim 7, the method further comprising:
displaying, by the first device, a graphic user interface (GUI) for selecting at least one authenticating method to authenticate the user who accesses a folder corresponding to the selected folder icon, in response to receiving the first user input to select the folder icon, and
receiving, by the first device, a third user input to select the at least one authenticating method from a selection list included in the GUI.

10. The method of claim 9, wherein the authenticating method includes at least one of an authenticating method using a one-time password (OTP) and an authenticating method using biological information.

11. The method of claim 7, the method further comprising:
transmitting, by the first device, a loss notification signal to the server, and
obtaining, by the first device, the user authentication data to access the encrypted folder after the security level of the encrypted folder is increased.

12. The method of claim 7, further comprising:
transmitting the key to the second device.

13. A second device comprising:
- a transceiver configured to communicate with a first device and a server;
- a memory storing at least one instruction; and
- a processor configured to execute the at least one instruction to:
  - provide an encrypted folder stored in the second device, to the first device,
  - receive, from the server, a key for decrypting the encrypted folder from the server,
  - decrypt the encrypted folder using the key,
  - transmit data included in the decrypted folder, to the first device, and
  - increasing a security level of the encrypted folder in response to a request, from the server, to increase the security level of the encrypted folder.

14. The second device of claim 13, wherein the request to increase the security level includes security level increase information including a security level increasing method.

15. The second device of claim 14, wherein the security level increasing method includes at least one of limiting a number of times of accessing the encrypted folder and additionally encrypting the encrypted folder using another encryption key.

16. The second device of claim 15, wherein the processor is further configured to execute the at least one instruction to control to delete the data that has been transmitted to the first device.

* * * * *